(12) United States Patent
Parsons

(10) Patent No.: US 6,411,939 B1
(45) Date of Patent: Jun. 25, 2002

(54) COMPUTER-AIDED METHOD, MACHINE, AND PRODUCTS PRODUCED THEREBY, FOR ILLUSTRATING A REPLACEMENT OF A BENEFIT PLAN THAT IS VIABLE AT ONE LOCATION BUT NOT VIABLE AT THE LOCATION OF THE REPLACEMENT

(75) Inventor: David William Parsons, Roswell, GA (US)

(73) Assignee: Offshore Benefits, LLC, Atlanta, GA (US)

(*) Notice: Subject to any disclaimer, the term of this patent is extended or adjusted under 35 U.S.C. 154(b) by 0 days.

(21) Appl. No.: 09/313,164

(22) Filed: May 17, 1999

(51) Int. Cl.[7] .............................................. G06F 17/60

(52) U.S. Cl. ................................. 705/35; 705/1; 705/4; 705/7

(58) Field of Search ........................... 705/1, 4, 35, 36, 705/7; 283/54

(56) References Cited

U.S. PATENT DOCUMENTS

| | | | | |
|---|---|---|---|---|
| 3,863,060 A | * | 1/1975 | Rode et al. .................. | 708/134 |
| 4,648,037 A | * | 3/1987 | Valentino ...................... | 705/36 |
| 4,766,539 A | * | 8/1988 | Fox ................................. | 705/4 |
| 4,969,094 A | * | 11/1990 | Halley et al. .................. | 705/36 |
| 5,262,942 A | * | 11/1993 | Earle ............................. | 705/37 |
| 5,590,037 A | * | 12/1996 | Ryan et al. ...................... | 705/4 |
| 5,930,759 A | * | 7/1999 | Moore et al. .................. | 705/2 |
| 6,038,554 A | * | 3/2000 | Vig .............................. | 705/400 |
| 6,055,511 A | * | 4/2000 | Luebbering et al. .......... | 705/14 |
| 6,085,174 A | * | 7/2000 | Edelman ....................... | 705/36 |
| 6,092,047 A | * | 7/2000 | Hyman et al. .................. | 705/4 |

FOREIGN PATENT DOCUMENTS

| | | | |
|---|---|---|---|
| WO | WO 96/34472 | * | 10/1996 |

OTHER PUBLICATIONS

"International Benefits Meeting, Management Compensation Group, S.E., Inc., KPMG/Peat Marwick, LLP, Atlanta, Georgia", Jan. 27, 1995.

"International Benefits Meeting, Management Compensation Group, S.E., Inc., Dr. Olivia S. Mitchell, Wharton Pension Research Council, Philadelphia, Pennsylvania", Feb. 23, 1996.

"International Benefits Meeting, Management Compensation Group, S.E., Inc., International Corporate Marketing Group, J.P. Morgan & Company, Inc.", New York, New York, Mar. 25, 1996.

"International Benefits Meeting, Management Compensation Group, S.E., Inc., International Corporate Marketing Group, Jack Anderson, Ernst & Young", Paris, France, Mar. 29, 1996.

(List continued on next page.)

Primary Examiner—Vincent Millin
Assistant Examiner—Nicholas David Rosen
(74) Attorney, Agent, or Firm—Peter K. Trzyna, Esq.

(57) ABSTRACT

A method implemented with a machine, the machine, and method for using the machine, and products produced thereby, the method including a digital electrical computer having a processor programmed for electrically processing input data into output data, the computer electrically connected to an input device and to an output device, for illustrating a replacement of a benefit plan. The method the includes the steps of: entering information defining a benefit plan that is viable at one location but not viable at the replacement plan location, to convert the information into a portion of the input data that is electrically conveyed to the digital electrical computer for processing; engaging the digital electrical computer for the processing of the input data into the output data, the output data corresponding to characteristics for a replacement of the benefit plan, the replacement being viable at a location for the replacement; and generating an illustration of the replacement at the output device.

156 Claims, 35 Drawing Sheets

OTHER PUBLICATIONS

"International Benefits Meeting, Management Compensation Group, S.E., Inc., International Corporate Marketing Group, Johnson & Johnson", May 9, 1996.

Friedman, D.D., "Price Theory: An Internmediate Text," 1990, South—Western Publishing Co., 2nd edition, pp. 427–428.*

Simone, V.J., Pension World, vol. 17, No. 1, pp. 6, 8, "The International Pension World: Changing Concepts of Employment and Retirement," (Abstract only), Jan. 1981.*

Anon., Private banker International, vol. 8, p. 5, "Europe: TSB Channel Islands Computer Service for Expatriates," (Abstract only), Jun. 1988.*

Black, K. and Skipper, H.D., Life Insurance, twelfth edition, pp. 181–182 and 185–189, Prentice–Hall, 1994.*

England, R., Franchising World, vol. 28, No. 3, pp. 27, "Going by the Book," May/Jun. 1996.*

Nance–Nash, S., Money, vol. 25, No. 7, pp. 90, "Use Your Computer," Jul. 1996.*

Estrin, C.N., Legal Assistant Today, vol. 13, No. 6, pp. 65–67, "Talking the Talk," Jul./Aug. 1996.*

Anon., Franchising World, vol. 28, No. 4, pp. 30–33, "My Favorite Franchise Web Sites," Jul./Aug. 1996.*

Marchetti, M., Sales & Marketing Management, vol. 148, No. 9, pp. 44–45, "Enticing Families to Move Overseas," Sep. 1996.*

Goldberg, W.J., et al., Journal of Financial Planning, vol. 10, No. 1, pp. 24–28, "Life Insurance with Retirement Plan Assets," Feb. 1997.*

Ellentuck, A.B., Tax Advisor, vol. 29, No. 2, pp. 127–128, "Receipt of a Conditional Partnership Interest for Services," Feb. 1998.*

Lipoff, L.M., CPA Journal, vol. 68, No. 10, pp. 62–63, "Tax Court Guidance Regarding Welfare Benefit Plans," Oct. 1998.*

Downes, J. and Goodman, J.E., Barron's Dictionary of Finance and Investment Terms, fifth edition, Barron's Educational Series, pp. 140–141, 178–179, 472–473, 502–503, 598–601, 664–665, 674–675, and 688–689, 1998.*

* cited by examiner

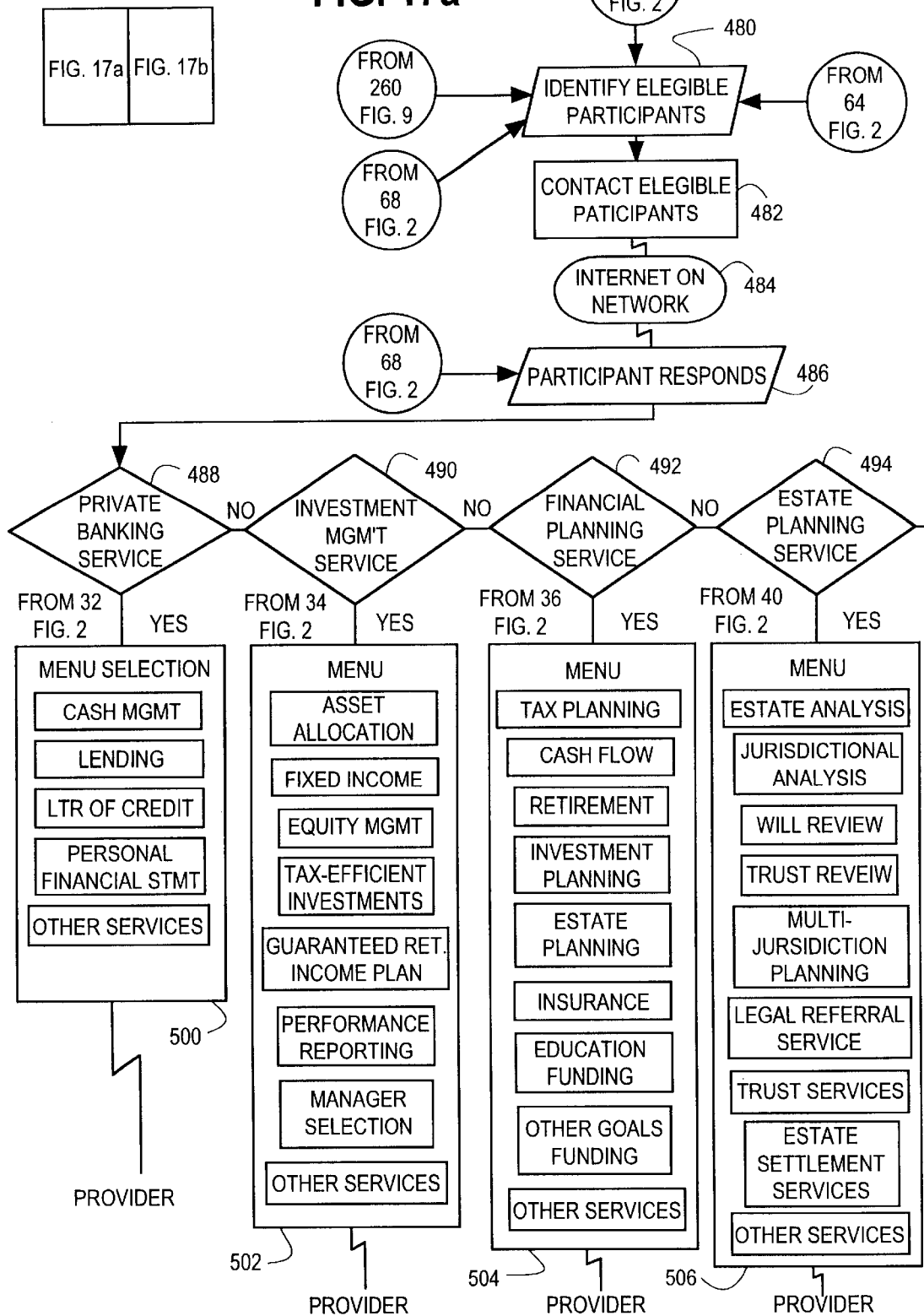

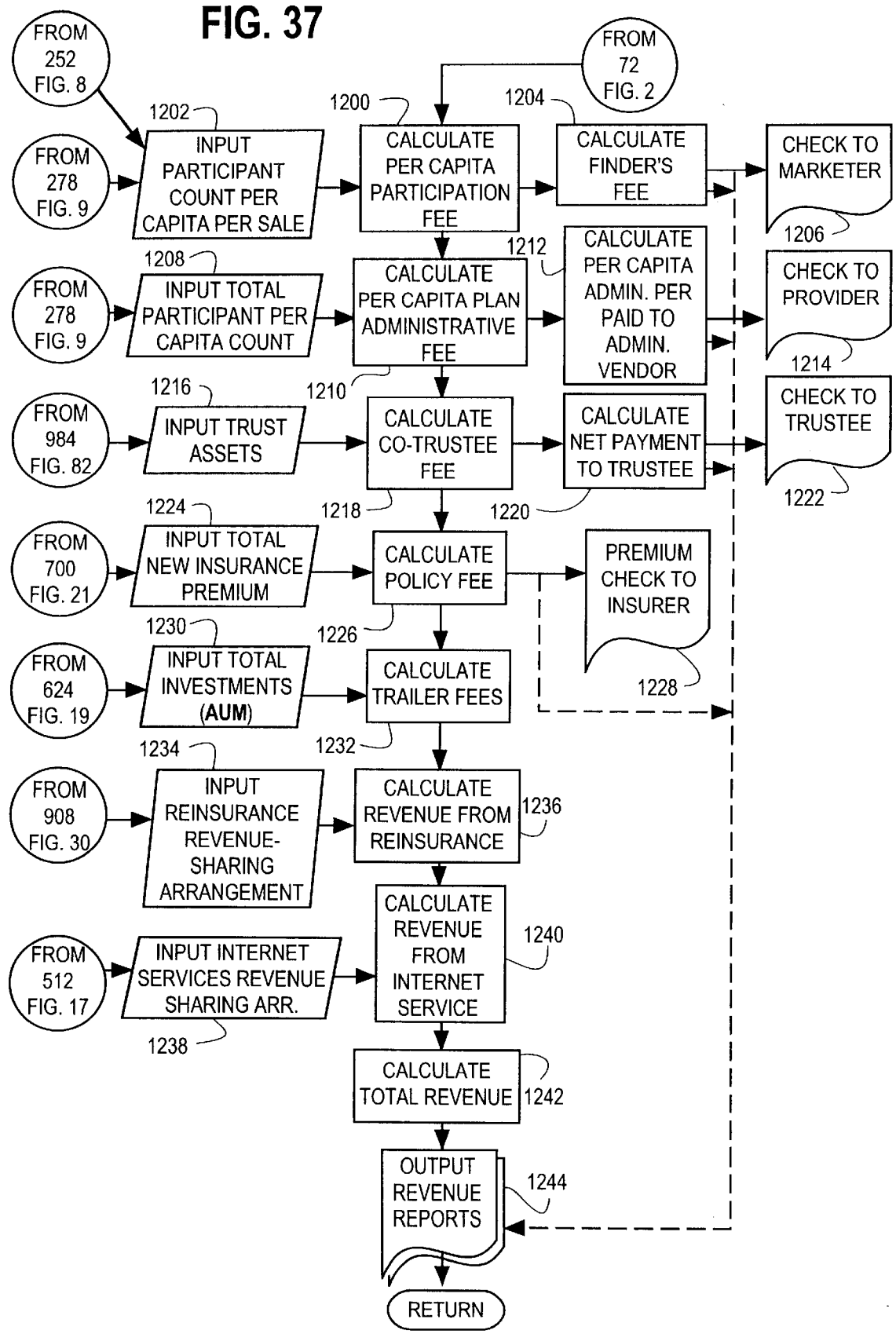

US 6,411,939 B1

COMPUTER-AIDED METHOD, MACHINE, AND PRODUCTS PRODUCED THEREBY, FOR ILLUSTRATING A REPLACEMENT OF A BENEFIT PLAN THAT IS VIABLE AT ONE LOCATION BUT NOT VIABLE AT THE LOCATION OF THE REPLACEMENT

I. BACKGROUND OF THE INVENTION

A. Copyright Notice

This patent document contains material that is subject to copyright protection. The copyright owner has no objection to a statutory fair use of this material, as it appears in the files of the files or records of the U.S. Patent and Trademark Office, but otherwise reserves all copyright rights whatsoever.

B. Technical Field of the Invention

The present invention is in the field of digital electrical machines and methods for making and using the same, data structures, necessary intermediates, and products produced thereby. More particularly, the present invention is directed to a digital electrical apparatus and method for data processing and data management having particular utility in the field of employee benefits, insurance, and compensation, especially in a business or financial transaction data processing system. Still more particularly, the present invention pertains to automated or partially automated (as by machine) activities in financial, business practice, management, or cost/price determination. Even more particularly, the present invention pertains to a machine comprising a digital electrical computer having a processor programmed for electrically processing input data into output data, the computer electrically connected to an input device and to an output device, for illustrating a replacement of a benefit plan.

II. BACKGROUND OF THE INVENTION

The genesis of this invention originates in what the inventor believes is a need to provide fair and equal compensation to the global work force. And given the morass of national laws, it has been a challenge to provide equivalent benefits to employees, executives, and self-employed individuals located anywhere in the world. Typically, U.S. multi-national employers (MNEs) will offer their domestic employees both "qualified" and "non-qualified" benefits. Qualified benefits usually include one or more retirement plans, designed as either defined benefit plans (such as pensions) or defined contribution plans (such as the 401 (k)). Non-qualified plans are generally available only to executives and include both defined benefit plans, such as Supplemental Executive Retirement Plans (SERPs), defined contribution plans, such as Deferred Compensation Plans, incentive plans, such as Incentive Stock Option Grants, and risk-transfer plans, such as Executive Life Insurance Plans (ELIPS).

For those employees outside the U.S., whether they are U.S. citizens on a foreign assignment (expatriates), foreign nationals on assignment in the U.S. (inpatriates), third-country nationals (TCNs), or foreign nationals in their home country (locals), cannot be offered the same benefit plans for economic and tax reasons. Therefore, an inequity in benefits is created between the international employees, both U.S. and foreign, and their U.S.-based peers. Often, the disgruntled international employees openly express their discontent and the MNE's human resource (HR) department is under pressure to provide an equivalent benefit. Prior to this invention, there was no efficient uniform means for providing equivalent benefits, and most MNEs would ignore the demands for equivalent benefits or increase cash compensation as a partial offset.

Many MNEs do not allow their U.S. expatriates to participate in the employer's 401 (k) plan, because the deferral of income is recognized as income in the majority of foreign jurisdictions. This means that the employee is taxed on income not received, and the MNE will usually gross up the employees' compensation to cover the additional foreign income tax, under the MNE's tax equalization program. Those MNEs that do allow their employees to participate in the 401 (k) retirement plan incur added globalization costs.

In addition, when foreign national employees are assigned to work in countries other than their home country (TCNs) the home country pensions are frozen and the employee may or may not be eligible to participate in the pension plans of the host country where assigned. Consequently, the TCN employee may retire with a pension that is less than the pension of a colleague who never left the home country. Prior to this invention, there was not uniform means for providing "pension gap" funding created by these situations.

The cost of maintaining a global workforce is significant. Generally, an employee in the U.S. with an annual salary of $100,000 may cost the MNE over $500,000 annually while on an overseas assignment, because of incentives, allowances and tax gross-ups that are usually paid. Local nationals and TCNs may be somewhat less expensive, based on their negotiated compensation packages. To alleviate the cost of globalization, the international HR departments are continually pressured to find ways to cut cost. At the same time, the international employees are trying to ensure that cost cutting does not affect their pocketbooks. Prior to this invention, there was no uniform means for reducing employee cost without reducing the employee's compensation package.

The time required to administer an international workforce is also excessive. It is estimated through surveys, conducted by Organization Resource Counselors, Inc. in New York, that each international employee demands over 60 hours of administrative time per year. This time is spent administering compensation and benefit issues for the various jurisdictions in which the MNE may be operating. If an MNE is operating in 200 countries globally, there are 200 different sets of labor and tax laws that the international HR department has to consider when making even the smallest change to the compensation and benefits program. The implementation of a global plan, such as an incentive stock option program, presents significant administrative time requirements and expense to sort the tax and legal impact associated with its implementation. Prior to this invention, there was not a single-source, cross-border solution for implementing benefit plans.

Recruitment for foreign assignments is also difficult. Historically, employees have been financially enticed to accept a foreign assignment. In recent history, career development requires international experience, and the HR departments would like to change the employee's motivation for accepting an assignment from a financial incentive to a career incentive. However, due to downsizing and mergers, most employees are not convinced that career enhancement opportunities actually result from overseas assignments. In many cases, the international employee has had no career position to return to upon repatriation. Therefore, it is difficult to gain employee acceptance of any cost cutting program in favor of career enhancement. Today, employees are focused on "what's in it for me." Prior to this invention, there was no uniform means for keeping the employee "whole," while reducing the cost to the MNE.

To further complicate the situation, MNEs have to continually deal with changing tax laws in the U.S., as well as the other jurisdictions in which they may do business. Compliance with changing tax laws and host country social programs is extremely challenging. Consequently, many MNEs find themselves out of compliance in one or more jurisdictions. Prior to this invention, there was no uniform means for providing benefits in a stable tax environment that would be applicable across jurisdictional borders.

Currently, only a few MNEs have addressed these issues to any great extent. In doing so, there have been programs designed for each specific type of international employee and each host country in which they work. Consequently, some MNEs may have as many a 100 different benefit plans for their global workforce. The administrative burden is overwhelming. Prior to this invention, there was no uniform means for providing a single-source benefit program that could provide multi-jurisdictional benefits.

The intent of this invention is to provide equivalent benefits. It is important to understand that equivalent benefits means "equitable" benefits, but does not have to be the "same" benefits. To further explain, foreign employees do not need to participate in a U.S. 401 (k) plan, as long as the distribution from their replacement plan provides the same economic benefit as their U.S. peers.

To design a multi-jurisdictional replacement benefit plan is largely dependent on the tax laws of the host jurisdiction within which the benefitted employee is the taxed entity. Generally, foreign jurisdictions are either common law or civil law entities. Civil law is based on the court's interpretation of the law as written, whereas each court decision adds to the body of law in a common law system. In either system, individual taxable income is based on any one or more of the following factors:
1. Tax residency
2. Remittance of income into the country
3. Economic benefit enjoyed by the individual
4. Benefits-in-kind
5. Constructive receipt of the income
6. Income effectively connected with the country (foreign sourcing)
7. Income for services provided in the country.

Traditional devices, such as the 401 (k), deferred compensation and split-dollar executive life insurance plans, depend on special provisions in the U.S. tax law, which do not exist in foreign jurisdictions. Whereas an U.S. employee is allowed to elect to defer income not yet received without being in constructive receipt of the income, foreign jurisdictions consider the right to defer the same as constructive receipt and tax a deferral as income. Likewise, premiums paid on behalf of the employee for a split-dollar program (ELIP) may be taxed as benefits in kind. Although elective deferred compensation plans may be recognized by a few foreign jurisdictions, they generally require a more severe risk of forfeiture than acceptable in U.S. plans.

In addition, any items of compensation attached to the international employee become subject to foreign social insurance costs, which in most cases are materially significant. So, it is also important to attempt to reclassify any replacement benefits as non-income, as well as non-taxable.

In general, employee benefits can be classified in three ways—(1) risk-shifting plans, such as life, health and disability insurance, (2) accumulation plans, such as retirement plans, and (3) income deferral plans, such as non-qualified deferred compensation. Prior to this invention, compensation techniques, such as assignment-completion bonuses, were the predominant tax avoidance strategy employed by consultants. However, these bonuses are being viewed by foreign tax entities as compensation related to services provided in the host country and subject to tax through the application of both "attribution" and "look-back" rules. To provide replacement benefits utilizes risk-shifting and accumulation strategies, since the employee's right to defer income is considered constructive receipt by most foreign jurisdictions and therefore, subject to tax.

The number of companies globalizing is increasing. Yet, the systems for supporting an international workforce are generally not adequate and sometimes obsolete. There is a limited number of consulting firms able to provide advice to MNEs and even less time to perform the myriad of functions necessary to support a global workforce. There are tremendous pressures to reduce costs, while at the same time improve performance. Consequently, the development and providing of state-of-the-art global benefits programs have been given a higher priority than ever before.

Meanwhile, MNEs are seeking the ability to provide equitable cross-border benefits to their global employees, and therefore, consultants are anxiously seeking providers who can supply global benefit solutions. Yet, to date, no one has dedicated the time and resources to developing the complex structures needed to provide global benefit plans. Prior to this invention, products and support programs for global benefit plans did not exist.

While there do exist a few providers who offer global health plans and group life, health and disability insurance plans, there are no providers of replacement benefits. In addition, there are considerable efforts being made to introduce defined contribution plans into Europe. Legislative changes are slow, especially in those countries where the social insurance programs are the strongest. Europe and the Far East are seeking an easy-to-implement defined contribution solution. Prior to this invention, there was no plan that could meet their needs.

Self-Employed Individuals and Consultants. The need for replacement benefits is not limited to employees and executives of multi-national corporations. In the global workplace, an increasing number of individuals are working as consultants or starting their own companies. Prior to this invention, there was no single source for these individuals to obtain the benefit plans they needed.

Individual Financial Services. Since replacement benefit plans are financial by nature, they affect every aspect of an individual's financial affairs. Therefore, prior to the present invention, replacement benefits have not been integrated with other financial services that might be needed by the plan participant. The services that this is invention integrates include, but are not limited to, banking services, investment services, financial planning services, estate planning services, relocation services, and other such services.

Assumption of Benefit Liability. In accounting for benefit plans, the benefits owed to the plan participant's are considered liabilities on the company's balance sheet, and the annual increase in the benefit liability has a negative impact on the company's earnings statement for the period in which the increase occurs. Consequently, the company's benefit plans can have an unfavorable impact on the financial welfare of a company independent of sales, production and/or operations. Company management would like to be able to be able to completely out-source the benefit liabilities to relieve the company of the financial impact, as well as the administrative burden of providing services that are outside of the company's business. Until this invention, there was no means for the assumption of the benefit liability.

III. SUMMARY OF THE INVENTION

A. Objects

Thus, an object of the invention for which a patent is sought is overcoming some or all of the drawbacks indicated herein by digital electrical computerized means or at least partially by machine.

It is a more particular object of the present invention to provide an apparatus and method for using a digital electrical computer system to process digital electrical signals to illustrate a replacement of a benefit plan.

It is a more particular object of the present invention to provide an apparatus and method for using a digital electrical computer system to process digital electrical signals to illustrate a benefit plan that is viable at one location but not viable at the replacement plan location.

It is a more particular object of the present invention to provide an apparatus and method for using a digital electrical computer system to process the input data into the output data, the output data corresponding to characteristics for a replacement of the benefit plan that is viable at the replacement plan location.

It is still another object of the present invention to provide an apparatus and method for using at least one, and preferably a plurality, of digital electrical computer systems to process digital electrical signals in support and implementation of the replacement plan, especially including computerized or computer-aided generation of all documentation involved in illustrating, supporting, and implementing the replacement plan.

It is yet another object of the present invention to provide an apparatus and method for using at least one, and preferably a plurality, of digital electrical computer systems to process digital electrical signals in an electronic community of related services (as discussed hereinafter) distinguished by virtue of the replacement plan or participation therein.

B. Summary

To meet these and other objects apparent from this document as a whole, the inventor herein has made a first innovation in the field of compensation and particularly in benefits that has created a need for a second innovation in the field of computer science, the latter being the subject of this patent application. The invention for which a patent is sought in overcoming some or all of the drawbacks indicated herein is an apparatus (machine), method of making the machine and products produced thereby, method of using the machine, article of manufacture, necessary intermediates including data structures, collectively referenced herein as the method. The method is implemented with a machine comprising a digital electrical computer having a processor programmed for electrically processing input data into output data, the computer electrically connected to an input device and to an output device, for illustrating a replacement of a benefit plan. Preferably, the method is carried out including the steps of: entering information defining a benefit plan that is viable at one location but not viable at the location of the replacement plan, to convert the information into a portion of the input data that is electrically conveyed to the digital electrical computer for processing; engaging the digital electrical computer for the processing of the input data into the output data, the output data corresponding to characteristics for a replacement of the benefit plan that is viable at the replacement plan's location; and generating an illustration of the replacement at the output device. The foregoing can be carried out further including the step of computer-assisted administering of the replacement in accordance with the illustration and/or further including the step of computer-assisted accounting of payments for the replacement in accordance with the administrating and/or further including the step of computer-assisted trust accounting for the replacement in accordance with the administrating.

In any of the foregoing, the step of computer-assisted trust accounting for the replacement in accordance with the administrating can include the step of computer-assisted trust accounting for an unfunded deferred tax plan trust, and/or can include the step of computer-assisted trust accounting for a funded current tax immediate-vesting plan trust, and/or can include the step of computer-assisted trust accounting for a funded deferred tax deferred-vesting plan trust, and/or can include the step of computer-assisted trust accounting for a funded 83(b) election, deferred tax deferred-vesting plan trust, and/or can include the step of computer-assisted trust accounting for a plurality of trusts for plans from at least two of the group: unfunded deferred tax plan; funded current tax immediate-vesting; funded 83(b) election, deferred tax deferred-vesting plan trust; and funded deferred tax deferred-vesting.

Similarly, any variant of the foregoing can further include the step of computer-assisted policy administration for funding for the replacement in accordance with the trust accounting, and/or computer-assisted calculating of net asset accumulation of the funding for the replacement for reporting and in accordance with the policy administration, and/or computer-assisted reinsurance administration for the policy in accordance with the policy administration, and/or computer-assisted reinsurance administration for the policy in accordance with the policy administration.

Likewise, in any variation of the foregoing, the step of engaging the digital electrical computer for the processing of the input data into the output data, the output data corresponding to characteristics for a replacement for the benefit plan that is viable at the replacement plan's location, can include engaging the digital electrical computer for the processing of the input data into the output data, the output data corresponding to characteristics for a cost-reduction-profit sharing replacement for the benefit plan, corresponding to characteristics for a synthetic defined contribution plan as the replacement for the benefit plan, corresponding to characteristics for a stock option substitute as the replacement for the benefit plan, corresponding to characteristics for a pension gap supplement as the replacement for the benefit plan, corresponding to characteristics for a voluntary contribution as the replacement for the benefit plan, corresponding to characteristics for an employer supplemental contribution as the replacement for the benefit plan, corresponding to characteristics for a plan covering at least one of health, life, and disability as the replacement for the benefit plan, corresponding to characteristics for the replacement for a retirement plan as the benefit plan, corresponding to characteristics for the replacement for a deferred compensation plan as the benefit plan, characteristics for the replacement for an incentive plan as the benefit plan, and/or characteristics for the replacement for a retirement plan as the benefit plan.

Moreover, in the foregoing variants, the step of computer-assisted trust accounting for the replacement in accordance with the administrating can include accounting for a trust investment, accounting for a loan secured by non-trust funds, and/or accounting for interim distributions of trust funds.

Additionally, any such variants can be carried out as further including providing Internet-based computerized banking services in response to data communicated over the Internet to a banking service computer, the data confirming an identity for an employee receiving the replacement.

It is especially preferred that any of the foregoing be carried out by further including providing Internet-based computerized investment service in response to data communicated over the Internet to an investment service computer, the data confirming an identity for an employee receiving the replacement, further including providing Internet-based computerized financial planning service in response to data communicated over the Internet to a financial planning service computer, the data confirming an identity for an employee receiving the replacement, further including providing Internet-based computerized relocation service in response to data communicated over the Internet to a relocation service computer, the data confirming an identity for an employee receiving the replacement, further including providing Internet-based computerized estate planning service in response to data communicated over the Internet to an estate planning service computer, the data confirming an identity for an employee receiving the replacement.

III. BRIEF DESCRIPTION OF THE DRAWINGS

FIG. 37 is a logic flow diagram for accounting for the revenue generated from the replacement plan.

IV. DETAILED DESCRIPTION OF THE DRAWINGS

Figure 1:
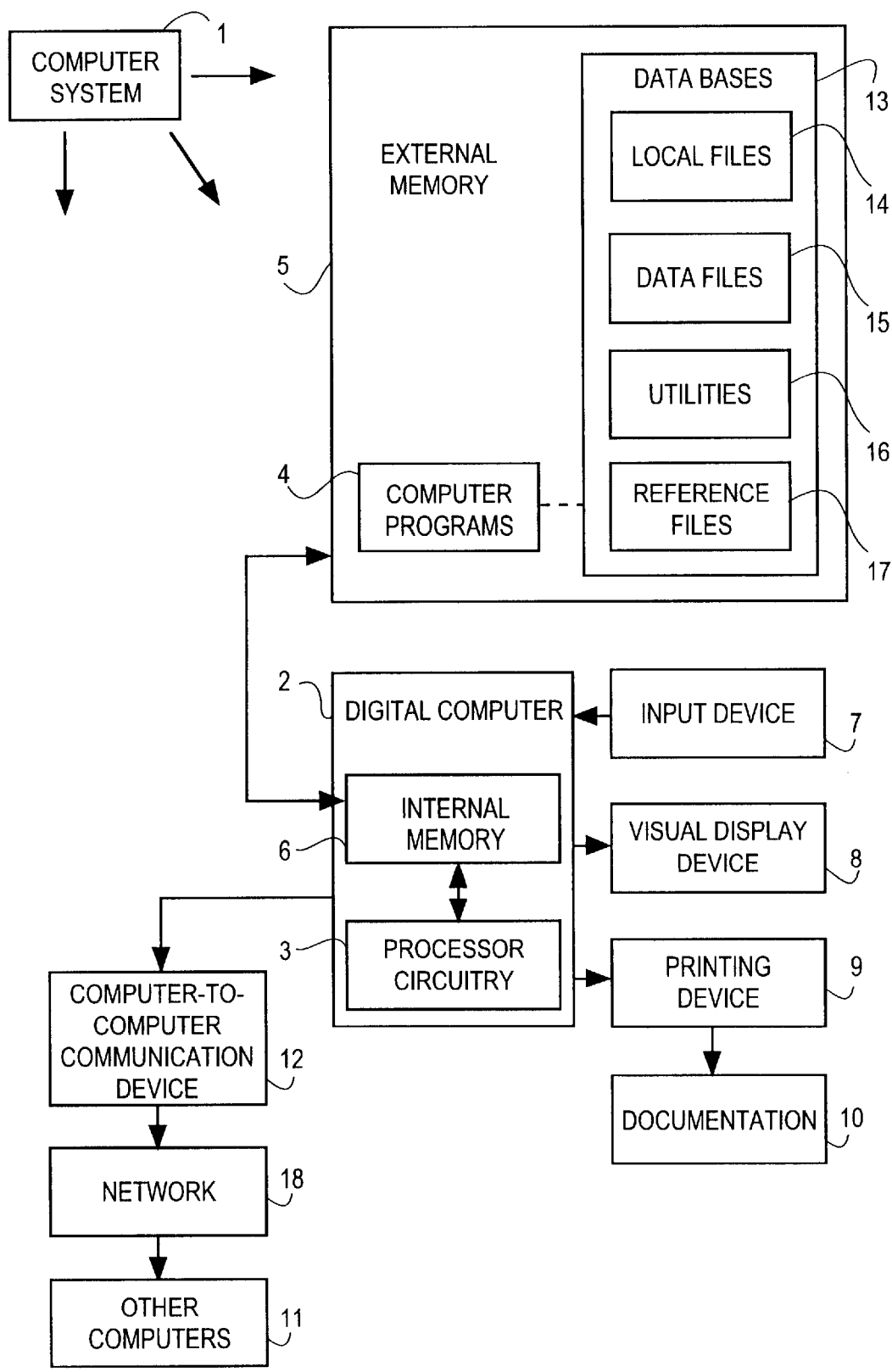
FIG. 1 is a representation of a computer system, particularly illustrating suitable hardware for the present invention.

FIG. 1 shows, in block diagram form, the computer-based elements that can be utilized to implement the present invention. The present invention involves computer system 1, which encompasses processor circuitry 3 in a digital electrical computer 2. For flexibility, it is preferable to have the processor circuitry 3 formed by means of a computer program programming programmable circuitry, i.e., programming the computer (microprocessor, such as one of the Pentium series). The programming can be carried out with a computer program (or programs) 4, which for flexibility should be in the form of software stored in an external memory 5, such as a diskette, hard disk, virtual disk, or the like form of an article of manufacture. (The virtual disk is actually an extended internal memory 5 that may assist in speeding up computing.) A diskette approach is optional, but it does provide a useful facility for inputting or storing data structures that are a product produced by the host software, as well as for inputting a software embodiment of the present invention. Of course, storing the computer programs 4 in a software medium is optional because the same result can be obtained by replacing the computer programs in a software medium with a hardware storage device, e.g., by burning the computer programs 4 into a ROM to form a specific hardware embodiment, using conventional techniques to convert software into an ASIC or FPGA, etc., as would be understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771–786, and James R. Goodman, Todd E. Marlette, and Peter K. Trzyna, "Toward a Fact-based Standard for Determining Whether Programmed Computers are Patentable Subject Matter," J.P.T.O.S. May 1995, Vol. 77, No. 5, pages 353–367, both of which are incorporated by reference.) In this regard, it should also be noted that "input" can include inputting data for processing by the computer program 4 or inputting via a portion of the computer program 4 code itself. Likewise, computer system 1 contemplates implementations in one or a plurality of computers, which could be in a distributed network or even unconnected but operated to carry out the invention as a whole.

An internal memory 6 works in cooperation with the external memory 5. An input device 7 could be a keyboard or equivalent means for a user to input the data discussed below. A visual display unit 8 can be employed for a visual representation, and a printing device 9 can be employed for producing hard copy documentation output 10. Note that output electrical data corresponding to output 10 can also be stored to memory 5.

For such an embodiment, the following specification should operate satisfactorily: an IBM or compatible PC (type XT or upwards) computer with a Pentium 2 or higher processor, having at least 20 Meg of memory (RAM). The environment/operating system could be MS-DOS/PC-DOS (or equivalent) version 3.0 or later. A numeric (math) co-processor is also advantageous in speeding up computing times, as is an extended memory. Alternatively, a Windows implementation could be used. The input device 7 can be any ANSI standard terminal, and the visual display unit 8 can be a Trinatron color monitor.

Still other alternatives include optionally using a network 18, such as a telecommunications, Internet, or intranet network, in facilitating other computers 11 to cooperate. Such cooperation can also involve communicating by a computer-to-computer communications device (e.g., a modem). However, a mini-computer or a mainframe system, or the like could be employed. With such larger scale approaches, the external memory 5 could be a tape or a CD ROM for data retrieval. A VAX or MicroVAX system running VMS 5.0 or later is an acceptable approach.

As indicated above, an embodiment could also be carried out in hardware, though this is not recommended as it is an inflexible approach. Accordingly, a hardware implementation is described here for exemplary purposes. Of course it is well known that a computer program can be stored in hardware by many approaches, not the least of which is burning it into a ROM. More sophisticated than burning a ROM, but also entirely conventional, is to use techniques to translate the computer program 6 into an ASIC or a chip that will carry out the invention in an equivalent manner, and if fact with equivalent circuitry to that formed by programming programmable computer circuitry. It is all just digital electrical circuitry processing digital electrical signals, transforming them to output different electrical signals.

The present invention can best be implemented by utilizing a database 13 of files (or an equivalent, e.g., records, a relational database, etc.) pertaining to insurance documentation data for processing as discussed herein. In FIG. 1, a dotted line between database 13 and computer program 4 is to illustrate that the computer program 4 code can be used to convey data to database 13, though this is not a particularly flexible approach. In any case, such data can be obtained from data input at the input device 7, which converts the respective input data into respective electrical signals for handling by the digital electrical computer 2, and processor 3, including storing the respective digital electrical signals in the memories 5 and 6. Output electrical data, in the form of digital electrical signals, is generated by the processor 3 processing the input electrical data in a manner specified by the executable computer program 4 to generate (at printing device 9) documentation 10, including such documents as insurance and illustration documentation, forms corresponding to the benefits, and the like.

There can be five basic types of file or data stored in the external memory 5:

1. The main program file (i.e., computer program 4).
2. Local files 14 (files specific to a particular user and not available to other users). These include files describing the configuration of the user's preferred output format, private dictionary files, input and output files generated by the user, etc.
3. Data files 15 local to a user, which in a single computer system, can include the main database file.
4. User utilities 16, which assist in customizing reference files and in the creation of private dictionaries.
5. Reference files 17, which are accessible to all users (e.g., users of other computers 18) and include the standard (or "public") dictionary files, files containing the menus, error and information messages and prompts.

Of course, if the invention is carried out with one computer and used by one user, reference files 17 are kept along with local files 14. In any case, a user should have access to the files that include a machine-readable version of the above-referenced documentation 10.

The programmed processor circuitry 3 uses the electronic contents of Database 13, including files 14–17, which represent some or all of the data input by the user to produce output data in a digital electrical form of a string of bits which correspond to processed data. The processor circuitry 3 carries out its operations by using at least one "filter", which can be characterized as an analysis or process restricted by a precise definition implemented by the processor circuitry 3. Elements of the definition can be characterized by at least one logical operator or operand to indicate the precise definition or process to be carried out, e.g., whether the union or intersection of two elements or the complement of an element is required. The term "filter" is also applied to the process of applying this definition to change, create, or generate, or exclude data other than that defined from subsequent processing.

This invention can also be implemented by utilizing at least one pointer to insert a computed piece of data or text into other text and formatted to produce the above-referenced documentation 10. Alternatively, a plurality of pointers can be logically linked so that the output electrical data can be inserted in a plurality of locations in the aforementioned documentation 10. The computer program 4 controlling the digital electrical computer 2 checks for the pointer(s) to ascertain whether any electrical output data should be inserted in generating the documentation 10. This is preferable to an approach of doing the computing described in the subsequent figures.

Figure 2:
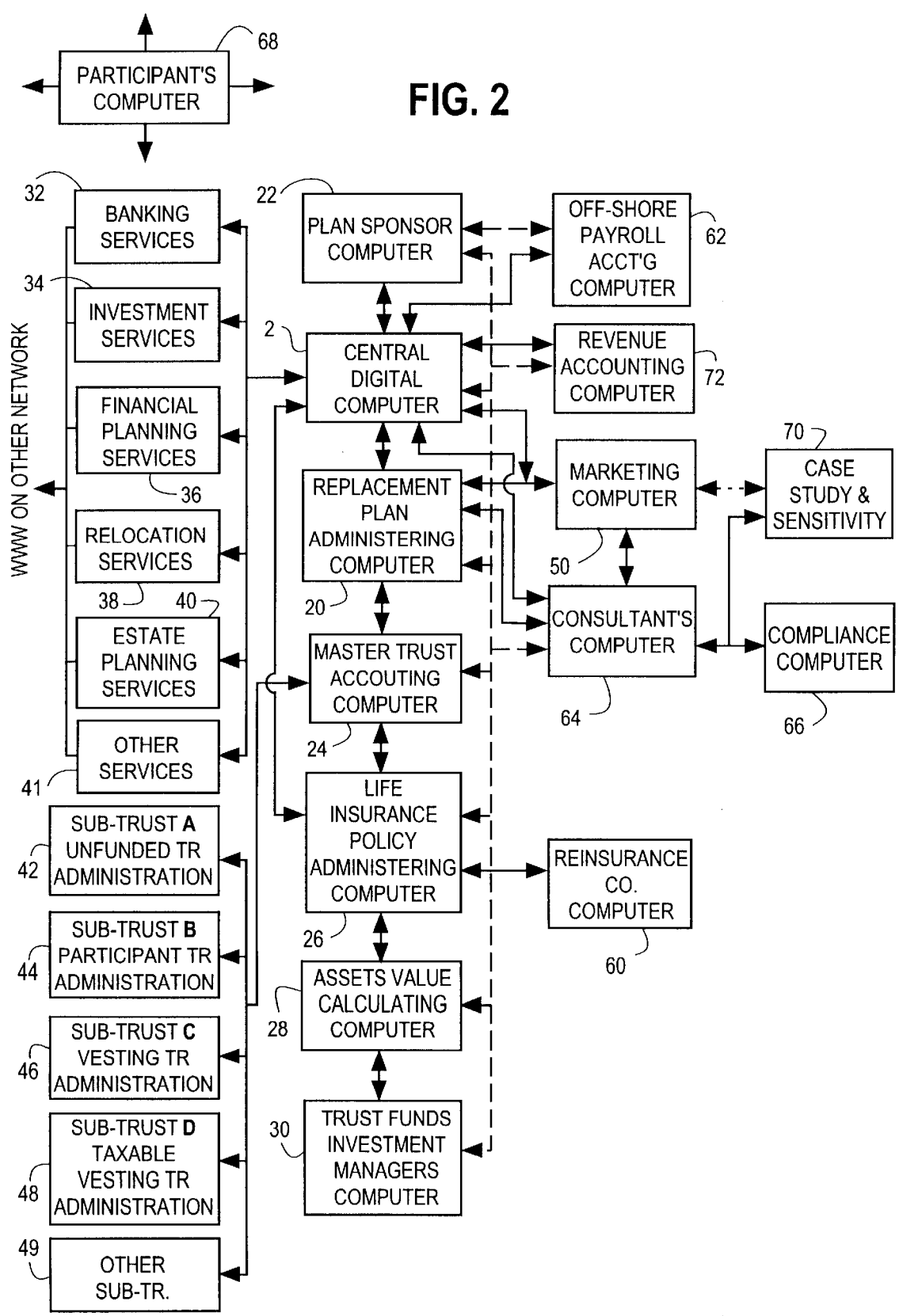
FIG. 2 is an overview of the present invention, particularly illustrating cooperation of elements of the present invention.

For the sake of brevity, it should be understood that the foregoing detailed depiction of items 2–18 in FIG. 1 are also representative of the details of other computers 11 mentioned herein, including Replacement Plan Administering Computer 20, Accounting Computer 22, Master Trust Accounting Computer 24, Life Insurance Policy Administering Computer 26, Assets Value Calculating Computer 28, Trust Funds Investment Manager Computer 30, Banking Services Computer 32, Investment Services Computer 34, Relocation Services Computer 38, Estate Planning Services Computer 40, Other Services Computer(s) 41, administrating computers for sub-trusts 42–49, Marketing Computer 50, Reinsurance Company Computer 60, Off-shore Payroll Accounting Computer 62, Participant's Computer 68, Consultant's Computer 64, Compliance Computer 66, Case Study and Sensitivity Computer 70, Revenue Accounting Computer 72, etc. as set forth hereinafter and illustrated in FIG. 2. Each of other computers 11 can have analogous components to those encompassed in items 2–18 in FIG. 1, and that the other computers 11 can communicate via the computer-to-computer communication device 12, such as a modem, and the network 18, such as the Internet, or telephone or the like, connecting the computer's respective input devices.

More particularly in FIG. 2, a representation of the overall functioning system for the invention is illustrated. The logic for System 1 can involve at least two alternative approaches. Either the logic is initiated by a consultant acting on behalf of a plan sponsor or by the plan sponsor directly. The System 1 works equally well under both approaches.

Considering the first alternative, the process begins with input from the via Consultant's Computer 64, which may be used in supporting and automating the consulting services related to this invention. The input data can include a request for a comparative study for providing equivalent benefits for the consultant's client. The Consultant's Computer 64 can identify the plans(s) to be illustrated and replaced. The necessary plan sponsor and participants' data can also be transmitted or otherwise communicated.

The Consultant's Computer 64 receives data from a Compliance Computer 66, which may provide accounting, legal and/or tax information, possibly from a database or network, for the United States and the various foreign jurisdictions in which their clients can desire replacement plans. The compliance information is used by the consultant to perform due diligence on the replacement plan illustrated by this invention.

The Central Computer 2 uses the data input from the Consultant's Computer 64 to prepare the comparative illustration of the current and replacement plans, which can be transmitted to a Marketing Computer 50, for the preparation of a marketing presentation for use by the consultant. The consultant may also prepare case studies or sensitivity analyses (a plurality of documents collectively showing the ramifications of a change in performance, an analytic assumption, or a target for the replacement) for clients inputting the illustrations provided into the Case Study and Sensitivity Computer 70. The Central Computer 2 can also provide new illustrations for those studies and analyses through the Marketing Computer 50.

When a Plan Sponsor initiates the process directly, the U.S. Plan Sponsor Computer 22, requests the comparative analysis and provides the needed data. The comparative illustrations are sent to the Marketing Computer 50, and packaged for transmission to the plan sponsor through the Central Computer 2. The Marketing Computer 50 provides case study and sensitivity analysis.

The Plan Sponsor may be an off-shore employer, which is related to a domestic employer, or totally independent, such as a non-U.S. company. The off-shore plan sponsor may transmit data to the Central Computer 2 from its Payroll Accounting Computer 62 with the same results as previously described for the consultant and domestic plan sponsors.

Once the plan sponsor accepts the replacement plan, data is transmitted from the Central Computer 2, the Marketing Computer 50, and the consultant's Computer 64, to the Replacement Plan Administering Computer 20. The Replacement Plan Administering Computer 20 prepares participant enrollment kits and the plan sponsor administrative guide, as well as providing on-going plan administration. As part of the administering, the Replacement Plan Administering Computer 20 also tracks benefit liabilities and issues benefit payment checks directly to either the plan participant or to the plan sponsor for further distribution to the plan participant.

The Replacement Plan Administering Computer 20, transfers data to the Master Trust Accounting Computer 26, which matches the benefit liabilities against the plan assets held in trust. The Master Trust Accounting Computer 26 is used to administer the trust document supporting the replacement plan and authorizes benefit payments, which can also include premature distributions of assets through trigger devices, secured loans, and/or interim distributions. The Replacement Plan Administering Computer 20, identifies the event and initiates the payment through transmissions to the Master Trust Accounting Computer 24, which verifies the event and authorizes the Replacement Plan Administering Computer 20 to make the payment.

The Master Trust Accounting Computer 24 accounts for the co-mingled assets of four or more sub-trusts that support specific replacement plans. The Master Trust Accounting Computer 24 can support multiple sub-trusts, based on plan specifics. Sub-Trust A is an administering computer 42 for an unfunded, deferred tax trust with substantial risk of forfeiture. Sub-Trust B is an administering computer 44 for a funded, taxable trust owned by the participant with a pay-out schedule. Sub-Trust C is an administering computer 46 for a funded, tax deferred, stand-alone trust with a predetermined vesting schedule. Sub-Trust D is an administering computer 48 for a funded, taxable, stand-alone trust with a predetermined vesting schedule. Other computers for sub-trusts are illustrated by Block 49, may be added as needed.

If life insurance is used by the trustee as a trust investment, the Life Insurance Policy Administering Computer 26 provides the trustee with the policy values, net of all expenses and charges, for fiduciary accounting. The Life Insurance Policy Administering Computer 26 transfers data to the Reinsurance Company Computer 60, for the determination of the transfer of risk liability between the carrier and the reinsurer. The Life Insurance Policy Administering Computer 60 also provides life insurance illustrations to the Central Computer 2 for the preparation of the comparative illustrations.

The Life Insurance Policy Administering Computer 26, receives data from the Assets Value Calculating Computer 28, which determines the net asset value of the actual investments held by the money managers. The net asset value is used in determining the policy values needed for life insurance policy administration.

The trust assets are actually held and managed by investment managers around the world. The Trust Funds Investment Manager Computer 30 tracks the custody, current market values and allocation of the assets actually held by the managers. That data is transferred electronically to the Assets Value Calculating Computer 28.

The Central Digital Computer 2 also passes data to financial services providers' computers at the direction of participants. The financial services providers may be accessed via the network 12, including the Internet, Intranet, telecommunications, facsimile, letter or any other such possible means. The services include those corresponding to Banking Services Computer 32, Investment Services Computer 34, Financial Planning Services Computer 36, Relocation Services Computer 38, Estate Planning Services Computer 40, and other such services Computer 41 as need evolves.

The computer system 1 is designed to also provide data to and receive data from the replacement plan participants through their own personal Participant's Computers 68, via the Network 12. Access is limited by a gateway to the supplemental financial services, the replacement plan participant reports, the input of participant transactions, and asset allocation for the participant's liability account only.

Representative samples of the system's output documents are shown in Specimens 1 to 12, beginning with Specimen 1 below. Being only a representation of the actual documents that can be produced, the final output reports may be different in form, but similar in substance.

Figure 3:
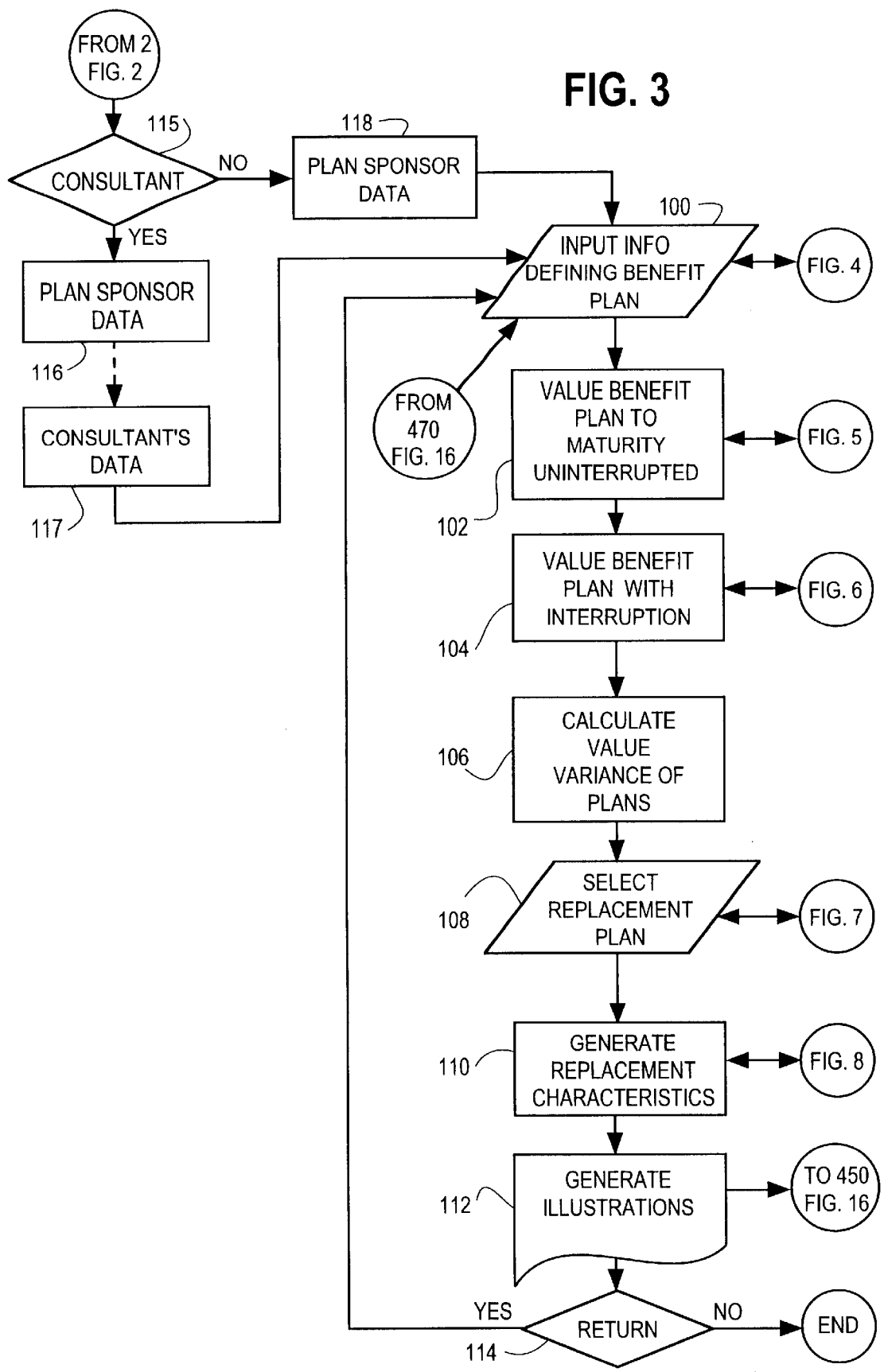
FIG. 3 is a logic flow diagram for the illustrating an overview for the present invention.

Turning now to FIG. 3, the central digital Computer 2 is used to generate comparative illustrations analyzing the replacement plan characteristics in comparison with the forfeited benefits not available or viable in the replacement plan's location. As described in FIG. 2, the process is initiated by either the consultant or the plan sponsor. In Block 115, the source of the data input is selected. If a consultant is selected, plan sponsor's data, Block 116, is provided by the appropriate Plan Sponsor Computer 22 and/or 62 to the Consultant's Computer 64, which in turn will provide the data, Block 117, to the Central Computer 2. Likewise, if the consultant is not selected, the plan sponsor's data, Block 118, is provided by the Plan Sponsor Computer 22 and/or 62, which will provide the data directly to the Central Computer 2.

Figure 4:
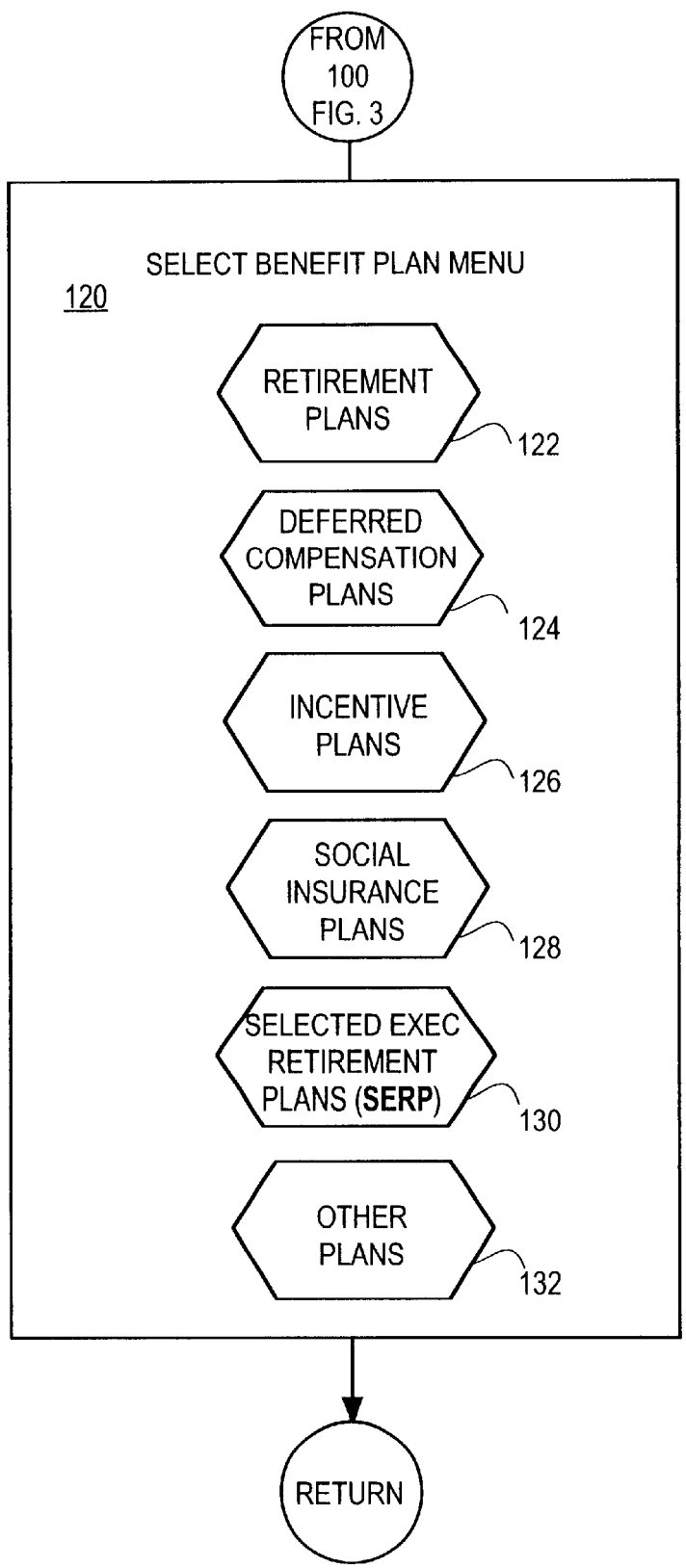
FIG. 4 is a diagram of a benefit plan menu for the present invention.

As requested by the consultant or the plan sponsor, the first input item is the current benefit plan information 100, which is selected from the menu in FIG. 4. The selection would typically be a plan that may not be extended to foreign employees, such as non-qualified deferred compensation, or a plan that is not tax effective overseas, such as a 401 (k) retirement plan.

The next process step in Block 102 is to value the benefit plan if held to maturity and uninterrupted. This analysis assumes that the individual is a participant in the selected plan and that particpation will continue until the benefit plan matures and distributions made. If the individual is not a current participant, the analysis is prepared as if the individual is a particpant. For example, a new employee being hired to work in Europe may not have the opportunity to participate in the U.S. benefit plans, but wants an equivalent plan while employed overseas. Therefore, the illustration is generated as if the employee is a participant.

In Block 104, the current plan is recalculated illustrating the effect of not being able to particpate for a period of time, such as an employee on an overseas assignment for three years. As in Block 102, if the individual is not a current participant, the analysis is prepared as if the individual is a particpant, for the same reasons.

In Block 106, the selected plan variance is calculated between the illustrations of the plan held to maturity and the interrupted plan. That variance represents the lost benefit value experienced by the individual as a participant or would-be participant. For example, if an individual was unable to participate in the company's 401 (k) retirement plan for the three years while overseas, the value of the plan would be reduced by three years of contributions plus the lost earnings on those contributions.

Figure 7:
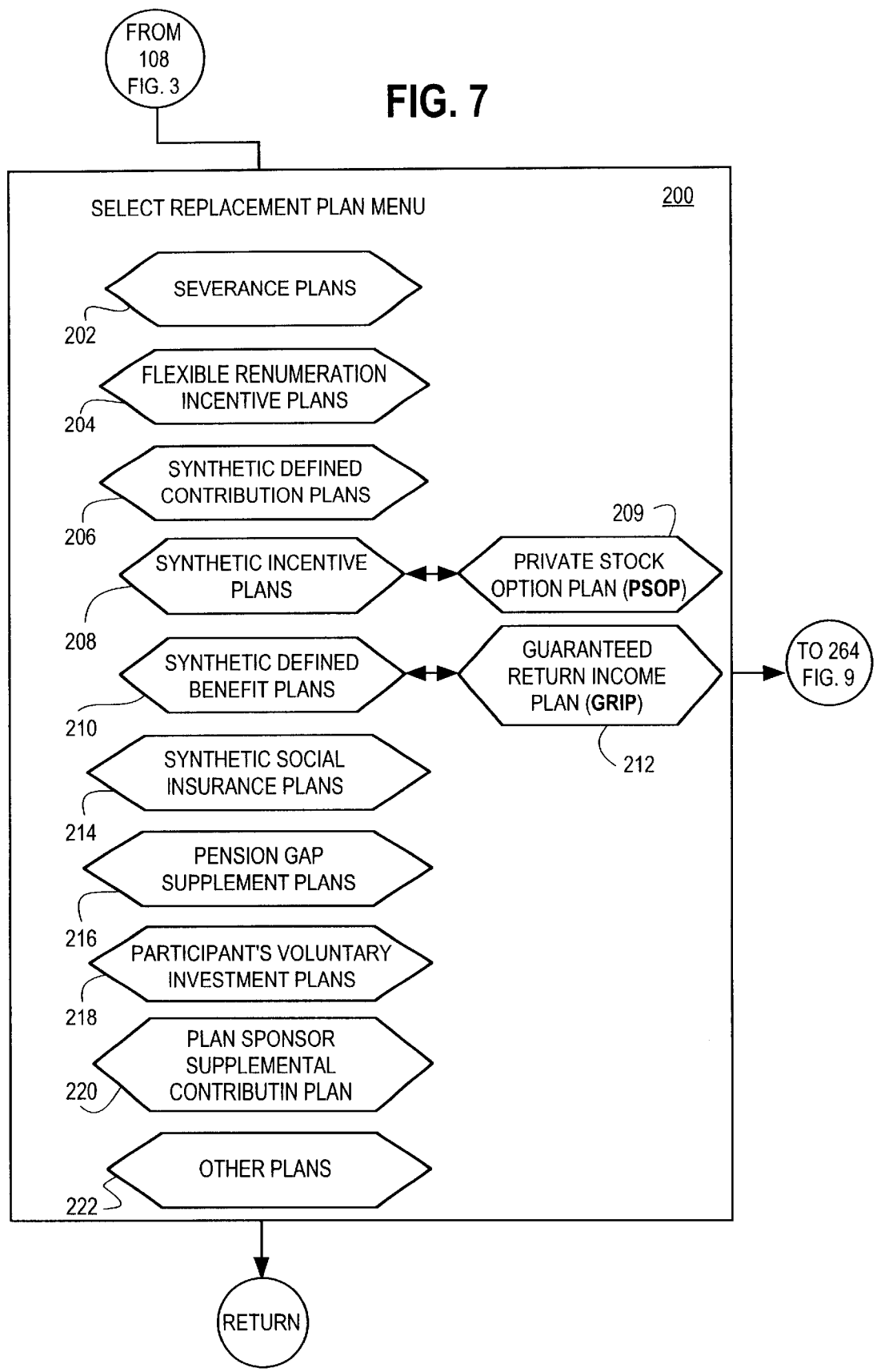
FIG. 7 is a diagram of a replacement plan menu for the present invention.

In Block 108, the replacement plan that is best suited to provide the benefit equivalent to the value of the benefit being lost is selected from the replacement plan menu in FIG. 7. These plans are designed to provide an equivalent or improved economic benefit to the participant when compared to the plan being replaced.

In Block 110, the Central Computer generates the characteristics of the replacement plan on a current and prospective basis. This analysis is based on the same assumptions as the current plans for parity.

In Block 112, an illustration is generated that compares the illustrations generated in Blocks 102, 104, 106, and 112. This illustration may be presented as a side-by-side illustration or other format, as required. The purpose of this illustration is to quantify the ability of the replacement plan to meet or exceed the variance identified in Block 106. The ability of the replacement plan to provide equivalent value to the participant is a dominant goal of this invention.

Specimen 1 is a representative sample of a Participant Summary Illustration for a Replacement Plan for a U.S. 401 (k) retirement plan. The Participant Summary Illustration is supported by several schedules that provide the analysis necessary to generate the Summary Illustration. For a Replacement Plan with multiple participants, each participant's illustration is aggregated to generate Plan Sponsor Illustration, which includes the supporting schedules and a Plan Sponsor Summary Illustration. The supporting schedules can include the financial impact on the plan sponsor's cash flow, earnings statement, and balance sheet, as well as one or more life insurance illustrations. Various schedules can also be combined on one schedule, such the Participant and Plan Sponsor Summary Illustrations can be combined into one schedule, if preferred.

In Specimen 1, the participant assumptions used are on the first page and the summary illustration is on the second page. The supporting schedules are not included in this specimen, since they follow standard industry formats and can be derived from review of the Summary Illustration. The assumptions used include a 45 year old participant, with a $100,000.00 current 401 (k) balance, making a regular $10,000.00 annual contribution, and earning an overall 10% rate-of-return on the account. At the beginning of 1999, the participant will be assigned to a foreign assignment for five years, without the ability to continue to participate in the plan sponsor's 401 (k) plan, since the plan is not favorably taxed in the foreign jurisdiction. Therefore, the plan sponsor has implemented a Replacement Plan to assist the participant in maintaining an equivalent benefit. To implement the Replacement Plan, the participant has negotiated a remuneration package that includes a Replacement Plan Benefit of $50,000.00, plus earnings, which will be distributed when vested in 20 years. Since the participant has no access to the funds (constructive receipt) until the benefit vests, the benefits will not be taxed to the participant until distributed in 20 years. The plan sponsor will use this invention to fund the promised Replacement Plan benefit using a specially designed, no-load life insurance product as the investment vehicle.

The sample Summary Illustration in Specimen 1 is a typical side-by-side comparison of the ability of the Replacement plan to generate equivalent benefits. Section A illustrates the participant's account balance and retirement income benefit if the plan could be continued uninterrupted by the foreign assignment. Section B illustrates the effects of the five-year lapse of participation on the account balance and retirement income benefit. Section C illustrates the account balance and retirement income benefit of the Replacement Plan. The illustration shows the effect of combining the benefits in Section B with the Replacement Plan benefits in Section C and compares the combined Net Income to the Net Income in Section A. As Specimen 1 illustrates, the participant's position is improved.

In Block 114, the illustration is analyzed for meeting the objectives, and if further analysis is required, the process is repeated until the output illustration is satisfactory, or until all of the desired plan options are illustrated. Likewise, if the reillustration is for sensitivity analysis, required by the consultant and/or plan sponsor, additional input of the sensitivity parameters is entered into Block 100 from the Marketing Computer 50 in Block 470, FIG. 16.

Moving to FIG. 4, the Benefit Plan Menu, Block 120, is used by the operator to select the current benefit plan to be compared and replaced. The menu is expandable and can include specific employer plans, as well as generic or model plans. For example, a particular plan sponsor may want to use the specific features of the company's non-qualified deferred compensation plans, rather than a generic model that is programed into the computer. The plan sponsor's plan(s) is downloaded into the Central Computer 2.

In Block 122, the Retirement Plans selection includes various tax-qualified plans within the main selection, including, but not limited to, Defined Benefit plans, such as pension plans, and Defined Contribution plans, such as money purchase plans, profit-sharing plans and the 401 (k) profit-sharing plan. Also included are excess plans and restoration plans. Retirement plans can also include other types of empolyer-sponsored savings plans, such as Simplified Employer Plan (SEP), as well as individual retirement plans, such as Individual Retirement Accounts and Keogh plans. This menu selection also includes retirement plans of non-U.S. companies in foreign jurisdictions.

In Block 124, the Deferred Compensation Plans selection includes non-qualified deferred compensation plans of all types and variations, which are generally classified as defined contribution plans. As such, in most of these types of plans, a defined amount, expressed in percentages or pecuniary terms, is forgone (deferred) from remuneration by the participant. The deferred amount is accounted for by the plan sponsor as a liability and is credited with earnings, in accordance with the plan design. The liability is recorded on the plan sponsor's balance sheet, and the earnings credited to the account are charged against the earnings of the plan sponsor. This menu selection also includes deferred compensation plans of non-U.S. companies in foreign jurisdictions.

In Block 126, the Incentive Plans selection includes all forms of incentive plans, including bonus plans, short-term and long-term incentive plans, and management incentive plans. The various forms of stock incentive plans are also part of this menu selection. Incentive stock plans include qualified and non-qualified stock option grants, stock appreciation rights (SARs), phathom stock plans, and other forms of stock incentive plans. This menu selection also includes stock participation plans of non-U.S. companies in foreign jurisdictions.

In Block 128, the Social Insurance Plans selection includes all forms of government sponsored social insurance programs. For the U.S., this menu selection includes Social Security and its related programs of retirement, death, disability and medical insurance coverages. For foreign jurisdictions, this menu selection includes the government-sponsored programs specific to the jurisdiction.

In Block 130, the menu selection non-qualified defined benefit plans, such as a Supplemental Executive Retirement Plan (SERP), which pays an executive a supplemental retirement income at retirement. This menu selection also includes other forms of salary continuation plans and management supplemental retirement benefit plans. In addition, this menu selection includes non-qualified defined benefit plans of non-U.S. companies in foreign jurisdictions.

In Block 132, the menu selection allows for expansion to include other types of benefit plans that might be found in the U.S. and foreign jurisdictons.

Figure 5:
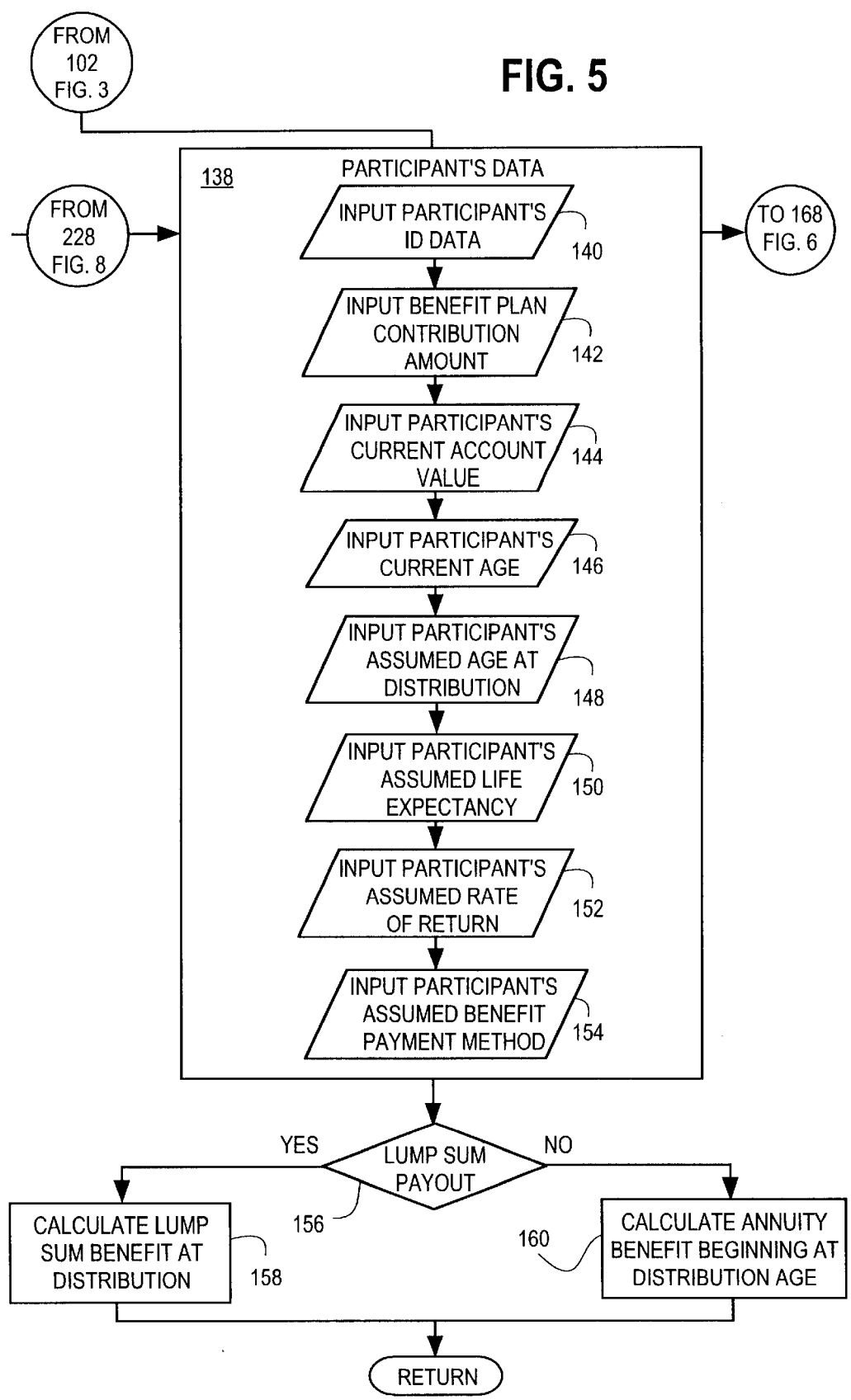
FIG. 5 is a logic flow diagram for valuing a benefit plan that is in place until maturity.

Turning now to FIG. 5, the illustration for the current benefit plan active until maturity is formulated. The logic proceeds with Block 138, which receives the Participants' Data from the data input used to generate the Replacement Plan Characteristics in Block 228, FIG. 8.

The logic continues in Block 140, which receives input from the participants' data of each participant's identification in either numeric or alphabetic form. If there is more than one participant to be included, a census may be inputted. If a participant census is not available, the participants are grouped by age cells based on agreed upon assumptions provided by the consultant or plan sponsor. Obtaining the participant population data is important to this process.

The logic proceeds in Block 142, which receives an input from the participants' data of the amount of money for each participants' contribution, such as the participants' present contribution to the benefit plan to be replaced. If the replacement is not for a present benefit of the participant, but rather is a replacement for a hypothetical benefit that the participant could have had he or she been employed at a location where the benefit plan is viable, a hypothetical contribution can be entered to provide a reference. For example, a maximum contribution for a 401 (k) defined contribution profit sharing plan is $10,000 per year, and assuming that the participant earns an income sufficient to qualify for the maximum, this maximum amount can be entered at Block 142.

Block 144 receives input from the participants' data of the amount of money equivalent to the current account value of the benefit being replaced. For a benefit that does not exist for the participant, the entry can be zero. However, for example, for an existing 401 (k) with a current total value of $50,000, and a vested value of $40,000, the entry can be the $50,000. For a defined benefit plan with an accrued benefit of $4,000 per year and a projected benefit of $10,000 per year for a long term, the later is used for a long term analysis, and the former is used for a current analysis.

Block 146 receives input from the participants' data of each participant's current age. Optionally the current age, age at end of year, or nearest birthday may be used.

Block 148 receives input from the participants' data of each participant's assumed age at the plan's expected distribution date, which can optionally be defined by the benefit plan being replaced. If no plan exists, a distribution age declared by the participant or by law can be used. For example, if the benefit plan is a pension plan having a normal retirement age of 65, then 65 is entered in block 148.

Block 150 receives input from the participants' data of each participant's assumed life expectancy. The input is based on the participant's personal planning assumptions, assumptions provided by the plan sponsor or actuarial tables. For example, if the plan sponsor desires to use a life expectancy of age 90, then age 90 is entered.

Block 152 receives input from the participants' data of the assumed rate of return for the current benefit plan. The rate of return is either the actual historical life of plan rate of return or an assumed rate of return provided by either the participant or the plan sponsor. Where a current plan does not exist, the participant or plan sponsor will provide an assumed rate of return. For example, if a participant's 401 (k) has yielded an average annual total return of 10%, then 10% will be entered. Comparatively, if a defined benefit pension plan benefit is projected using an actuarial calculation based on an 8% rate of return, the 8% is entered.

Block 154 receives input from the participants' data of the benefit payment option to be illustrated. Generally, the choices will be between a lump sum payment at the inputted distribution age and an annuity payment beginning at the inputted distribution age and ending at the life expectancy input.

Block 156 receives an input of the Block 154 entry. If a lump sum payment is entered, Block 158 will calculate the amount of the lump sum amount to be paid at the inputted distribution age. The calculation is performed by executing an equation that uses the principal of compound interest applied to the existing balance and continuing contribution from the participant's current age to the age at distribution. If an annuity payment is entered, Block 160 will calculate the amount of the lump sum, using the same method as previously described, and convert it into an annuity, based on tables in the program.

Figure 6:
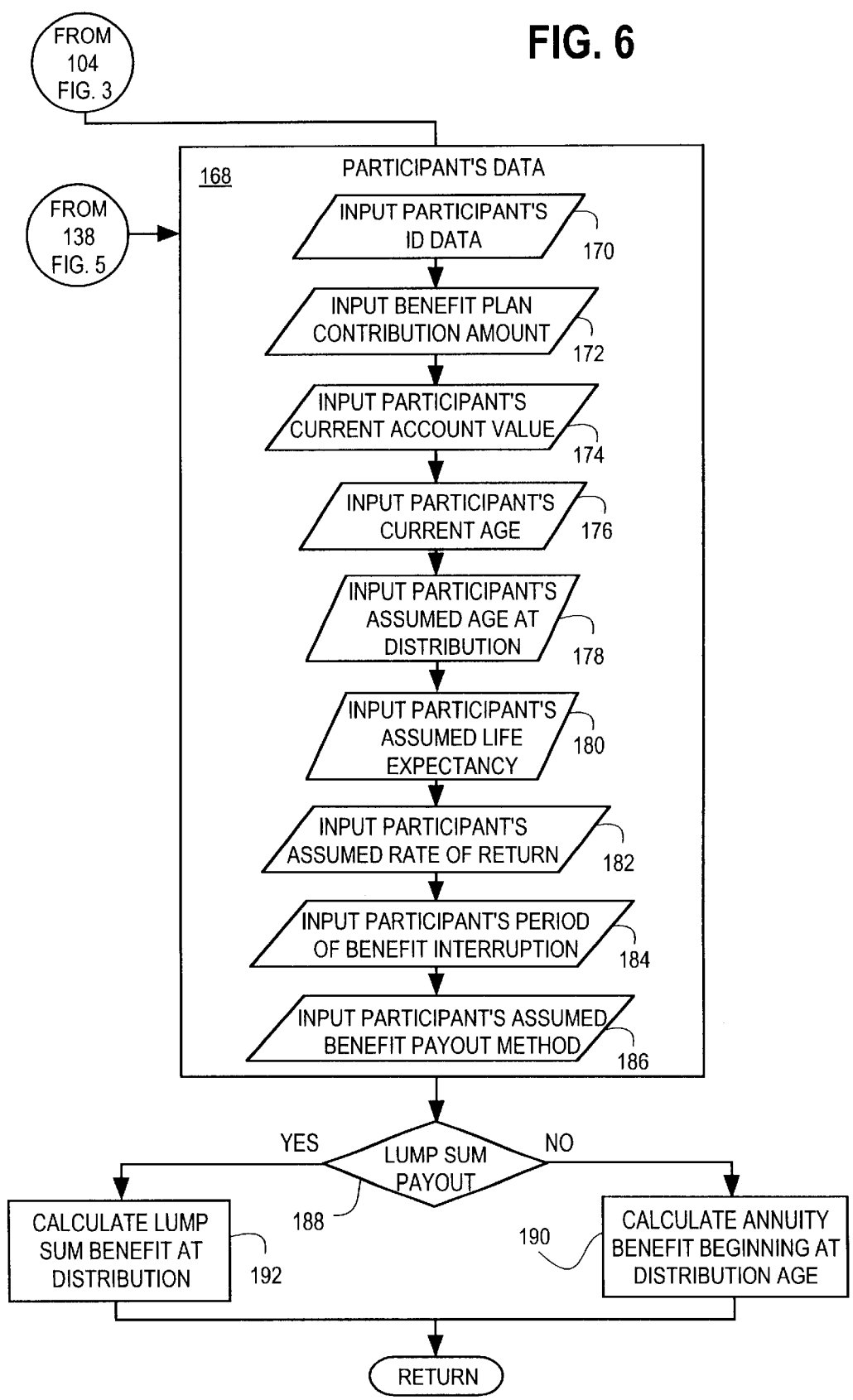
FIG. 6 is a logic flow diagram for valuing a benefit plan that is not continuously in place until maturity.

Turning now to FIG. 6, the illustration for the current benefit plan, which is not active until maturity, is formulated. The logic proceeds with Block 168, which receives the Participants' Data from the data input used in Block 138, FIG. 5, which is the same data used to generate the Replacement Plan Characteristics in Block 228, FIG. 8.

The logic continues with block 170, which receives input from the participants' data of each participant's identification in either numeric or alphabetic form.

This is the same data as previously used in Block 140. Similarly, If there is more than one participant to be included, a census may be inputted. If a participant census is not available, the participants are grouped by age cells based on agreed upon assumptions provided by the consultant or plan sponsor.

The logic proceeds in Block 172, which receives input from the participants' data of the amount of money for each participant's contribution, such as the participant's present contribution to the benefit plan to be replaced. If the replacement is not for a present benefit of the participant, but rather is a replacement for a hypothetical benefit that the participant could have had had he or she been employed at a location where the benefit plan is viable, a hypothetical contribution can be entered to provide a reference. For example, a maximum contribution for a 401 (k) defined contribution profit sharing plan is $10,000 per year, and assuming that the participant earns an income sufficient to qualify for the maximum, this maximum amount can be entered at block 172.

Block 174 receives input from the participants' data of the amount of money equivalent to the current account value of the benefit being replaced. For a benefit that does not exist for the participant, the entry can be zero. However, for example, for an existing 401 (k) with a current total value of $50,000, and a vested value of $40,000, the entry can be the $50,000. For a defined benefit plan with an accrued benefit of $4,000 per year and a projected benefit of $10,000 per year for a long term, the later is used for a long term analysis, and the former is used for a current analysis.

Block 176 receives input from the participants' data of each participant's current age. Optionally the current age, age at end of year, or nearest birthday may be used.

Block 178 receives input from the participants' data of each participant's assumed age at the plan's expected distribution date, which can optionally be defined by the benefit plan being replaced. If no plan exists, a distribution age declared by the participant or by law can be used. For example, if the benefit plan is a pension plan having a normal retirement age of 65, then 65 is entered in block 178.

Block 180 receives input from the participants' data of each participant's assumed life expectancy. The input is based on the participant's personal planning assumptions, or assumptions provided by the plan sponsor or actuarial tables. For example, if the plan sponsor desires to use a life expectancy of age 90, then age 90 is entered.

Block 182 receives input from the participants' data of the assumed rate of return for the current benefit plan. The rate of return is either the actual historical life of plan rate of return or an assumed rate of return provided by either the participant or the plan sponsor. Where a current plan does not exist, the participant or plan sponsor will provide an assumed rate of return. For example, if a participant's 401 (k) has yielded an average annual total return of 10%, then 10% will be entered. Comparatively, if a defined benefit pension plan benefit is projected using an actuarial calculation based on an 8% rate of return, the 8% is entered.

Block 184 receives input from the participants' data of each participant's period of non-participation in the plan. This is usually expressed in years, but can be expressed in months. For example, if a participant is to be located at a foreign employment location that would require being unable to participate in a benefit plan for 48 months, then 48 months can be entered.

Block 186 receives input from the participants' data of the benefit payment option to be illustrated. Generally, the choices will be between a lump sum payment at the inputted distribution age and an annuity payment beginning at the inputted distribution age and ending at the life expectancy input. For example, if the illustration is to analyze a lump sum payment, then lump sum is entered.

Block 188 receives an input of the Block 186 entry. If a lump sum payment is entered, Block 192 will calculate the amount of the lump sum amount to be paid at the inputted distribution age. The calculation is performed by executing an equation that uses the principal of compound interest applied to the existing balance and continuing contribution from the participant's current age to the age at distribution, less the period of time the participant is not participating. If an annuity payment is entered, Block 190 will calculate the amount of the lump sum, using the same method as previously described, and convert it into an annuity, based on tables in the program.

Moving to FIG. 7, the Replacement Plan Menu, Block 200, is used to select the new benefit plan to be used to replace the benefit plan in Block 120, FIG. 3. The menu is expandable and is intended to include existing replacement plans, as well as plans to be developed for future use within the invention. One of the objectives of this invention to promote and support the continuing development of new replacement plans. The replacement plan menu will include replacements for U.S. and foreign plans. For example, if the European Union wanted to develop a defined contribution plan for the population of its member nations, this invention can be used to design, implement and administer such a plan, and it can be added to the menu in Block 200.

The replacement plans are not intended to specifically replace any particular existing benefit plan, but rather, any replacement plan may be used to replace any existing benefit plan at the plan sponsor or consultant's request. For example, a plan sponsor may desire to use a Flexible Remuneration Incentive Plan as a replacement for the company's 401 (k) plan, which is not viable overseas.

In Block 202, the Severance Plans selection includes the various plans for making payments to employees, who are being terminated from their employment for whatever reasons. Typically, this situation can be created when a plan sponsor releases a participant from one company to be rehired by a foreign subsidiary. For example, it is common for an U.S. company (USCO) to terminate an employee from the U.S. entity to be rehired by the company overseas company (USCO-Europe). USCO may use a severance payment replacement plan to reward the employee for taking an overseas assignment, or alternatively, use the severance plan to replace certain incentives and allowances in the assignment compensation package. In addition, a plan sponsor may use a severance plan design to supplement or replace a "golden parachute" payment for a terminated executive.

In Block 204, the Flexible Remuneration Incentive Plans selection includes various forms of flexible compensation tied to long-term vesting benefits. For example, using a "balance sheet" based expatriate assignment package, a plan sponsor may enter a genuine negotiation with a participant to adjust the amounts of the incentives and allowances that comprise the participant's total remuneration package. Typically, the consultant can coordinate the design of the flexible remuneration plan and plan sponsor negotiation.

To the extent that the negotiation results in cost savings to the plan sponsor, the savings can be shared with the participant, which is the Incentive Plan portion of this menu selection. At the plan sponsor's discretion, a portion of the savings is placed into a deferred vesting arrangement for distribution at a later time to be determined jointly by the plan sponsor and participant. With an infinite number of plan designs, each plan sponsor will have the option of designing a Flexible Remuneration Incentive Plan to meet their own unique situation, goals and objectives.

As an example of the plans operation, a participant is selected for an expatriate assignment, and the plan sponsor negotiates with the participant to determine the allowances and incentives that are needed and those that the participant can forgo. Assume the negotiation is settled with the participant forgoing a portion of several allowances totaling $30,000.00, which saves the plan sponsor an addition $20,000.00 of tax and gross-ups. The plan sponsor may then decide to share the savings with the participant by entering a separate agreement with the participant to pay a $25,000.00 benefit with earnings at a date in the future. The distribution date can vary as mutually agreed by the plan sponsor and the participant, but would be expected to be between five and twenty years. The benefit would be subject to risk of forfeiture or vesting until distribution depending upon the plan design. In addition, another replacement plan can be used as an incentive plan in lieu of the typical arrangement. For example, the plan sponsor may implement a "severance plan" instead of the incentive plan and use the cost savings to fund that plan for the benefit of the participant.

In Block 206, the Synthetic Defined Contribution Plans selection includes any plan that simulates a U.S. tax-qualified defined contribution retirement plan, such as a money purchase plan or a 401 (k) profit sharing plan. For example, the Insured Security Option Plan (ISOPT) is a plan that can be considered a synthetic defined contribution plan (see, e.g., U.S. Pat. No. 5,839,118 incorporated by reference). It produces essentially the same financial results to both the plan sponsor and the participant as a 401 (k) plan without being tax qualified for IRS purposes. Other synthetic defined contribution plans will be created for the global workforce.

In Block 208, the Synthetic Incentive Plans selection includes plans designed to be a substitute for the traditional forms of incentive plans. For example, the Private Stock Option Plan (PSOP) is a synthetic stock option plan that is designed to replace incentive stock option grants, phantom stock and stock appreciation rights.

In Block 209, the PSOP is a plan in which the plan sponsor transfers cash to an offshore trust, through a loan, gift or other means. The trustee uses those funds to purchase the plan sponsors stock or some other company's stock or mutual fund on the open market through an appropriate exchange in the U.S. or in a foreign jurisdiction. In accordance with the trust document, the trustee is allowed to issue and sell private longterm options to the plan participants on the stock held by the trust. Typically, they would expire in ten years and be exercisable after three years, but each plan can be designed differently. However, in order for the participants to be allowed to exercise their options, certain performance criteria must be met. For example, to allow an option exercise, the plan sponsor may require that the stock price be above a certain level, the participant be an active employee of the company, the income from operations be increased by a certain percentage, and/or any other measurement that the plan sponsor believes to be an important goal for the company. The probability of the selected events occurring will devalue the price of the option to the participant. Therefore, the option price can be relatively small compared to the price of the stock. Depending on the factors, it can be as low as one to two percent of the share price. The participants purchase the PSOPs with their own funds, or with bonus money paid to them by the plan sponsor, as personal investments. Payroll deduction may also be used for administrative convenience.

When vested and if the prescribed criteria have been met, the participant can exercise the options and call in the stock. As directed, the trustee sells the called shares in the market and uses the proceeds to pay off the loan to the plan sponsor, with the balance paid to the participant as capital gains. Alternatively, the trustee may sell only the shares needed to pay the participant's gain and use the remaining shares for another PSOP.

The financial result to the participant is improved in that the gain is the same, but it is classified as capital gains instead of ordinary income. Likewise, the plan sponsor avoids the FAS 123 accounting issues and has an immediate tax deduction when bonuses are used to help the participants purchase the shares. In the case where the participants are using personal funds to purchase the PSOPs, the plan sponsor has no accounting requirements, except for entering the loan to the trust as a note receivable on the balance sheet and recording any interest credited on the loan in the earnings statement.

In Block 210, the Synthetic Defined Benefit Plans selection includes plans that are used to simulate the economic benefits of U.S. and foreign tax-qualified and non-qualified defined benefit plans in locations where they may not be viable. These plans include synthetic supplemental executive retirement plans, target benefit plans, and the Guaranteed Return Income Plan (GRIP).

In Block 212, the Guaranteed Return Income Plan is a defined benefit investment vehicle, which has a guaranteed rate-of-return and generates a guaranteed annuity income to the participant. The concept is that the participant is buying a guaranteed income to begin at some future time and continue for life or for a certain period of time. For example, a 40 year-old participant could be guaranteed a $1.00 per month income for life beginning at age 65 for every $10.00 invested. In fact, the participant's periodic GRIP statement would detail the guaranteed future income earned to date as a primary focus of the statement rather than the performance, since the participant is purchasing guaranteed income, not rate-of-return.

The product design can be a life insurance and/or annuity product, using a combination of stable-value bond and/or equity separate accounts and life insurance as the funding device to produce a guaranteed income based on a guaranteed rate-of-return. The guarantee is a floor with upside profit-sharing for the participant.

The GRIP allows the participant to pass the investment responsibility to the investment professionals, where it belongs. It gives every participant the ability to participate in the global financial markets with certainty and confidence. The GRIP's most novel feature is that it is a defined benefit investment that can be used to fund defined contribution arrangements.

In Block 214, the Synthetic Social Insurance Programs selection includes those plans created as a substitute for the social insurance programs of various governments worldwide. For example, using a life insurance product, a plan can be developed to provide a German executive working in Japan for a U.S. plan sponsor the same survivor, disability and retirement benefits that his U.S. peers will receive from U.S. Social Security. Similarly, plans can be developed to simulate any social insurance program in which a participant is not eligible to participate.

In Block 216, the Pension Gap Supplement Plans selection includes those plans that are designed to supplement the national social retirement pension programs sponsored by most foreign governments. Typically, when foreign participants are no longer residents of their home country, they do not participate in the home country's social retirement pension program, and their benefits are frozen. Therefore, the participants working outside their home country may sacrifice a portion of their retirement benefits. The Pension Gap Supplement Plans are designed to offset any deficit created by employment outside the home country. For example, a Frenchman working in South America for an extended time, whose French social Pension is reduced by $1,000.00 per month by his absence, can use a Pension Gap Supplement Plan to restore the $1,000.00 of monthly income from outside the French system.

In Block 218, the Participant's Voluntary Investment Plans selection includes plans that are intended for us by participants on a voluntary contribution basis, either through a plan provided by a plan sponsor or on a direct participation basis. For example, residents of several merging countries are limited in their ability to invest their funds outside their country because of strict exchange controls. One of these plans can be used by a plan sponsor to allow offshore investments for their participants using world-class investments. In addition, these plans can be used by participants as accumulation investments to increase their personal wealth or supplement their retirement.

In Block 220, the Plan Sponsor Supplemental Contribution Plans selection includes plans designed for the plan sponsor to use as vehicles for making contributions to incentive plans or catch-up plans for their participants. For example, if a plan sponsor recognizes that a participant or group of participants are under-compensated relative to their peers, but the plan sponsor does not want to incur the additional tax and social insurance cost associated with providing compensation, a supplemental contribution plan is used to provide the participants with equivalent value.

In Block 222, the Other Plans selection is used to accommodate additional plans that might be added to the invention in the future. A goal of the invention is to foster the creation and development of new replacement plans that provide equivalent benefits and/or new benefit plans.

Figure 9:
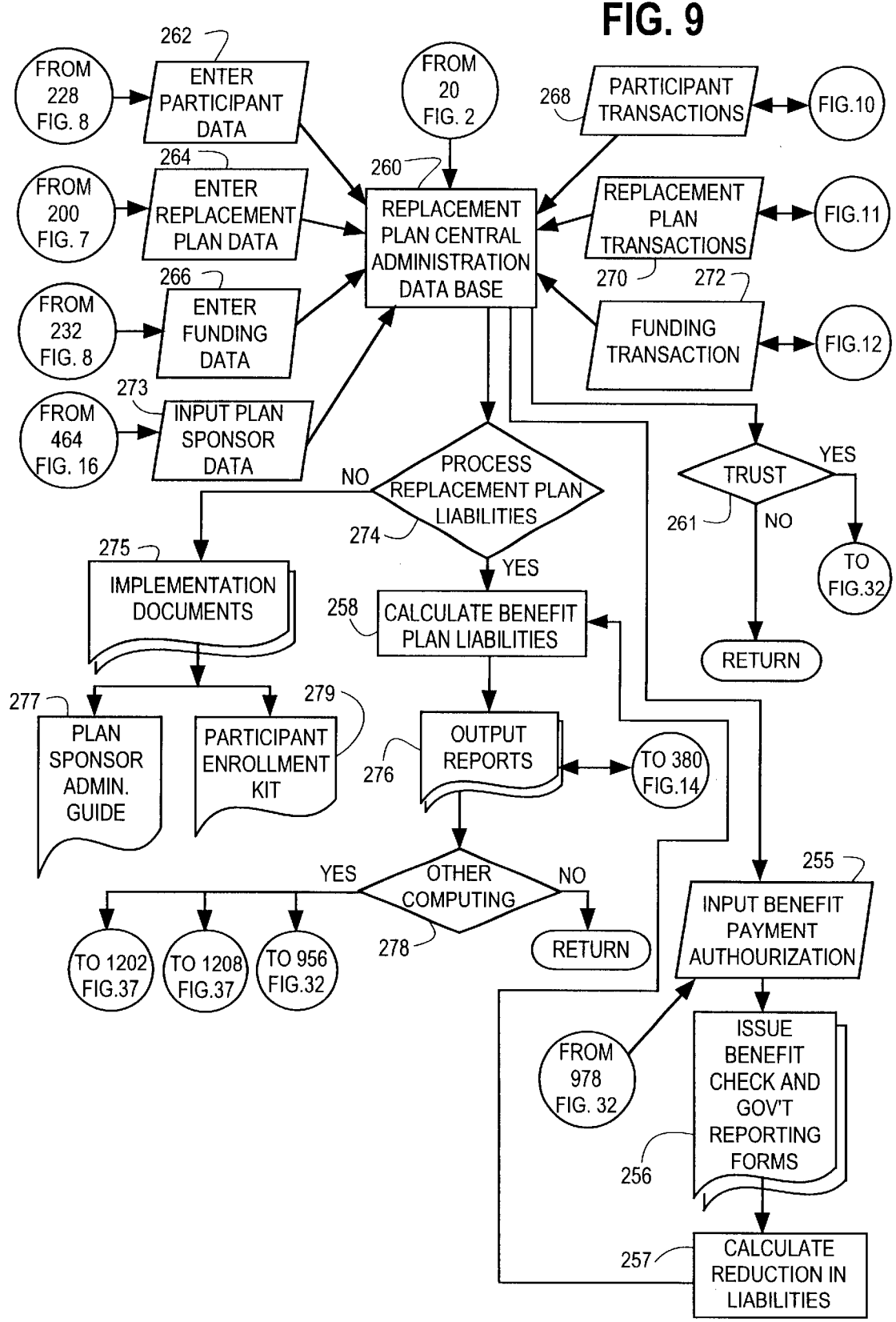
FIG. 9 is a overview logic flow diagram for administering the replacement plan.

The selected Replacement Plan data is transmitted to both the Central Computer in Block 108, FIG. 3, for the generation of illustrations and to the Replacement Plan Administering Computer, Block 264, FIG. 9, for recording the replacement plan data needed to accurately administer the plan.

Figure 8:
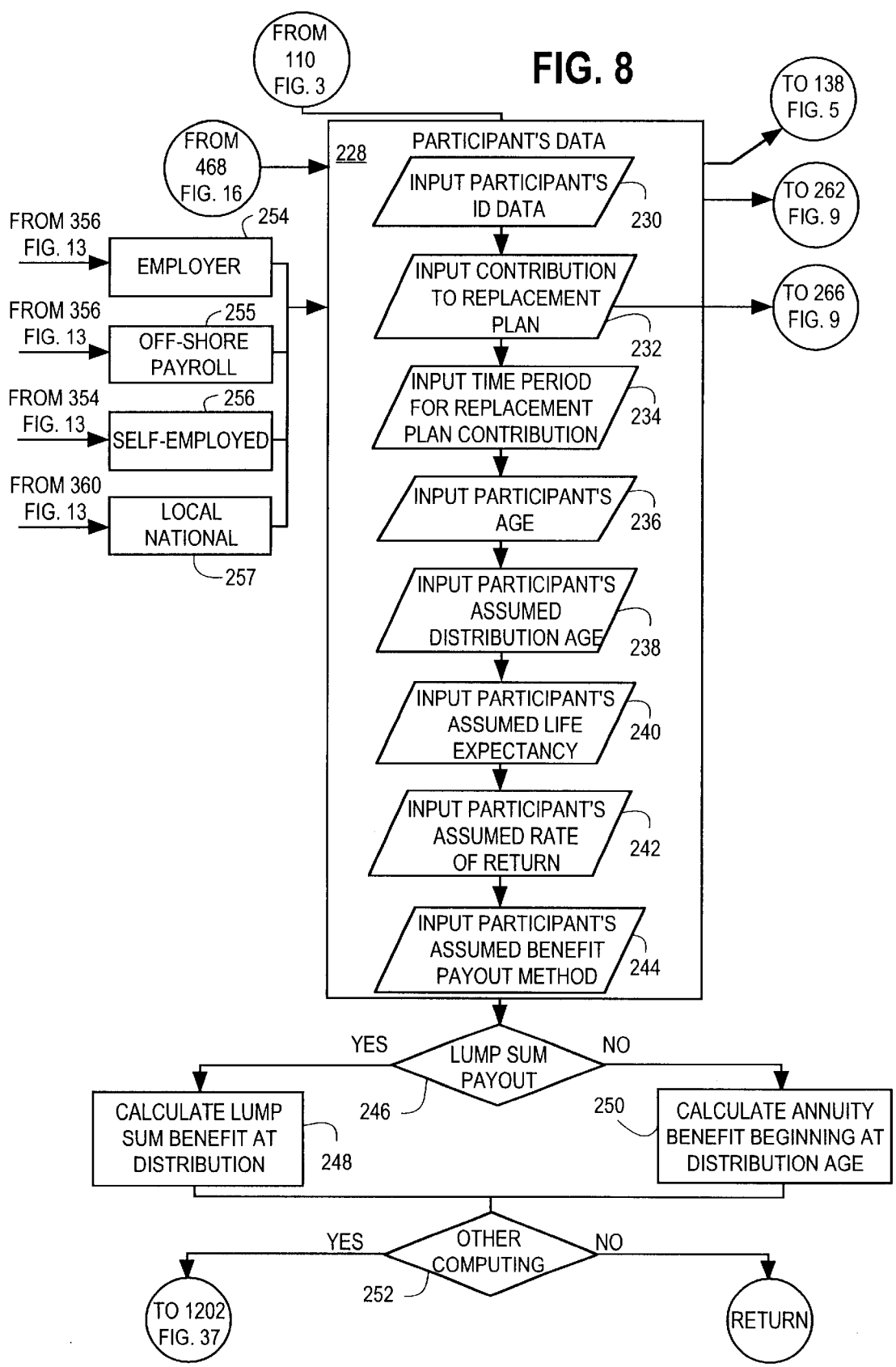
FIG. 8 is a logic flow diagram of generating replacement plan characteristics.

The logic now moves to FIG. 8 as the selected replacement plan is illustrated. The logic proceeds with Block 228, which receives the Participants' Data from the data input used to generate the Replacement Plan Characteristics from the various possible sources. Obtaining accurate participant sourcing information and population data is important to this process. This data is also used to illustrate the benefit plans to be replaced in Block 138, FIG. 5. In addition, this data is transmitted to the Replacement Plan Administering Computer, Block 262, FIG. 9, to be used to track the participants' benefit liabilities. The specific design will be influenced by the source of the plan sponsor, and the input received by Block 230 needs to identify that information.

In Block 254, the input to Block 228 is being provided directly or through a consultant from an Employer, either U.S. or foreign. The location of the employer will also be entered. For example, if the plan sponsor is an U.S. employer and the participants are U.S. expatriates, a synthetic incentive plan may be designed differently than a plan designed for a Japanese employer with Singaporean participants, although it is the same basic plan being illustrated.

In Block 255, the input to Block 228 is being provided from an offshore payroll company, which can be a subsidiary of an U.S. or foreign employer, as well as a Professional Employer Organization (PEO). Offshore payroll companies and PEOs are typically used to operate an employee leasing operation, where the participants are hired by the offshore entity and sent to various assignments. A replacement plan is designed differently for a participant in an offshore payroll company than it might be for another participant. For example, since the offshore company is not subject to the same regulations as the parent might be, the offshore company is better able to pass the benefit liability to the replacement plan provider. In doing such, the employer can eliminate the financial statement impact created by implementing a replacement plan. The assumption of the benefit liability becomes a currently tax-deductible expense, rather than a deferred tax asset.

In Block 256, the input to Block 228 is received from a self-employed participant, of either U.S. or foreign origin. The replacement plan will be designed differently for the self-employed than for other types of participants, in that the participant and the plan sponsor are one-and-the-same. Therefore, there is not flexibility on some designs and limitations on other types of replacement plans. For example, it may be difficult to justify a severance plan for a self-employed individual. While at the same time, a plan for a self-employed participant can be more customized to the particular needs of the participant, when there is not a group of participants or management to set limits.

In Block 257, the input to Block 228 is received from local nationals, who may or may not be employees of a local or multi-national company. Local participants are not usually on the same compensation packages as expatriates, third-country nationals and foreign nationals in the U.S. Therefore, the plan design may be limited. For example, local participants would not be candidates for a pension gap supplement plan.

The logic proceeds with block 230, which receives input from the Participants' Data of the participant's identification in either numeric or alphabetic form from the applicable source. If there is more than one participant to be included, a census may be inputted. If a participant census is not available, the participants are grouped by age cells based on agreed upon assumptions provided by the consultant or plan sponsor.

The logic proceeds in Block 232, which receives input from the Participants' Data of the amount of money for a contribution into the replacement plan for the benefit of the participants. For example, a maximum contribution for a 401 (k) defined contribution profit sharing plan is $10,000 per year, and assuming that the participant earns an income sufficient to qualify for the maximum, this maximum amount can be entered if the replacement plan was a synthetic defined contribution plan. This data is also transmitted to the Replacement Plan Administering Computer, Block 266, FIG. 9, for determining the total amount of financial contribution required to fund the replacement plan. In addition, the contribution data is transmitted to Block 800, FIG. 25, to be used to determine initial gross premium to be used to fund a life insurance policy.

Block 234 receives input from the Participants' Data of the amount of the time period that it is anticipated that the replacement plan contribution will be made. For example, if the replacement plan is a pension gap supplement plan and the participant will be away from home for five years, then five years is entered into Block 234. If the five-year contribution is to be made in a single lump sum payment, that is also entered.

Block 236 receives input from the Participants' Data of each participant's current age. Optionally the current age, age at end of year, or nearest birthday may be used.

Block 238 receives input from the Participants' Data of each participant's assumed age at the plan's expected distribution date. For example, if the participant is 40 years old and the replacement plan is to vest in 15 years, then 55 is entered in Block 238.

Block 240 receives input from the Participants' Data of each participant's assumed life expectancy. The input is based on the participant's personal planning assumptions, assumptions provided by the plan sponsor or actuarial tables. For example, if the plan sponsor desires to use a life expectancy of age 90, then age 90 is entered.

Block 242 receives input from the Participants' Data of the assumed rate of return for the current benefit plan. The rate of return is either the actual historical life of plan rate-of-return or an assumed rate of return provided by either the participant or the plan sponsor. Where a current plan exists, the participant or plan sponsor may provide the historical rate-of-return. For example, if a participant's 401 (k) has yielded an average annual total return of 10%, then 10% will be entered for a 401 (k) replacement plan. Comparatively, if a defined benefit pension plan benefit is projected using an actuarial calculation based on an 8% rate of return, the 8% is entered for a defined benefit replacement plan.

Block 244 receives input from the Participants' Data of the benefit payment option to be illustrated. Generally, the choices will be between a lump sum payment at the inputted distribution age and an annuity payment beginning at the inputted distribution age and ending at the life expectancy input.

Block 246 receives an input of the Block 246 entry. If a lump sum payment is entered, Block 248 calculates the amount of the lump sum amount to be paid at the inputted distribution age. The calculation is performed by executing an equation that uses the principal of compound interest applied to the existing balance and continuing contribution from the participant's current age to the age at distribution. If an annuity payment is entered, Block 250 calculates the amount of the lump sum, using the same method as previously described, and convert it into an annuity, based on tables in the program.

In Block 252, the total number of participants in a replacement plan is sent to the Revenue Accounting Computer 72, Block 1202, FIG. 37, for determining the per-capita first-year participation fee for each new replacement plan.

Figure 16:
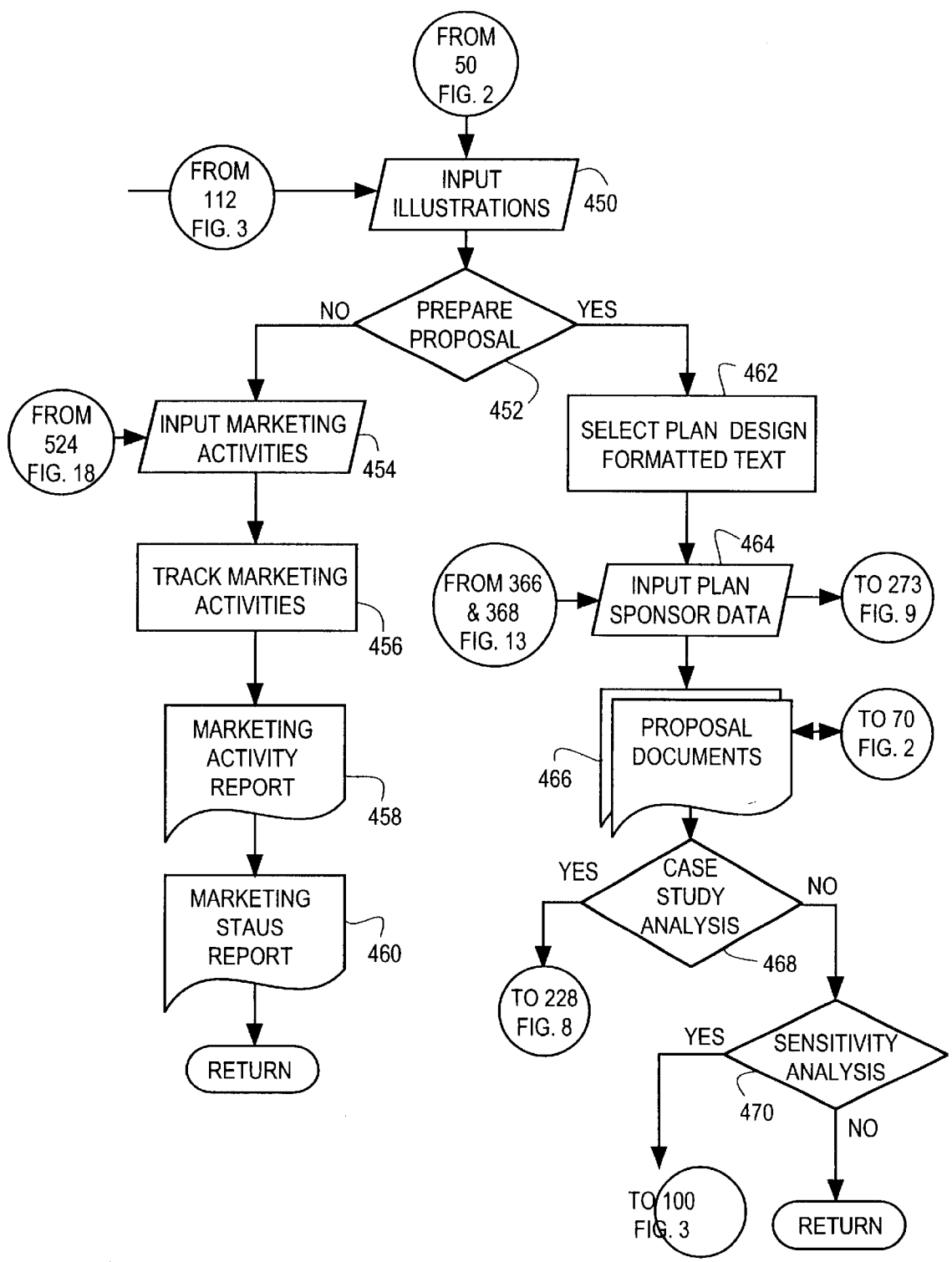
FIG. 16 is a logic flow diagram for the system used to market the replacement plan.

Inputs from Block 468, FIG. 16 will be used to adjust the Participants' Data for the preparation of case study analysis for various scenarios.

Moving to FIG. 9, the logic continues with the Replacement Plan Central Administration System, which administers the replacement plan by tracking the participants, measuring the benefit liabilities, generating accounting reports and issuing benefit distribution payments. The administration system is activated when the plan sponsor accepts a replacement plan for implementation. This database is maintained by the entity providing administrative services, such as a third-party administrator (TPA).

In Block 260, the logic continues with the Replacement Plan Central Administration Database, which stores all reference data inputs received and all on-going transactional inputs.

In Block 262, Participant Data is entered from the Replacement Plan illustration in Block 230, FIG. 8. If the census has changed since the last illustration, it is updated by the generation of a final implementation illustration, which is signed by the plan sponsor to verify the accuracy of the census data and plan design.

In Block 264, Replacement Plan Data is received from the Replacement Plan Menu, Block 200, FIG. 7, identifying the replacement plan selected. This input will trigger the administration format to be used by the database software for administering the plan. The specific plan design details and variations are entered in Block 262.

In Block 266, the Replacement Plan Funding data is received from Block 232 in FIG. 8, which identifies the amount of the initial contribution and any subsequent contributions to be used to fund the replacement plan.

Figure 10:
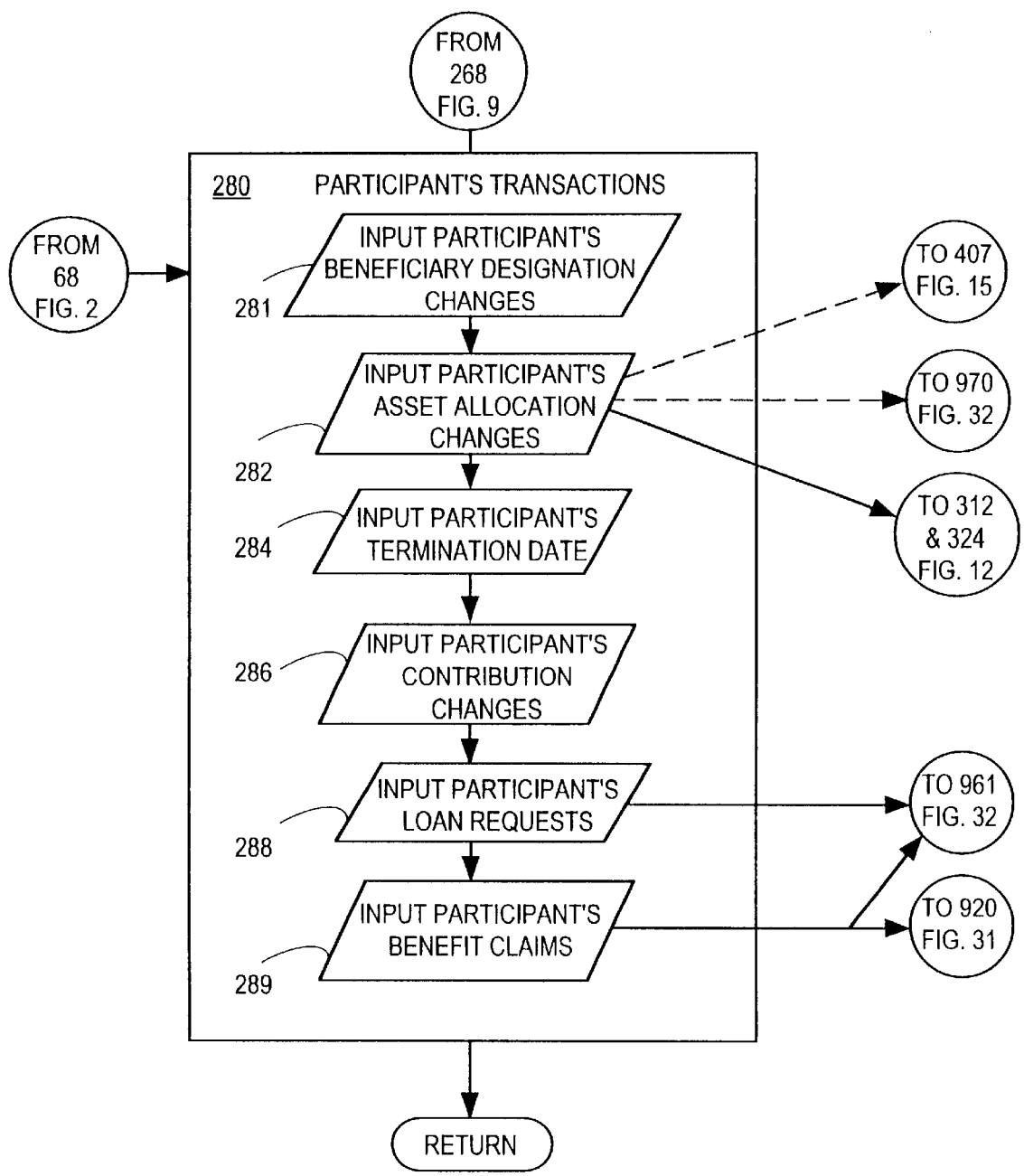
FIG. 10 is a logic flow diagram of the replacement plan participant's transactions affecting the replacement plan administering.

In Block 268, Participant Transactions inputs are received from Block 289, FIG. 10 and entered into the database in Block 260. These transactions are generally initiated by the participant, but may be initiated by the plan sponsor on behalf of the participant. For example, the participant may make a beneficiary change, while a plan sponsor will notify the administrator of a participant's employment termination, In Block 270, Replacement Plan Transactions inputs are received from Block 302, FIG. 11 and entered into the database in Block 260. These transactions may include such inputs as changes to the plan design, changes in asset allocation, contribution changes and changes in planned distributions.

Figure 12:
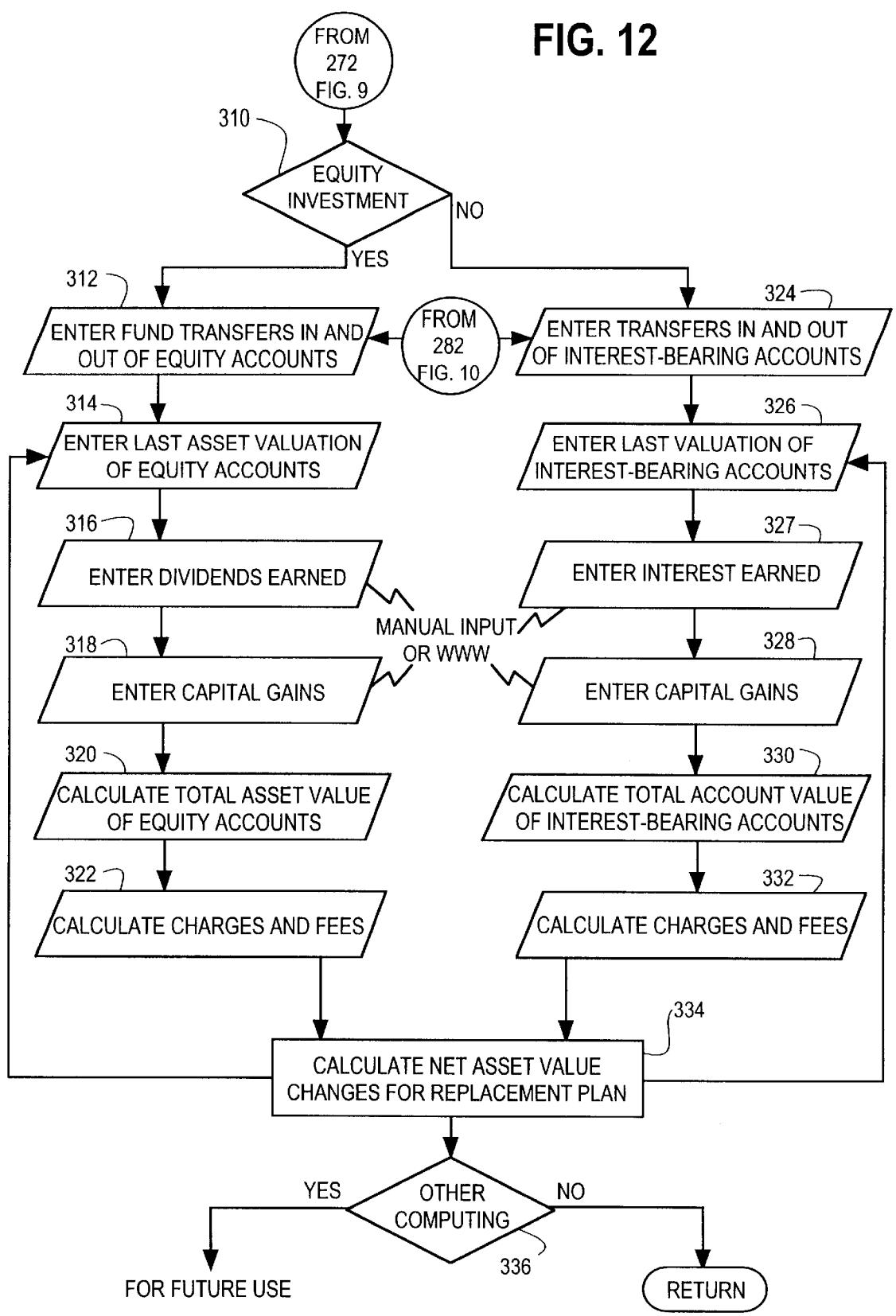
FIG. 12 is a logic flow diagram of the replacement plan funding transactions affecting the replacement plan administering.

In Block 272, Funding Transactions inputs are received from Block 336, FIG. 12 and entered into the database in Block 260. These transactions include the calculation of net asset value for the assets being used to measure the participant's benefit liability. For example, if a participant has selected the Standard & Poors 500 Index (S&P 500) as an investment for a replacement plan in which he is a participant, its value is used to measure the growth of the participant's benefit. However, the assets actually being used to fund the participant's liability may be and probably will be different investments.

In Block 273, the Plan Sponsor Data input is received from Block 464, FIG. 16, which is the plan sponsor data used in the marketing process. If any data has changed during the marketing process, it should be updated before entering the information into Block 273.

In Block 274, the logic continues with an input of whether to calculate benefit liabilities.

In Block 275, an input to Implementation Documents will generate the primary documents need to implement the replacement plan.

In Block 277, the administration computer will generate the Plan Sponsor's Administrative Guide. This document, delivered in hard copy or electronically, provides comprehensive details of the plan design and administrative requirements that must be met. The plan sponsor may elect to self-administer the plan or use the services of an outside provider. The contents of the Administrative Guide are unique for each replacement plan design, with a pre-written text that can be customized for the plan specifics.

Specimen 2 is a representation of the contents of a sample Plan Sponsor's Administrative Guide. The specimen presents a typical Table of Contents, which details the myriad of information items that can be included in a guidebook. Each Replacement Plan will have a unique Table of Contents tailored to the particular plan design. Likewise, each plan sponsor can have particular content to be included in the guidebook that is unique to the plan sponsor's methods of accounting or philosophy of doing business. The development of each Administrative Guide is a joint effort between the plan sponsor and the plan administrator to develop an useful tool for maintaining the integrity of the Replacement Plan and keeping all parties properly informed regarding the success of the plan in fulfilling the plan sponsor's objectives and goals in a cost-effective manner.

The sample Table of Contents for a Replacement Plan for a non-qualified deferred compensation plan funded with a life insurance policy. Each section contains needed reference materials. Section 1 provides information about the plan administrator and the contact listing for all parties involved. Section 2 explains the evolution of the plan design and its purpose for future management, who may not be a party to the replacement plan's implementation. Section 3 describes the process and criteria used to select the funding product and the particular investment options within that product. Section 4 includes the Replacement Plan Illustration and provides a place for annual performance reviews to measure the actual performance against the projected performance originally illustrated. Section 5 delineates the Plan Administration mechanics, with separate procedures for the phase of the plan in which the assets are being accumulated and the phase of the plan when the assets are being paid as benefits to the participants. In addition, Section 5 includes the procedures and forms to be used for participant transactions (ref. FIG. 10). Section 6 provides the procedures and instructions for transferring contributions into the Replacement Plan funding system, which is this invention. Section 7 is a calendar of events that need to be executed to efficiently service the Replacement Plan. The calendar is included as part of Specimen 2. Section 8 is the legal agreement that details the expectations of both the plan sponsor and the plan administrator in providing the plan servicing. Section 9 provides samples of the routine and custom reports generated by the plan administration system for both the plan sponsor and the participant. These reports will be further explained as additional specimens. Section 10 provides the plan sponsor with the forms needed for the life insurance policy and participant administration. Of course, the form and substance of such a manual is subject to change, and it may be provided in different formats, including electronically provided directly or indirectly from the Replacement Plan Administering Computer 20 to the Plan Sponsor's Computer 22 via a network.

In Block 279, the administrative computer will generate the Participant Enrollment Kit. This document, delivered in hard copy or electronically, provides the participant with the details of the replacement plan design, the final implementation illustrations, which detail the benefits of the plan for the participant, and the forms needed for the participant to enroll in the plan. The contents of the Enrollment Kit are unique for each replacement plan design, with a written text that can be customized for the plan specifics. The kit may also include information about the available ancillary individual financial services, as well as financial planning tools to help participants take the best advantage of the plan for their personal goals and objectives. For example, model portfolio asset allocations can be provided for the available investment choices, showing the various expected rates-of-return and associated risks.

Figure 32:
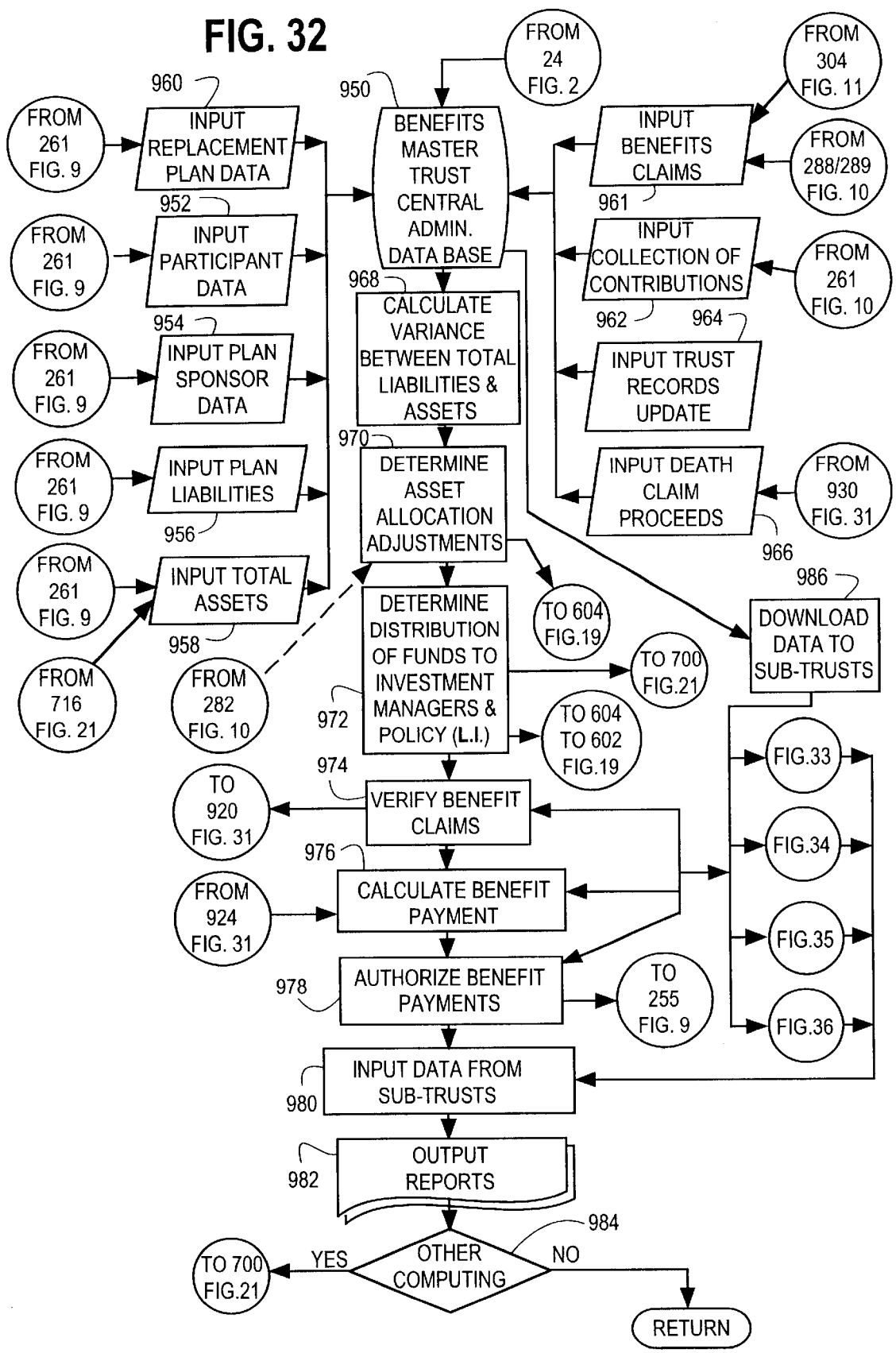
FIG. 32 is a overview logic flow diagram for the accounting of the benefits master trust for the administering of the replacement plan funding assets.

In Block 255, a Benefit Payment Authorization is received from the Benefits Trust, if a trust exists, Block 978, FIG. 32, directing the Plan Administrator to issue a benefit check to either the participant or the plan sponsor for the benefit of the participant. The amount of the payment is entered, as well as the currency denomination in which it is to be issued.

In Block 256, the benefit check is distributed, in hard copy or electronically, along with the appropriate government accounting and tax forms. For checks written to U.S. citizens, a Form W-2 or Form 1099 reporting the income to the U.S. Government can accompany the checks.

In Block 257, the amount of the benefit check is recorded and the reduction in the benefit liabilities is calculated and sent to Block 258 for further computing.

In Block 258, the administrative software calculates the Benefit Plan Liabilities. The calculation is performed by executing an equation that applies the actual investment returns for the investment options selected to the existing balance from the time of the participant's enrollment in the plan until the date of the current reporting period. The liabilities are calculated for each participant of each type of replacement plan, for each plan sponsor.

Figure 14:
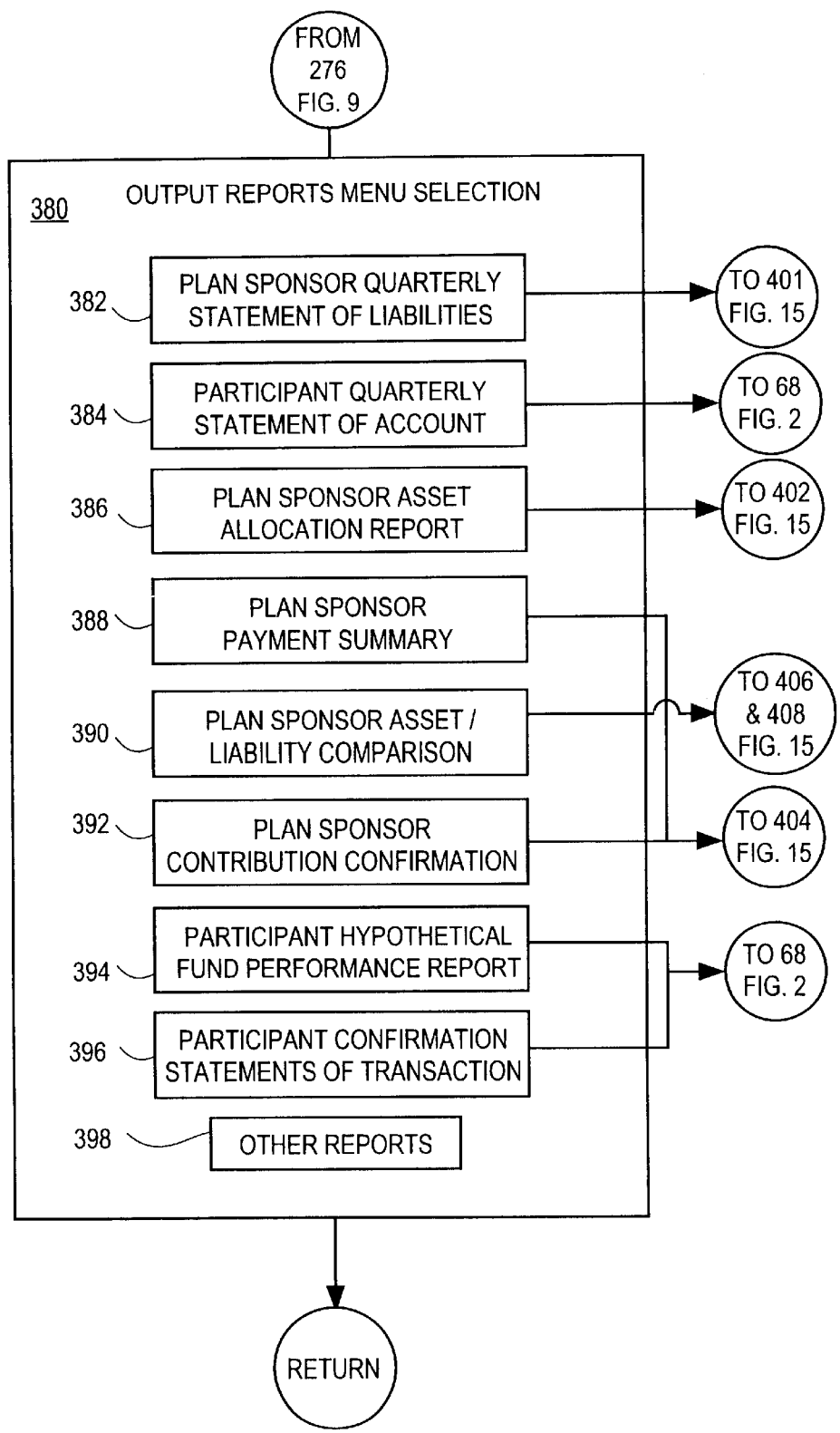
FIG. 14 is a diagram of an output report menu for the replacement plan administering.

In Block 276, the administrative computer accumulates the available data and generates the Output Reports, as described in Block 380, FIG. 14. The output reports are prepared for the plan sponsor, participant and Trustee of the benefits trust.

In Block 261, the use of a Benefits Trust is entered. If a trust is to be used, the information and data needed by the Trustee is downloaded from the Central Administration Database into the Benefit Trust Central Administrative Database, FIG. 32.

In Block 278, data is transmitted to other computers for related calculations. The total number of participants for each replacement plan is sent to the Revenue Accounting Computer 72, Block 1202, FIG. 37, for calculating the on-going annual Participation Fees. The total number of participants for each plan is sent to the Revenue Accounting Computer 72, Block 1208, FIG. 37, for calculating the annual Plan Administration Fee for each replacement plan. In addition, the total replacement plan liabilities is sent to the Benefits Master Trust Administrative Database, Block 956, FIG. 32, to be used by the Trustee to match assets against the liabilities.

Moving to FIG. 10, the Participant's Transactions are transmitted to and recorded in the Replacement Plan Central Administrative Database directly or indirectly from the Participant's Computer 68, or via the telephone, facsimile, or any other means that may become available over time.

In Block 281, the changes to the Participant's Beneficiary Designation are entered. It is intended that the replacement plans will all be placed to the participant's heirs via beneficiaries and therefore, avoiding the probate procedures of the participant's jurisdiction of domicile.

In Block 282, the changes to the Participant's Asset Allocation are entered. The participant's asset allocation will usually be different from the plan sponsor's allocation. The participant is allocating the investment choices included in the replacement plan, while the plan sponsor is allocating the actual investments being used to fund the plan's benefit liabilities. The participant's asset allocation is actually a phantom account used solely to measure the growth of the participant's benefit liability. The participant's asset allocation changes are also communicated to the Trust, Block 970, FIG. 32, and the plan sponsor, Block 407, FIG. 15, for use in adjusting the asset allocation of the assets held in the Trust. In addition, the participant's asset allocation changes the Replacement Plan Administrative System's Funding Transactions database, Blocks 312 and 324, FIG. 12, for use in determining the transfer of assets in and out of the equity and bond portfolios.

In Block 284, the Participant's Termination Date is entered. In the event the plan sponsor terminates the participant from the plan, either the plan participant or the plan sponsor enters the effective date of the termination. The termination date is used by the plan administrator to determine the participant's eligibility for future benefits for some plans. However, in other plans, such as the Cost Reduction Incentive Plan, the benefits are determined by vesting, and therefore, if termination occurs the day after the employee becomes a participant in the plan, the accrued benefits will not be affected by the termination.

In Block 286, the changes to the Participant's Contributions are transmitted by the participant and entered. In those plans that allow participant contributions, such as the Participant Voluntary Investment Plan and the Private Stock Option Plan, any increases or decreases in the participant's contributions will directly affect the benefits.

In Block 288, any Participant Loan Requests are entered for processing by the participant. Most of the Plans that provide for vesting, except the Private Stock Option Plan, will allow the Trustee to make secured loans to the participants as a trust investment. The loans cannot be secured by any assets of the trust or in the participant's account, unless the plan is using a Participant Grantor Trust arrangement, which is taxed at the time of implementation. This data is also transmitted to the Benefits Trust Central Administration Database, Block 961, FIG. 32, for processing.

In Block 289, the Participant's Benefits Claims are entered by the participant. These claims may be initiated by the participant based on eligibility created by vesting and/or trigger events, as defined by the plan document. This data is also transmitted to the Benefits Trust Central Administration Database, Block 961, FIG. 32, for processing. If the benefit claim is a death claim submitted by the participant's beneficiaries, the data will also be transmitted to insurance company, Block 920, FIG. 31, for processing.

Figure 11:
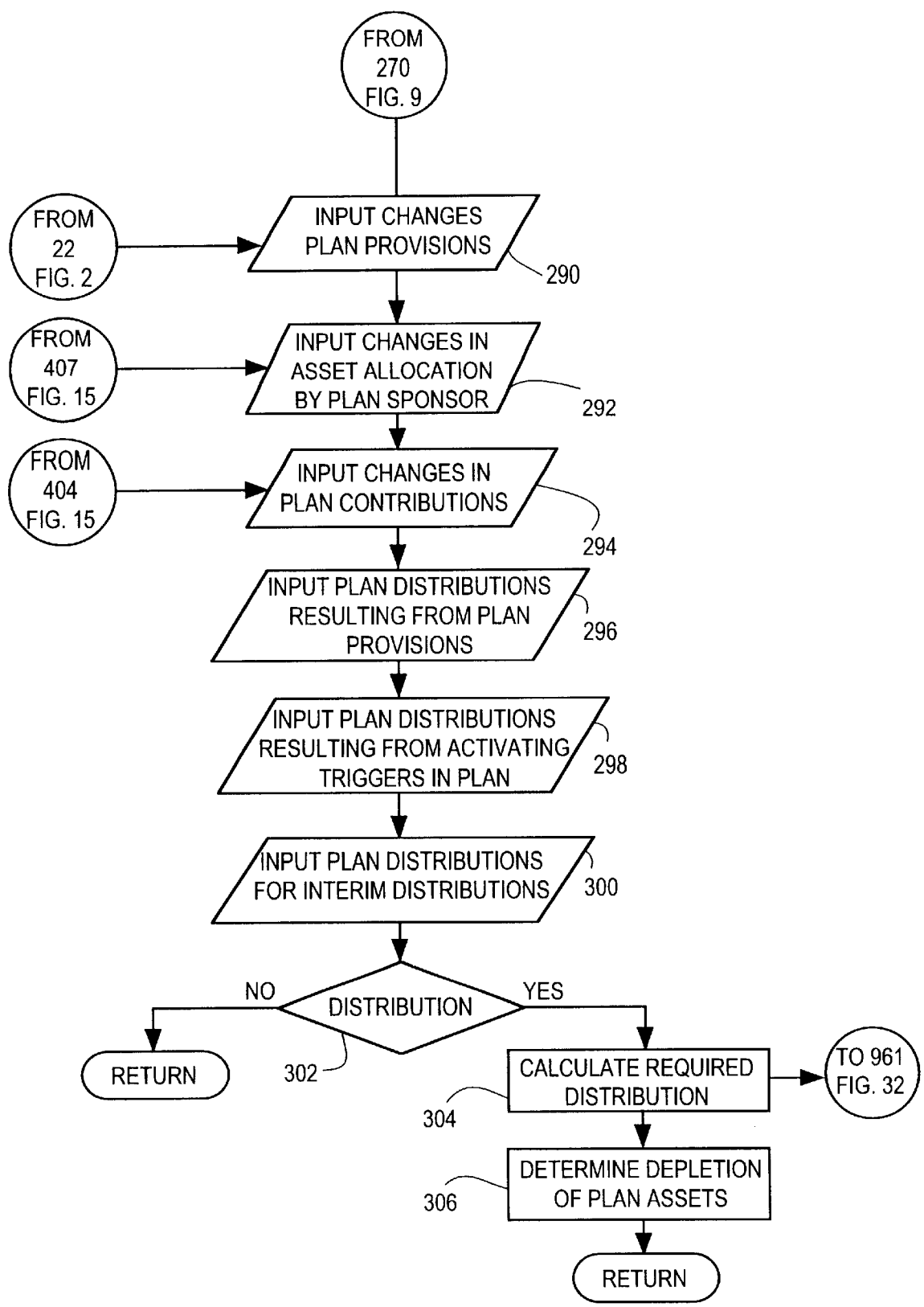
FIG. 11 is a logic flow diagram of the replacement plan sponsor's transactions affecting the replacement plan administering.

Moving to FIG. 11, the Replacement Plan Transactions are entered, recorded and transferred to the Replacement Plan Central Administrative Database.

In Block 290, Changes in Plan Provisions are received from the Plan Sponsor, Block 22, FIG. 2, entered and recorded in the Replacement Plan Central Administrative Database. These transactions will generally be amendments to the plan, which may include changes in the vesting provisions, changes in eligibility requirements, changes in benefit formulas, and any other provisions that might change the plan design.

Figure 15:
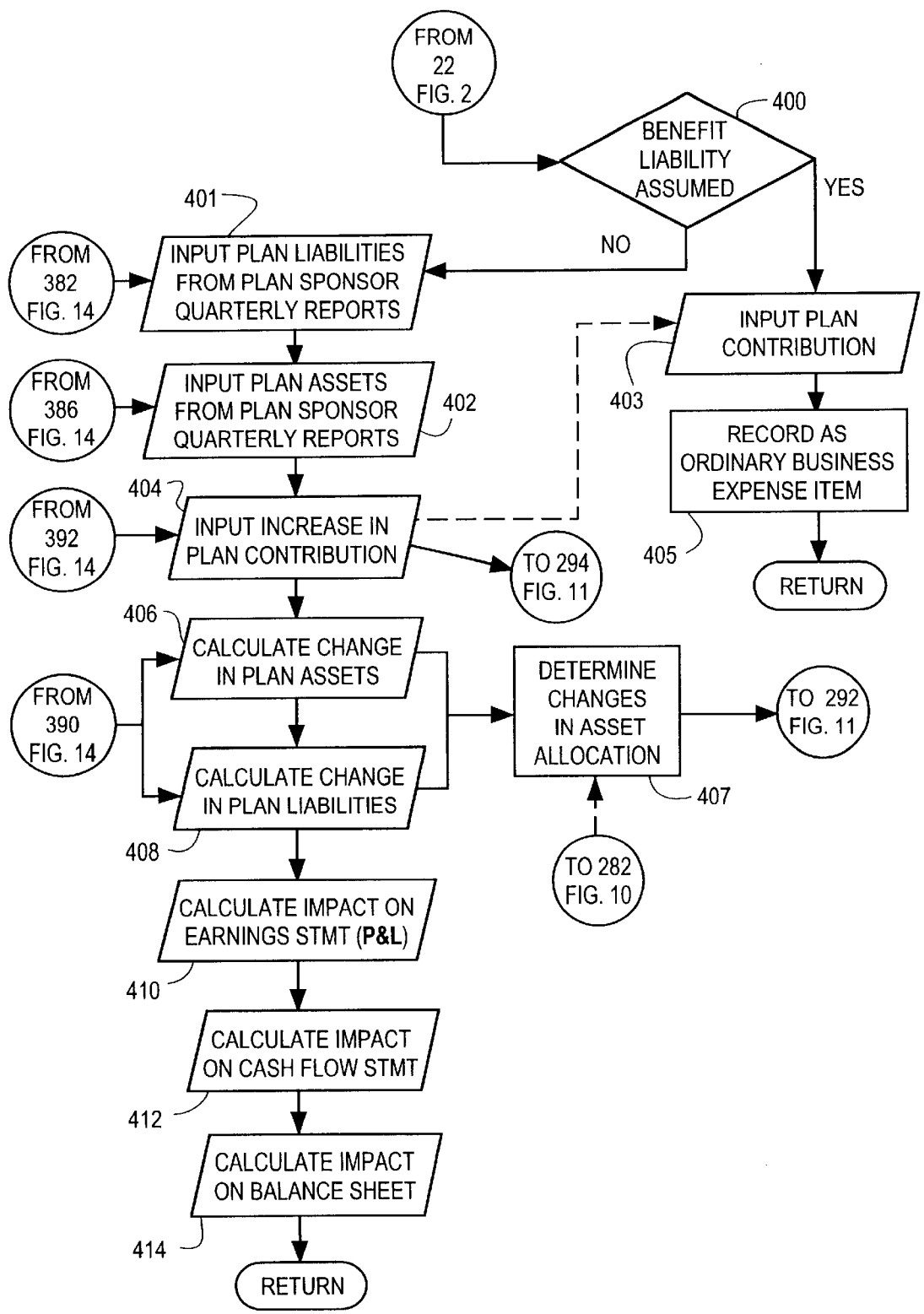
FIG. 15 is a logic flow diagram for accounting for the replacement plan by the plan sponsor.

In Block 292, Changes to the plan sponsor's Asset Allocation are received from the plan sponsor, Block 407, FIG. 15, entered and recorded in the Replacement Plan Central Administrative Database. Although the Trustee is ultimately responsible for the asset allocation, the plan sponsor can assist by working with the Trustee to determine the allocation of the funding assets that will best equal or exceed the liabilities created by the participants' allocation of the hypothetical investments.

In Block 294, Changes in Plan Contributions are received from the plan sponsor, Block 404, FIG. 15, entered and recorded to the Replacement Plan Central Administrative Database. A change in the plan contribution does not usually require an amendment to the plan document. Contribution changes are used to makeup under-funding deficits, compensate for over-funding, and increase the benefits payable. For example, if the Trustee determines that the trust assets have out-performed to liability created by the participants' allocations, the next contribution may be reduced to take advantage of the investment performance.

In Block 296, Plan Distributions required by the Replacement Plan provisions are received from the plan administrator, entered and recorded in the Replacement Plan Central Administrative Database. These transactions occur when the plan provisions provide for a benefit to be paid under the terms of the plan document. For example, if the plan calls for a benefit to be vested and paid in ten years, when the ten years end, the benefit will be paid.

In Block 298, Plan Distributions resulting from activating Plan Triggers are received from the plan administrator, entered and recorded in the Replacement Plan Central Administrative Database. Certain provisions can be added to the plan document that will trigger a distribution. For example, a plan provision might call for a distribution of the plan assets to the participants in the event of a hostile takeover of the plan sponsor.

In Block 300, Interim Plan Distribution requirements are received from the plan administrator, entered and recorded in the Replacement Plan Central Administrative Database. These transactions involve distributions allowed by the plan provisions prior to the regular distributions. For example, a plan may allow for an unscheduled partial distribution upon the participant's return to his/her home country after being on an assignment In Block 302, a Distribution decision is made. If a distribution is not required, the transactions are electronically transferred to the Replacement Plan Central Administrative Database. If a distribution is required, the logic continues.

In Block 304, the Required Distribution is calculated as of the date of the transaction, and transferred to the Replacement Plan Central Administrative Database. For example, if the plan document allows for a $10,000.00 interim distribution in the event of repatriation, a $10,000.00 benefit claim is transmitted to the Trustee, Block 961, FIG. 32, for processing.

In Block 306, the Depletion of the Plan Assets is calculated by totaling the distributions for any accounting period and reporting the result to the Replacement Plan Central Administrative Database.

Moving to FIG. 12, the Funding Transactions are entered and recorded in the Replacement Plan Central Administrative Database. The funding transactions include accounting for the growth of the participants' benefit liabilities. For the replacement plan, the participant will choose from a selection of investment vehicles or more likely, a selection of investment performance indices. The performance of the investments selected will determine the growth of the participants' benefit liabilities. However, the funding transaction addressed by this portion of the invention is a phantom account only and functions independently of the asset management associated with funding the plan. For example, the participant may select the S&P 500 Index Fund and a Salomon Government Bond Index for his/her investment selections, but no assets will actually be transferred into funds simulating those indices. The plan sponsor has the responsibility for investing the contributions made into the plan to meet the liabilities created by the participants.

In Block 310, the Fund Type is selected. The funding transactions are best tracked by considering equity investments and interest bearing (fixed income) investments separately. The sources of income, yield, and gains are different.

In Block 312, the funds transferred in and out of the equity funds are received directly from the plan participants' asset allocation changes recorded in the database, Block 282, FIG. 10, and entered. As asset allocations change, funds may be moved from one investment to the next. These transfers must be accounted for to accurately track the funds invested in a particular investment vehicle. In addition, distributions from an investment are tracked as transfers.

In Block 314, the last known asset value of the equity investments is received from the last calculation of the net asset value, Block 334, and is entered. If valuations are made daily, as is typical, yesterday's asset value can be entered as today's beginning balance.

In Block 316, any dividends received from equity investments are received directly from the Internet or some other electronic medium and are entered. Dividends are recorded on the distribution date.

In Block 318, realized and unrealized capital gains and losses from the sale of any equity assets are received Internet or some other electronic medium and entered. Mutual fund type equity investments have periodic capital gains and losses distributions from assets sold inside the fund.

In Block 320, the Equity Asset Value is calculated. The calculation starts with the last asset value, increased by the transfers in, dividends received, and capital gains, and decreased by the capital losses to realize the Equity Asset Value.

In Block 322, the investment management Charges and Fees are calculated, if they are not included in the asset value. If a $10,000.00 equity investment is the plan sponsor's stock, and a fee of 1% can be charged to sell the shares held, the $100.00 transaction fee can be calculated.

Moving to the Interest Bearing assets, in Block 324, the transfers in and out of the fixed income account are received directly from the plan participants' asset allocation changes recorded in the database, Block 282, FIG. 10, entered and recorded in a similar fashion as with the equity investments.

In Block 326, the last valuation of the fixed income account is received from the last calculation of the net asset value, Block 334, and entered. If valuations are made daily, as is typical, yesterday's asset value can be entered as today's beginning balance.

In Block 327, the interest earned during the period received directly from the Internet or some other electronic medium is entered. Interest income is usually credited on a daily basis.

In Block 328, any realized and unrealized capital gains are received directly from the Internet or some other electronic medium and are entered.

In Block 330, the Interest Bearing Account Value is calculated. The calculation starts with the last asset value, increased by the transfers in, interest income received, and capital gains, and decreased by the capital losses to realize the Interest Bearing Account Value.

In Block 332, the investment management Charges and Fees are calculated, if they are not included in the asset value. If a $10,000.00 fixed income investment is a corporate bond, and a fee of 1% can be charged to sell the bond, the $100.00 transaction fee can be calculated.

In Block 334, the Net Asset Value Change is calculated. The calculation basically combines the asset values of the equity account and the interest bearing account and subtracts the total fees and charges to derive the Net Asset Value. The fees and charges can include those administrative fees passed through to the participants and any other charges that may be applicable.

In Block 336, other computing requirements are entered. If none are entered, the logic returns to Block 272, FIG. 9.

Figure 13:
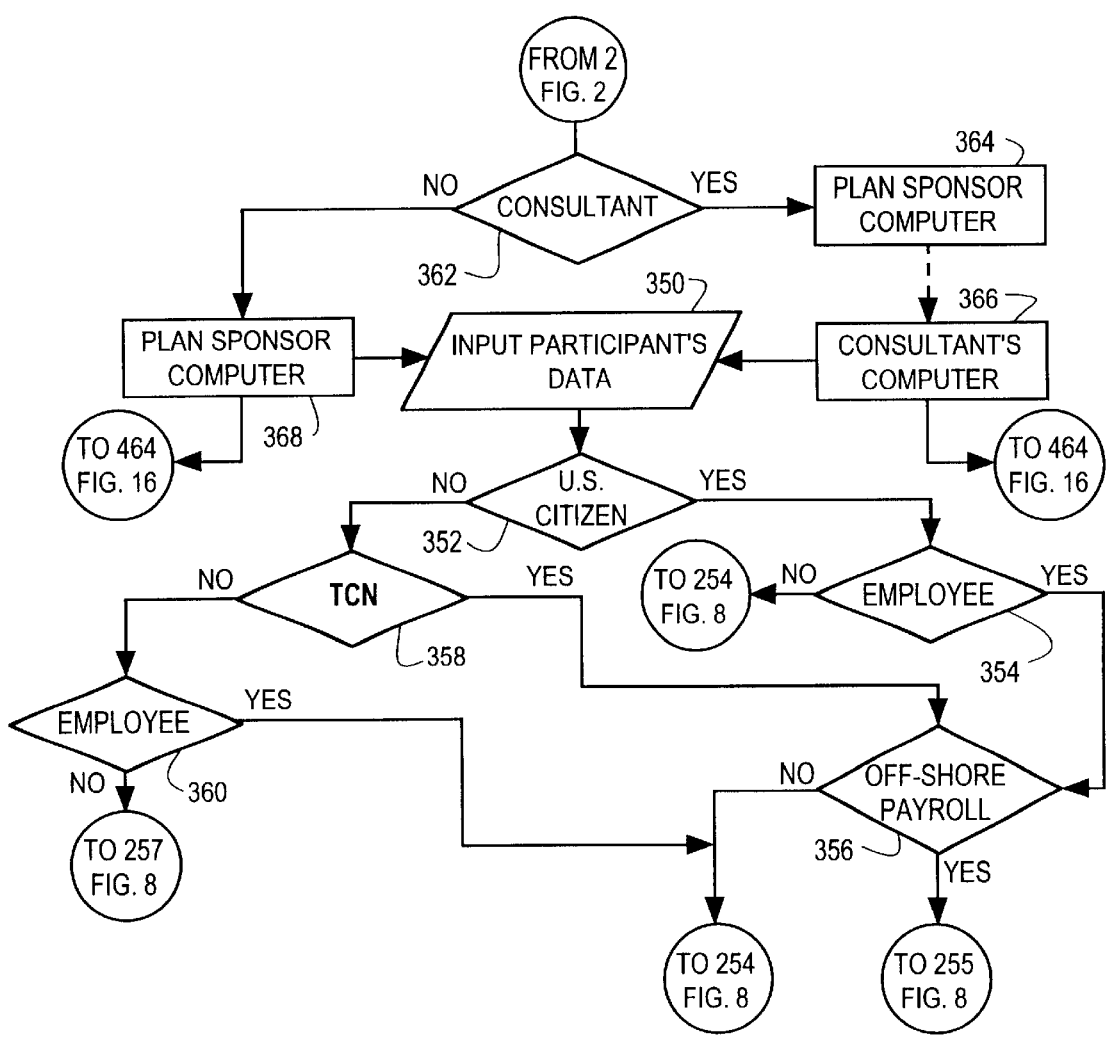
FIG. 13 is a logic flow diagram of inputting the participant's data into the replacement plan administering.

Turning to FIG. 13, the Participant's Data is entered for the generation of the replacement plan illustration in FIG. 8. In addition to providing the needed data for comparative illustrations, the objective is to determine the origin of the participant to better design the benefits solution.

As described in FIG. 2, there are at least two alternative approaches to collecting data. Either the logic is initiated by a consultant acting on behalf of a plan sponsor or by the plan sponsor directly. In Block 362, the data source is selected.

In Block 364, the plan sponsor's computer provides the consultant's computer, Block 366, with the needed data, which includes the participants' data and the plan sponsor data. The data will contain the participants' identification, contribution amounts, current account values, current ages, distribution ages, investment return, life expectancies, payment method, tax brackets, and any other needed data. The plan sponsor data can include the business name, address, communication numbers, investment return assumption, tax bracket, and any other needed data.

In Block 366, the consultant can add additional data to the plan sponsor's data and transmit it the participants' data to the replacement plan illustration system through Block 350, FIG. 13, and the plan sponsor data to the marketing computer through Block 464, FIG. 16.

In Block 368, the plan sponsor provides the needed participant directly to the illustration system through Block 350, FIG. 16 and the plan sponsor data to the marketing computer through Block 464, FIG. 16.

In Block 350, the Participant's Data is received from either the consultant or the plan sponsor and entered. The data input can include the participant's identification (either name or government identification number), age, citizenship, employment status, home country, host country, plan sponsor's home and host countries, distribution age, and the other data needed for illustrating a replacement plan.

In Block 352, U.S. Citizenship is entered. The participant is considered a U.S. citizen if he/she is a U.S. citizen located anywhere in the world. A foreign national with a valid "green card" is treated as an U.S. citizen.

In Block 354, if U.S. citizen is entered, the employment status of the participant is determined next. The participant is considered an employee if working for some other entity on a full time or part-time basis. If the participant is a U.S. citizen, but not an employee, the participant is considered self-employed and the data is transferred to the Central Computer 2 replacement plan illustration system through Block 256, FIG. 8.

In Block 358, if U.S. citizen is not entered, the determination of a third-country national (TCN) is entered. A TCN is a participant who is a citizen of one country working in a second country for a company, which is domiciled in a third country. For example, a German working in Japan for a U.S. company would be a TCN.

In Block 360, the employment status of the TCN is determined.

In Block 356, the use of an offshore payroll company is entered. An offshore payroll company is a separate company, usually located in a tax-haven jurisdiction, that hires employees from an employer and leases the employees back to the same employer, but in a foreign jurisdiction. For example, USCo would terminate an Employee X, who would be hired by USCo(Cayman) and transferred to USCo (Japan) to work. USCo(Japan) would lease Employee X from USCo (Cayman). When the assignment is over, Employee X is terminated from USCo(Cayman) and rehired by USCo. Offshore Payroll Companies and PEOs offer a cost-efficient way to maintain a global workforce.

If the U.S. citizen is on an offshore payroll and the non-U.S. citizen is a TCN on an off-shore payroll, their data is transmitted to the replacement plan illustrating system through Block 255, FIG. 8. If the U.S. citizen is not on an offshore payroll and the non-U.S. citizen employee is not a TCN, their data is transmitted to Block 254, FIG. 8. If the foreign national is not an employee, the participant's data is transmitted to Block 257, FIG. 8.

Turning now to FIG. 14, the Output Reports Menu Selection for the Replacement Plan Central Administrative System is used by the plan administrator/operator to select the report to be prepared.

In Block 380, the available reports are listed. The menu is expandable and additional reports can be added at the request of the plan sponsor or as needed by the plan administrator.

In Block 382, the Plan Sponsor Statement of Liabilities is selected. The quarterly liabilities statement is the principal report used by the plan sponsor and provides a listing of the plan sponsor's plans by participant. It is produced by aggregating all of the Participant's Statements of Account (see Specimen 3) and totaling the ending account balances, which is the total plan sponsor's liability. The statement can be produced monthly, quarterly, semi-annually and annually, or upon special request. The report is transmitted to the Plan Sponsor's Computer in Block 401, FIG. 15.

In Block 384, the Participant's Statement of Account is selected. The participant's account statement reports the current value of the benefit plan account, as measured by the performance of the benchmark investments selected. It can be formatted to display the benefit by contribution dates or benefit distribution dates. The statement can also displays the current asset allocation. The statement can be produced monthly, quarterly, semi-annually and annually, or upon special request. This report is transmitted to the participant's computer 68, FIG. 2.

Specimen 3 is a representative sample of a Participant's Statement of Account for a Replacement Plan for a Deferred Compensation Plan. The Beginning Balance is the value of the benchmark investments at the beginning of the measurement period, which is normally the Ending Balance of the previous participant statement. The Deferral (contribution) amounts include all new funds contributed by the participant and/or plan sponsor during the measurement period to the Replacement Plan. Under each benchmark fund is listed the source of the contribution, which can change depending on the plan design. The Transfers Realign column indicates the new funds moved into benchmark investments, as well as asset allocation changes. Positive entries represent money transferred in and negative entries represent money transferred out. Positive entries and negative entries must balance to zero. Benefit Payments made to the participant are subtracted from the appropriate funds. The Earnings column includes all earnings or (losses) during the measurement period. The Ending Balance is the sum of the other columns and represents the plan sponsor's liability to the participant. The Ending Balance will be the Beginning Balance for the next reporting period.

In Block 386, the Plan Sponsor Asset Allocation Report is selected. The asset allocation report displays the current asset allocation of the total participant population for each of the plan sponsor's plans. The report can also have a summary of the performance of the participant's total allocation to use to compare to the performance of the plan sponsor's asset allocation used to fund the plan. The plan sponsor uses this report to determine the need to reallocate the plan sponsor's funds invested to meet the participant liabilities. This report is transmitted to the plan sponsor's computer in Block 402, FIG. 15.

Specimen 4 is a representative sample of the Plan Sponsor Asset Allocation Report for a Replacement Plan for a Deferred Compensation Plan. The current hypothetical fund allocation is the aggregate allocation of all participants benchmark fund balances. The allocation is presented in both currency and percentages. Each benchmark investment is listed, with the fund manager's name for reference. The amounts invested in each fund by all participants are provided as the Total Balance. The percentage of each fund to the total is displayed in the Allocation column. The percentage allocation will always total to 100%.

In Block 388, the Plan Sponsor Payment Summary is selected. This report summarizes the benefit payments that have been made during any reporting period for each participant. The plan sponsor uses this report for budgeting. This report is transmitted to the plan sponsor's computer in Block 404, FIG. 15.

Specimen 5 is a representative sample of a Plan Sponsor's Payment Summary report for any Replacement Plan. The Payment Summary provides the plan sponsor with a summary of payment activity by participant. Payments are segregated on the report by source and benchmark fund.

In Block 390, the Plan Sponsor Asset and Liability Comparison Report is selected. This report compares the plan sponsor's benefit liabilities for a particular plan to the plan sponsor's assets invested to fund the liabilities. To the extent there is a surplus or deficit of assets, the plan sponsor uses the report to measure the variance and adjust the investment strategy and/or contribution level to meet the objectives. This report is transmitted to the plan sponsor's computer in Blocks 406 and 408, FIG. 15.

Specimen 6 is a representative sample of the Plan Sponsor Asset and Liability Comparison Report for a Replacement Plan for a Deferred Compensation Plan. This report is an expanded version of the Plan Sponsor Asset Allocation Report (see Specimen 4). Like the Asset Allocation Report, the Liability Fund Balance section is reporting the aggregate allocation of all participant fund balances in the Total Balance column. In addition, in the Vested Balance column, it details the vested liability balances of the participant liabilities. In the Asset Fund Balance section, the plan sponsor's actual investments held in the insurance policy owned by the Trustee of the Benefits Trust (FIG. 32) are itemized by investment manager. The Vested Balance column is reserved for detailing those assets that are vested and pending distribution as benefit payments. At the bottom of the report the Difference line calculates the amount of plan liabilities over and above the assets available to fund the replacement plan held in the trust.

In Block 392, the Plan Sponsor Contribution Confirmation report is selected, which confirms the receipt of cash contributions to a plan. The report shows the amount of the contribution and compares it against the amount scheduled to be contributed. This report is transmitted to the plan sponsor's computer in Block 404, FIG. 15.

Specimen 7 is a representative sample of the Plan Sponsor Contribution Confirmation report for a Replacement Plan for a Deferred Compensation Plan. Confirmation statements are produced for various transactional activities with the Replacement Plan administration process. The most frequently generated confirmations are for contributions, asset allocation changes and benefit payments. The Contribution Confirmation is sent to the Plan Sponsor to confirm the source, amount and allocation of any contribution made to the Replacement Plan trust investments on behalf of each participant. Confirmations can also be sent to participants.

In Block 394, the Participant's Hypothetical Fund Investment Performance Report is selected. This report is used by participants to determine the performance of their hypothetical portfolio and make asset allocation decisions. This report is sent to participant's computer 68, FIG. 2, to report the performance of their hypothetical investments used to measure the benefit liability.

Specimen 8 is a representative sample of the Participant's Hypothetical Fund Investment Performance Report for a Replacement Plan. This report summarizes the investment activity of all hypothetical benchmark funds associated with the participant's Replacement Plan benefit liability during the reporting period. This report provides the participants a detailed accounting of the fluctuations associated with their multiple benchmark portfolio. The Percentage Change in Value and YTD Percentage Change columns help participants analyze the earnings and losses in their hypothetical portfolio. The data is downloaded from the fund managers or through a network to produce the report.

In Block 396, the Participant Transaction Confirmation Statement is selected. This is an on-demand statement used to confirm participant initiated transactions. For example, if a participant makes a beneficiary change, a statement is sent confirming the beneficiaries added and those deleted, as well as the effective date. More common are confirmations for realignment of the asset allocation for their hypothetical investment funds and confirmation of benefits paid. These reports are transmitted to the participant's computer 68, FIG. 2.

Specimen 9 is a representative sample of Participant Transaction Confirmation Statements for a Replacement Plan. A Realignment Confirmation is issued when a participant realigns the percentage of assets held in each hypothetical fund detailing the source of the instruction, the effective date and the new asset allocation percentages. The Payment Confirmation is produced indicating the amount, source and date of payment for any benefit payment made to the participant, whether a lump sum or annuity-type payment.

In Block 398, the Other Reports selection is used for expanding the menu with additional reports to be created as needed.

Turning now to FIG. 15, the logic continues with the plan sponsor's accounting for the replacement plan in its financial statements. The accounting is an important part of the plan sponsor's decision to implement a replacement plan. In this invention, at least two accounting scenarios are available. The first is the traditional method of accounting for the benefit as a balance sheet liability and the increase in benefits as an earnings statement item.

The second scenario, not readily available before this invention, is the assumption of the fiduciary responsibility for the benefit liability by a third-party benefit provider. In this case, the plan sponsor out-sources the entire benefit liability and the accounting is limited to an expense entry. The provider then assumes the fiduciary responsibility of the plan sponsor.

The logic continues in Block 400, where the Assumption of Benefit Liability is entered.

Block 403 receives the entry that the benefit liability is being out-sourced to a third-party provider and inputs the total plan contribution from the plan administrator's Contribution Confirmation Report in Block 392, FIG. 14. For example, if the plan is for 400 employees, with a total confirmed contribution of $4,000,000.00, the $4,000,000.00 is entered.

In Block 405, the total contribution is recorded as an ordinary business expense on the earnings statement, and may be a tax-deductible item, depending on the plan sponsor's tax situation. No further plan sponsor accounting is required.

If the liability is not being assumed, Block 401 receives an input of the plan liabilities from the Plan Administrator's Statement of Liabilities Report in Block 382, FIG. 14. Generally, plan sponsors prepare quarterly financial statements, and therefore, the plan administrator prepares reports quarterly. However, reports and reports can be prepared at any interval.

Block 402 receives input of the Plan Assets from the Plan Administrator's Asset Allocation Report, Block 386, FIG. 14. The plan assets are the total of the assets held in trust to fund the plan sponsor's plan.

Block 404 receives input of the increase in Plan Contributions Assets from the Plan Administrator's Contribution Confirmation Reports, Block 392, FIG. 14. This input is of the contribution made since the last reporting period. For example, if the plan calls for a quarterly contribution of $100,000.00 and the payments have been made in a timely manner, the increase in plan contributions for the current quarterly reporting period can be $100,000.00. This data is provided to the Plan Administrator as a Plan Transaction in Block 294, FIG. 11.

In Block 406, the data inputted from the Plan Administrator's Asset/ Liabilities Comparison Report, Block 390, FIG. 14, is used to calculate the Change in Plan Assets. The calculation is based on subtracting the total assets at the beginning of the period from the assets at the end of the period, resulting in the change in value. The change will be either an increase or decrease in assets.

In Block 408, the data is inputted from the Plan Administrator's Asset/Liabilities Comparison Report, Block 390, FIG. 14 and is used to calculate the Change in Plan Liabilities. The calculation is based on subtracting the total liabilities at the beginning of the period from the liabilities at the end of the period, resulting in the change in value. The change will be either an increase or decrease in liabilities.

In Block 407, the calculated results from Blocks 406 and 408 are used to determine Changes in Asset Allocation, which is transmitted to the Plan Administration Central Computer, Block 292, FIG. 11, to be entered into the system as a plan transaction. Input is also communicated regarding the participants' asset allocation for planning purposes from Block 282, FIG. 10.

In Block 410, the Impact on the Earnings Statement is calculated. The calculation is based on the difference between the financial results with and without the replacement plan. Depending on the replacement plan design, the earnings impact may be different for each plan design. The plan design system includes the earnings impact calculation, but in general, the earnings impact will be the increase in earnings on the benefit liabilities.

In Block 412, the Impact on Cash Flow is calculated. The calculation is based on the difference between the financial results with and without the replacement plan. Depending on the replacement plan design, the cash flow impact may be different for each plan design. The plan design system includes the cash flow impact calculation, but in general, the cash flow impact will be the increase in contributions and benefits paid.

In Block 414, the Impact on the Balance Sheet is calculated. The calculation is based on the difference between the financial results with and without the replacement plan. Depending on the replacement plan design, the balance sheet impact may be different for each plan design. The plan design system includes the balance sheet impact calculation, but in general, the balance sheet impact will be the increase in benefit liabilities.

Moving to FIG. 16, the Marketing Computer prepares proposals and tracks marketing activities. The marketing system will be used by the consultant, as well as by others. It is linked to the Central Computer, the administrative computer, and the consultant's computer.

Block 450 receives the illustrations as input from the central digital computer, Block 112, FIG. 3. The illustrations are in spreadsheet form, without supportive and explanatory text.

In Block 452, the decision to prepare a Proposal is entered. A proposal is prepared for a potential plan sponsor that wants to analyze the financial and human resources impact of installing a replacement plan.

Figure 18:
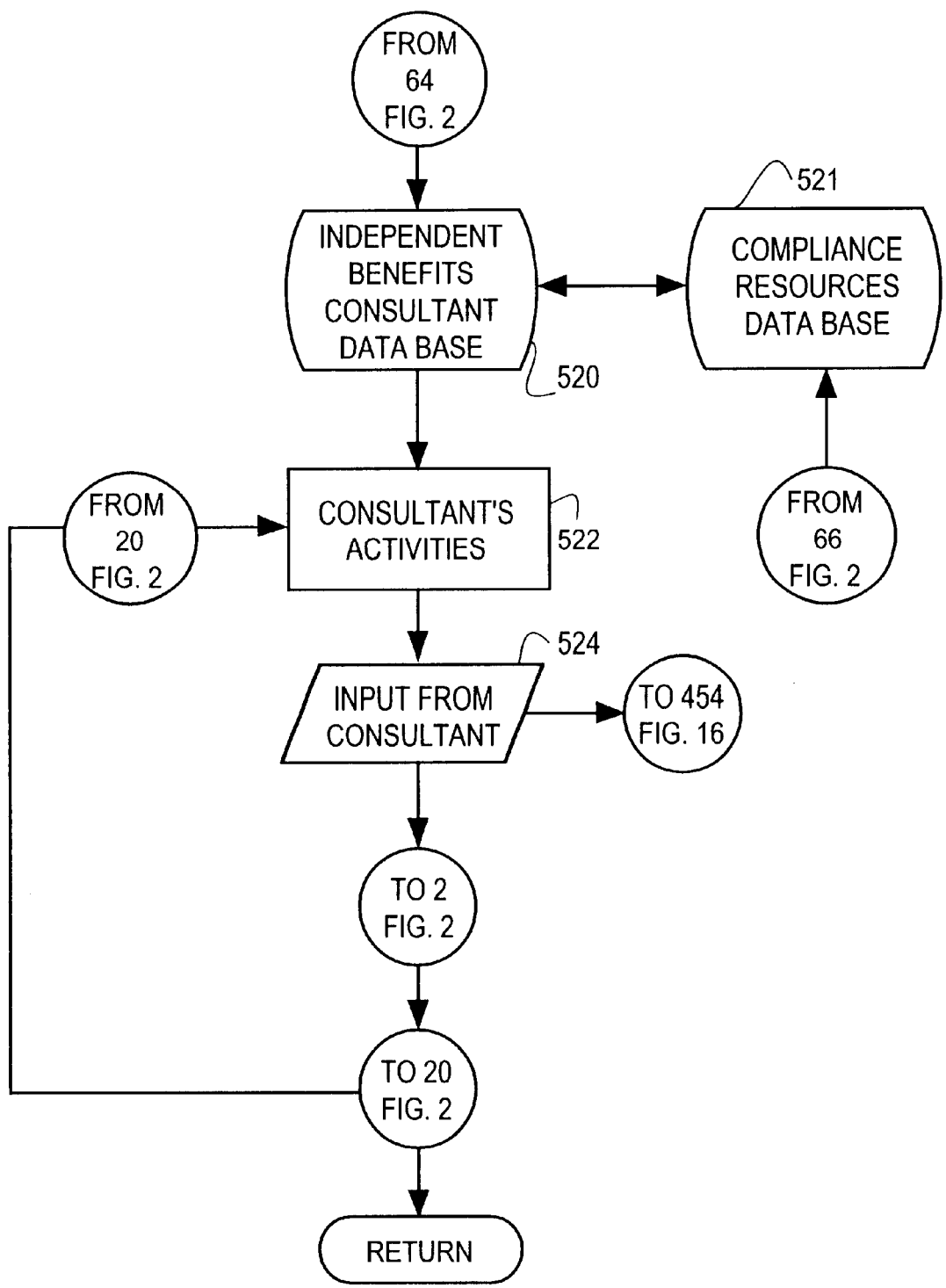
FIG. 18 is a logic flow diagram for a consultant's computer system used to provide replacement plan consulting to plan sponsor's and participants.

If not preparing a proposal, Block 454 receives input of Marketing Activities from the illustrations that are generated and from the consultant's activities reported from Block 524, FIG. 18. Marketing activities include such information as the plan sponsor's name, location, plan design, date of last contact, date of next contact, marketing process status, marketer's name and company, and similar information that might be needed by management.

Block 456 Tracks the Marketing Activities using database software to organize the marketing data. It is anticipated that there will be several marketers from different companies marketing the replacement plans. The tracking system will track the marketing activities by marketer and by plan design. For example, the database will track the activity for ABC Consulting Firm, while also tracking all of the firms that have presented a particular replacement plan, such as the Private Stock Option Plan.

In Block 458, the database generates a periodic Marketing Activity Report in written and electronic formats. The report details the information in the database relative to calls, prospects, proposals outstanding, and other related information, organized by marketer and plan design. The report is updated at least weekly and can be accessed electronically at any time.

In Block 460, the database generates a periodic Marketing Status Report in written and electronic formats. The report details the information in the database relative to the progress of plan sponsor's through the sales and implementation processes organized by marketer and plan design. The report can also contain completed sales transactions with marketer's revenue totals. The report is updated at least weekly and can be accessed electronically at any time.

If a proposal request is inputted, Block 462 receives input from the marketer or from the computer's memory of pre-formatted text that supplements and explains the illustrations. The text will contain technical references and can be customized to be client specific.

Block 464 receives an input of the plan sponsor's data from the consultant's computer, Block 366, FIG. 13, or from the plan sponsor's computer, Block 368, FIG. 13. The plan sponsor data includes the plan sponsor's name, address, contact persons, decision makers, telephones, faxes and e-mails, current plan data, replacement plan interest, tax data, and other pertinent information. This data is also transmitted to Block 273, FIG. 9, which is the Plan Administration Database.

In Block 466, the Proposal Documents are generated for presentation to the client. The proposal is comprised of the Replacement Plan illustrations and text, which has been customized to conform to the plan sponsor's data. The proposal text will parallel the Plan Sponsor's Administrative Guidebook (see Specimen 2) in form and content, except that it will be presented in more of a marketing format. It will explain the purpose of the Replacement Plan and the rationale for the plan design, as well as detail the product selection process and the conclusions on product and investment options selection. In addition, the implementation and participant enrollment procedures are outlined. Likewise, the plan administration services can be outlined to ensure the long-term success of the Replacement Plan. The text supporting the Replacement Plan illustration can explain the financial impact of the Replacement Plan's economics on the plan sponsor's financial statements. The proposal is manually packaged for presentation to the client.

If the consultant wishes to prepare additional case study or sensitivity analysis independent of this invention, the proposal documents can be transmitted to the consultant's case study/sensitivity analysis computer 70, FIG. 2. The additional case studies and sensitivity analyses can also be included in the proposal documents.

In Block 468, a decision is made to prepare case study analysis within this invention. If after reviewing the proposal, the client wishes to review one or more case studies, the process returns to the illustration of the Replacement Plan, Block 228, FIG. 8 to generate a new illustration with different data.

If a case study is not requested, Block 470 requires a decision on preparing a sensitivity analysis within this invention. If a sensitivity analysis is requested, the data is transmitted to the Central Computer, Block 100, FIG. 3, to rerun the entire comparative illustrations using different assumptions. If additional analysis is not required, the logic returns to the marketing computer 50.

Figure 17B:
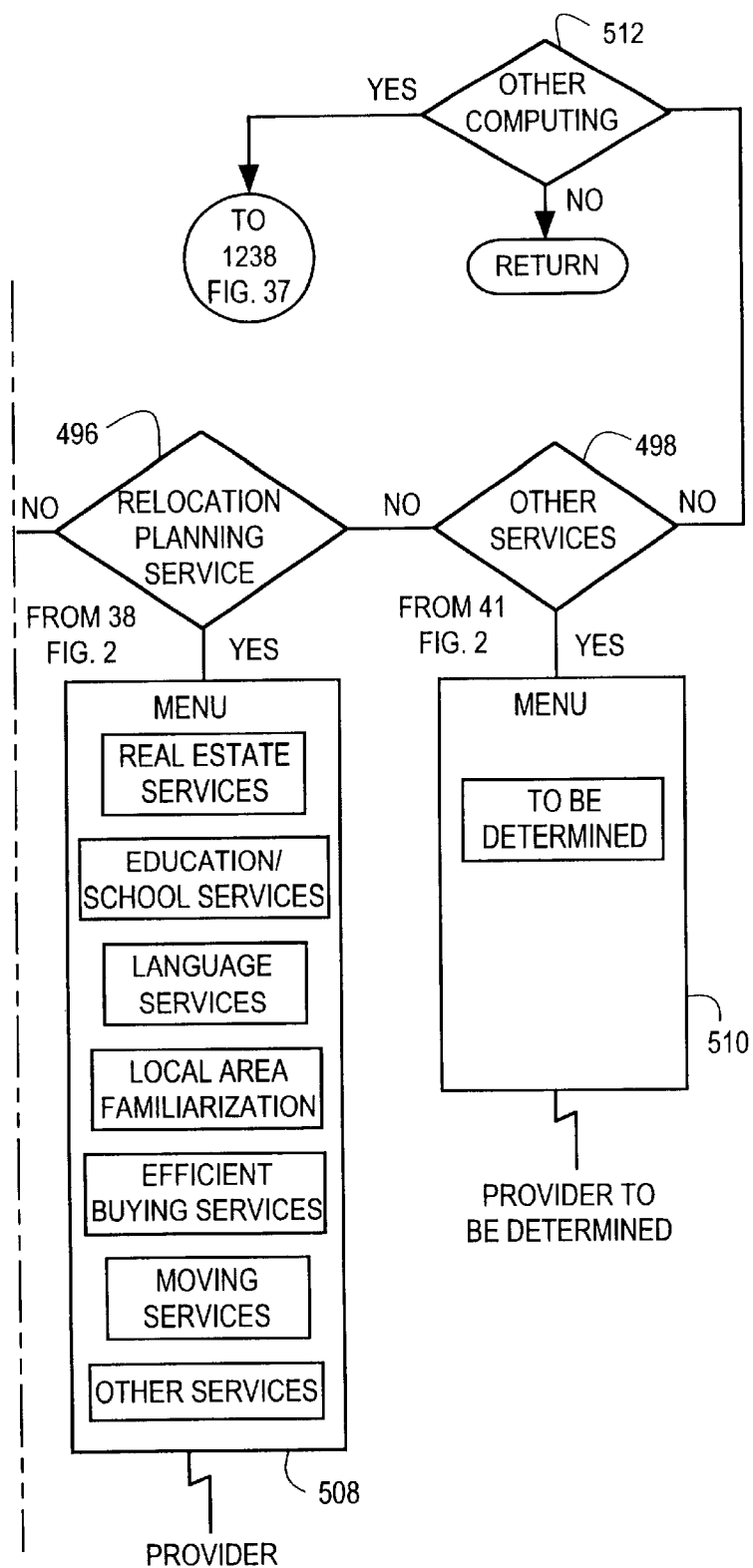
FIG. 17 is a logic flow diagram for providing additional services to the replacement plan participants via the Internet and other electronic and non-electronic networks.

Turning now to FIG. 17, the system provides ancillary financial services to the replacement plan participants, which are intended to assist them in their individual financial affairs and supplement the benefits provided through the replacement plan. The services are provided by world-class financial institutions with extensive expertise and experience. The services are accessible through the Internet, telephone, fax, mail, e-mail and any other practical means. These services do not require a plan sponsor, but may be endorsed by a plan sponsor. They can also be offered as stand-alone services, not connected to a replacement plan.

The logic continues in Block 480, which receives an input of the Eligible Employees from the Consultant's Computer 64, FIG. 1, the Plan Administration Central Database, Block 260, FIG. 9, and/or the Plan Sponsor's Computer 22, FIG. 2. The participant can also make direct contact through the Participant's Computer 68, FIG. 2. To control the access, a password may be used. Eligibility is based on being a plan participant and/or enrolled by a consultant or provider, with sufficient assets to benefit from the services, as defined by the providers.

The logic continues in Block 482 where the eligible participants are contacted in writing or electronically to inform them of the services. Notification may also be provided in the replacement plan participant's enrollment kit with the plan sponsor's approval.

In Block 484, the participant may access the services via the Internet or some alternative network.

In Block 486, the participant responds by using the Participant's Computer 68 to access the Internet or other network to review the selection of available products and services.

In Block 488, the participant decides to access Private Banking Services, which can be provided by one or more financial institutions.

In Block 500, Private Banking Services is selected and the participant is presented a menu of products and services from which to choose those that are of most interest or best suits the participant's needs. Each institution will decide independently which services to provide, but the typical services include cash management, lending, letters-of-credit, personal financial statement preparation, and other similar services. As the participant selects a particular product or services, a list of providers of the particular products or services can be displayed, from which the participant makes a selection. At that time, the selected provider's marketing and other presentation materials will be displayed on the Internet/network for the participant's review. The participant may subsequently contact the selected provider by telephone, fax, letter, e-mail, or directly through the network being used. This initial contact can be to obtain additional information or to transact business. The providers' computers will store independent software programs to prepare and provide the products and services being offered by that provider. To build the system to provide the services in Block 500 simply requires the adaptation of the providers' current computer that are being used to provide traditional transactional banking services, such as checking accounts, loans, and other similar services.

Specimen 10 is a representative sample of a draft brochure offering private banking services for overseas participants. The brochure offers the services needed by participants and can be accessed by the Internet.

In Block 490, the participant decides to access Investment Management Services, which can be provided by one or more financial institutions In Block 502, Investment Management Services is selected and the participant is presented a menu of products and services from which to choose those that are of most interest or best suits the participant's needs. Each institution will decide independently which services to provide, but the typical services include asset allocation, fixed income management, equity management, tax-efficient investments, Guaranteed Return Income Plan, performance reporting, manager selection, and other similar services. As the participant selects a particular product or services, a list of providers of the particular products or services can be displayed, from which the participant makes a selection. At that time, the selected provider's marketing and other presentation materials will be displayed on the Internet/network for the participant's review. The participant may subsequently contact the selected provider by telephone, fax, letter, e-mail, or directly through the network being used. This initial contact can be to obtain additional information or to transact business. The providers' computers will store independent software programs to prepare and provide the products and services being offered by that provider.

To build the system to provide the services in Block 502 requires the integration of several different software capabilities. First, the provider's computer can prepare a financial analysis of the participant's goals and objectives, relative to participant's current assets and net worth, to determine the required net-after-tax rate-of-return required for funding the goals, based on agreed assumptions regarding tax rates, inflation and cash flow capabilities. The next step can be to use the required Rate-of-Return as a benchmark for a second software package that could use the principles of Modern Portfolio Theory to develop an Efficient Frontier analysis to determine the optimum portfolio with the desired expected rate-of-return and the lowest risk, as measured by standard deviations. Next, the optimized portfolio can be used to develop a Strategic Investment Plan, which can be the asset allocation used to actually allocate funds among cash, fixed income, equity, and hard asset investments funding the strategic investment plan. The Strategic Investment Plan is the primary tool for providing investment management services. It establishes the benchmark against which performance is measured and provides the investment mangers a detailed guideline for selecting specific investments for the participant. In addition, an investment policy can also be formulated from the Strategic Investment Plan to provide a formal guideline for investment managers.

The third step in providing investment management services involves administering the strategic investment plan in accordance with the investment policy. If desired, a different software package can be used to administer the investments. This software can track cost basis, investment amounts, investment performance, and tax consequences, while producing reports that show the participant how the portfolio is performing by asset class, subclass, and individual investments. This administration database software can also be used to track the performance of independent investment managers, who may be selected by the participant to manage investments, by compiling the data from their periodic reports or by direct download via the Internet or other network.

All of these software functions can be found in commercial packages on the market. This invention provides the delivery system.

Specimen 15 is a representative sample of a Strategic Investment Plan for a Replacement Plan Participant that can be provided through the Investment Management Internet Services and the Financial Planning Internet Services. The Strategic Investment Plan (SIP) divides the participant's investable assets into the four main asset classes of cash, fixed income, equities, and hard assets. Based on a separate financial analysis, the Strategic Allocation benchmark is shown on the left of each asset class and is designed to result in a 10% net after-tax rate-of-return, based on historical data using Modern Portfolio Theory. Each asset class is divided into sub-classes, with specific investments selected for each sub-class. The Security Percent Allocation for each specific investment is then shown. Based on the specific allocation, the Asset Class Allocation is determined for comparison to the Strategic Allocation. In this representative sample, the 63.61% equity allocation exceeds the Strategic Allocation of 55% and the hard asset allocation is less than the 10% Strategic Allocation, which reflect ed the participant's personal desire to not invest in real estate or other hard assets. At the end of the schedule, the percentages all add to 100% and the total of the allocations to the investment securities totals the available investable assets.

In Block 492, the participant decides to access Financial Planning Services, which can be provided by one or more financial institutions.

In Block 504, Financial Planning Services is selected and the participant is presented a menu of products and services from which to choose those that are of most interest or best suits the participant's needs. Each institution will decide independently which services to provide, but the typical services include tax planning, cash flow planning, retirement planning, investment planning, estate planning, insurance planning, education funding, specific goals funding, and other similar services. As the participant selects a particular product or services, a list of providers of the particular products or services can be displayed, from which the participant makes a selection. At that time, the selected provider's marketing and other presentation materials will be displayed on the Internet/network for the participant's review. The participant may subsequently contact the selected provider by telephone, fax, letter, e-mail, or directly through the network being used. This initial contact can be to obtain additional information or to transact business. The providers' computers will store independent software programs to prepare and provide the products and services being offered by that provider.

To build the system to provide the services in Block 504 requires the integration of different software capabilities, although there are several providers that have a single software package that integrates the six elements of personal financial planning (cash flow, taxation, investments, retirement, estate planning and insurance). There can be some overlap in the services provided through estate planning and investment management, but generally, the financial planning may not be as detailed as the other specialized services. In addition, the financial planning services tend to be used more by participants with less wealth than those typically interested in investment management and estate planning.

The main distinction in the financial planning services provided by this invention, when compared to other providers, is the integration of multi-jurisdictional planning for participants subject to multiple tax authorities, such as a German citizen working in Japan with a U.S. 401 (k) plan holding U.S. situs assets. In these cases, the tax laws of each country should be considered in making planning recommendations.

In Block 494, the participant decides to access Estate Planning Services, which can be provided by one or more financial institutions.

In Block 506, Estate Planning Services is selected and the participant is presented a menu of products and services from which to choose those that are of most interest or best suits the participant's needs. Each institution will decide independently which services to provide, but the typical services include current estate analysis, host country jurisdictional analysis, current will review, current trust review, multi-jurisdictional estate planning, legal referral service, trust services, estate settlement services, and other similar services. As the participant selects a particular product or services, a list of providers of the particular products or services can be displayed, from which the participant makes a selection. At that time, the selected provider's marketing and other presentation materials will be displayed on the Internet/network for the participant's review. The participant may subsequently contact the selected provider by telephone, fax, letter, e-mail, or directly through the network being used. This initial contact can be to obtain additional information or to transact business. The providers' computers will store independent software programs to prepare and provide the products and services being offered by that provider.

To build the system to provide the services in Block 506 requires elements of estate taxation, trusts and insurance. The main distinction in the estate planning services provided by this invention, when compared to other providers, is the integration of multi-jurisdictional planning for participants subject to multiple tax authorities, such as a U.S citizen working in Switzerland with U.S. and Swiss situs assets and a non-U.S. citizen spouse.

Upon the participant's request, the estate planning system in Block 506 will electronically provide the participant's computer 68 with a data collection form, which will be completed manually or electronically by the participant and returned. In turn, the estate planning provider will prepare the analysis, using a software program, and return the completed analysis to the participant. Follow-up discussions will be by voice or electronic means, with implementation assistance available upon request from provider law firms.

In Block 496, the participant decides to access Relocation Planning Services, which can be provided by one or more financial institutions.

In Block 508, Relocation Services is selected and the participant is presented a menu of products and services from which to choose those that are of most interest or best suits the participant's needs. Each institution will decide independently which services to provide, but the typical services real estate brokerage services, education/school location services, language services, local area familiarization services, efficient buying services, moving services, and other similar services. As the participant selects a particular product or services, a list of providers of the particular products or services can be displayed, from which the participant makes a selection. At that time, the selected provider's marketing and other presentation materials will be displayed on the Internet/network for the participant's review. The participant may subsequently contact the selected provider by telephone, fax, letter, e-mail, or directly through the network being used. This initial contact can be to obtain additional information or to transact business. The providers' computers will store independent software programs and databases to prepare and provide the products and services being offered by that provider.

Upon the participant's request, the relocation system in Block 508 will electronically provide the participant's computer 68 with a data collection form, which will be completed manually or electronically by the participant and returned. In turn, the relocation provider will prepare a proposal, using a software database program, and return the completed proposal to the participant. Follow-up discussions will be by voice or electronic means, with implementation assistance available upon request from various provider firms.

In Block 498, the participant decides to access Other Services, which are provided by one or more financial institutions. Each institution will decide independently which services to provide through the network created by this invention, and the methodology follows the same logic as described for the other services.

In Block 512, the usage of the Internet/network services is recorded by contacts made by participants to each provider and transmitted to the Revenue Accounting Computer 72, at Block 1238, FIG. 37.

Turning to FIG. 18, the independent consultant's computer integrates with the Central Computer in Block 2, FIG. 2, as well as sending and receiving data from the plan administration computer in Block 20, FIG. 2. The independent consultant may be the primary user of this invention, and has to be able to access various parts of the system.

Block 520, the independent benefits consultant maintains a database of clients for which consulting services are provided. The consultant provides a myriad of services, in which providing replacement plans is included.

The consultant's computer uses data received from tax and accounting compliance computers, Block 521, to design and maintain benefit plans. These computers may be linked to the Internal Revenue Service or other compliance agencies.

In Block 522, the consultant's computer performs consulting functions and provides consulting studies to clients.

In Block 524, the consultant provides input to the Central Computer, Block 2, FIG. 2, to start the process of designing a replacement plan for the consultant's client. The Plan Administration Computer also receives information, from which reports are prepared and sent to the consultant for review in Block 522. The consultant performs the needed activities to review the reports and advises the client. The consultant may also provide additional input to the Central Computer, which may result in changes to the plan design or funding. New reports are generated, sent to the consultant, and the logic continues. Replacement Plans marketing activities are also transmitted to the Marketing Computer 50 through Block 454, FIG. 16, for the preparation of the marketing activity report.

Figure 19:
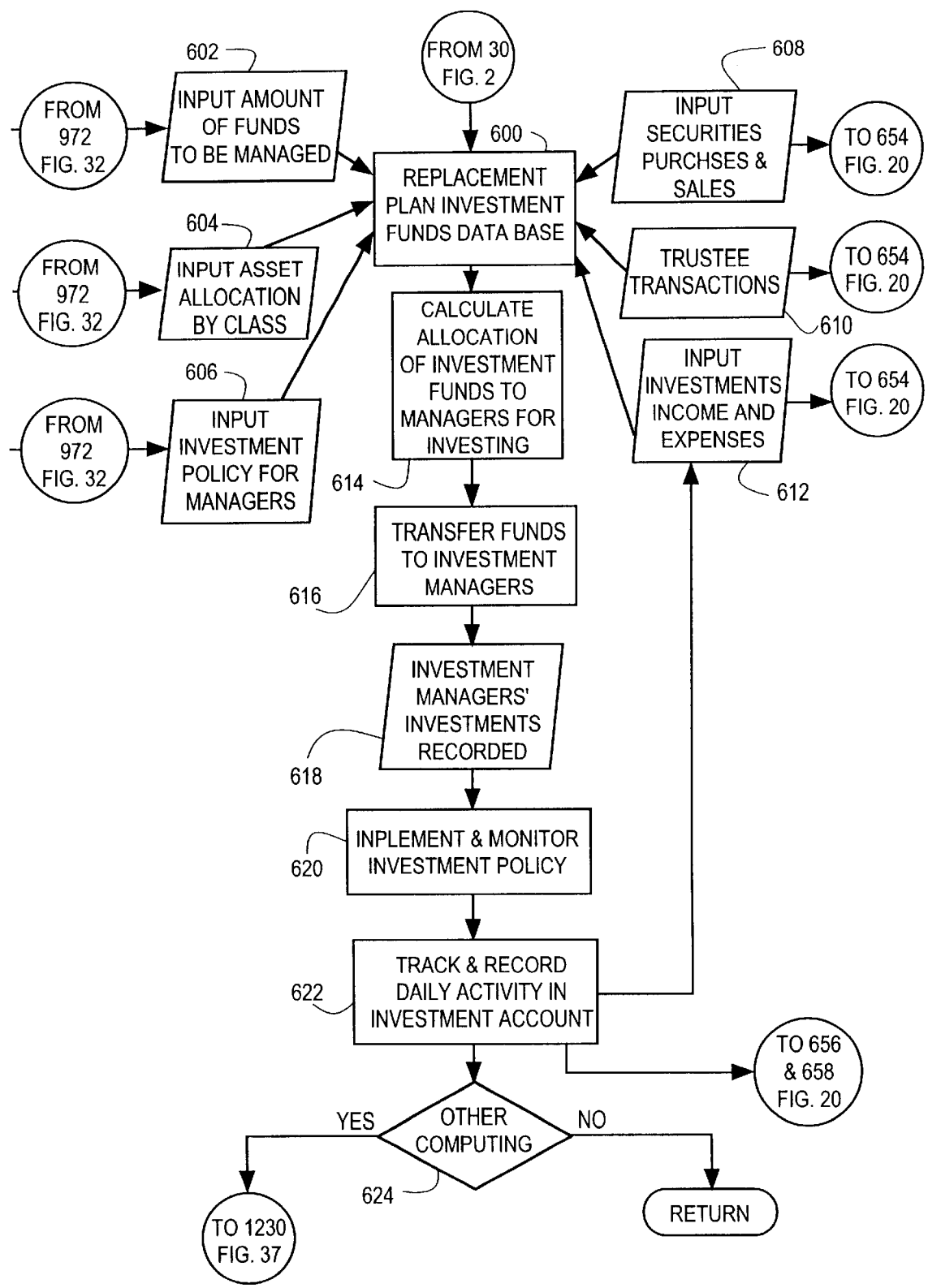
FIG. 19 is a logic flow diagram for managing investment funds of the replacement plan by independent money managers and/or investment sub-advisers.

Moving to FIG. 19, the Replacement Plan Investment Funds Database records and accounts for the plan sponsors' assets, which are being invested by the money managers, who are acting as "sub-advisors" under the replacement plan arrangement. The sub-advisors are holding the only tangible assets for funding the replacement plan. The sub-advisors are substantial world-class financial institutions with extensive expertise and experience in managing money.

Block 602 receives an input of the amount of the funds to be managed for the replacement plans from the Trustee, Block 972, FIG. 32. The funds can be the gross contribution to the plan less the administrative fees and expenses incurred to maintain the plan. For example, if the total plan contribution is $20,000,000.00 and the associated fees and charges totaled $1,000,000.00, only $19,000,000.00 can be transferred to the money managers for investing.

Block 604 receives input from the Trustee, Block 970, FIG. 32, on the Asset Allocation to be used by the managers to mange the money. The asset allocation is by asset class and sub-class, with managers that may specialize in a particular asset class or sub-class. Typically, there are four classes of assets—cash and cash equivalents, fixed income (interest bearing) assets, equity assets, and hard assets. In each class, there are subclasses. For example, cash assets are subdivided into cash, money market, and short-term U.S. Treasury securities. Fixed income investments may be subdivided into domestic and foreign government bonds, corporate bonds, and municipal bonds, as well as certificates of deposits and fixed annuities. Equity investments can be subdivided into domestic and foreign income stocks, growth and income, growth, aggressive growth, small company and sector investments. Hard assets are usually subdivided into precious metals, real estate, art, and precious gems.

Block 606 receives input from the Trustee, Block 972, FIG. 32, on the investment policy for the various managers, based on the investment objectives of the plan sponsor. Each replacement plan will have an investment policy drafted by the Trustee and investment advisor to outline the parameters and limits for the sub-advisors investing the funds. An investment policy provides the sub-advisor with guidelines for making investments. For example, an investment policy may have a provision stating that only the stock of domestic companies with a certain market capitalization size, which do not manufacture guns or tobacco, are to be purchased.

In Block 608, the securities purchases and sales are entered. As each manager buys and sells individual securities, the transactions are recorded in the database. The specific transactions to track are trade dates, realized gains and losses, cost basis, and verification of portfolio holdings. The method for transferring this data to the database is unique to the systems used by each sub-advisor/manager.

In Block 610, the Trustee's transactions are entered. The Trustee may make direct investments, such as secured loans, shift funds from one manager to another, add and delete managers, and other similar transactions. The method of transferring this data to the database is unique to the systems used by the Trustees.

In Block 612, investment Income and Expense Accruals are entered. Daily activity in the investment accounts requires tracking dividend income, interest income, accrual of discount, amortization of premium, investment advisory fees, custodial fees, accounting fees, insurance fees, and other fees, which are recorded in the database. This data is provided from the money manager's daily activity being tracked and recorded in Block 622, FIG. 19.

The data in the database is used in Block 614 to calculate the allocation of the investment funds to the various sub-advisors. It is the Trustee that has the fiduciary responsibility to make the invested assets equal the benefit liabilities. Therefore, the Trustee develops the overall asset allocation recommendations for the investment advisor, based on the plan participants' overall asset allocation for the benefit liability. The asset allocation will specify the asset classes and sub-classes.

The sub-advisors have investment class specialties. One manager may specialize in European equities, while another specializes in U.S. Government bonds, while still another may specialize in real estate REITs. Consequently, the Trustee will consult with the investment advisor to allocate the assets to the respective sub-advisors/managers based on the asset allocation needed to equal or out perform the liabilities, matching the manager to the asset class and sub-class.

In Block 616, the assets are transferred electronically to the investment advisor and subsequently to the sub-advisors/managers in accordance with the asset allocation.

In Block 618, the managers will acknowledge the receipt of the funds for investing and maintain separate accounts for the funds, avoiding any commingling of the assets with other investment funds unless specifically agreed in advance.

In Block 620, the transferred funds are invested in accordance with the investment policy and according to the asset allocation by the investment managers. Compliance with the investment policy will be automatically monitored, and periodic compliance reports will be submitted to the Trustee.

In Block 622, the investment managers' daily activities are tracked. At the end of each day, the manager needs to be able to report the net value of the account. This information is important to the remainder of the process. The reporting is made electronically, and is transmitted to Blocks 612, 656 and 658, FIG. 19.

In Block 624, the total assets under management amount is transmitted to the Revenue Accounting Computer 72, through Block 1230, FIG. 37.

Figure 20:
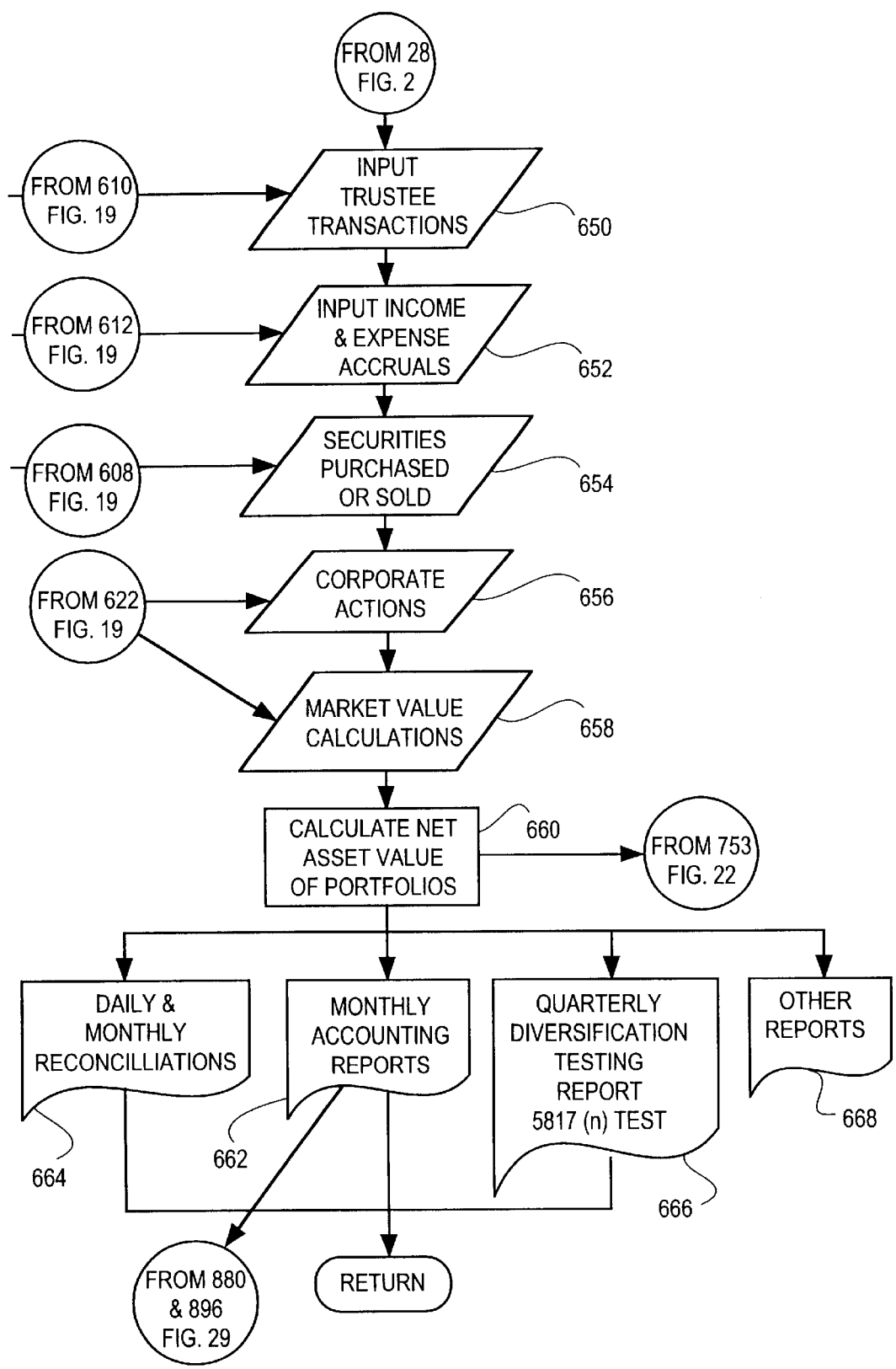
FIG. 20 is a logic flow diagram for valuing the assets held in the investment accounts.

The logic continues to FIG. 20, where the Net Asset Value of the sub-advisor's accounts is determined. The Net Asset Value can be calculated by the sub-advisor's/investment managers or by a third-party firm specializing in that work. In either case, the results are the same.

In Block 650, Trustee transactions are entered from Block 610, FIG. 19.

In Block 652, Income and Expense Accruals are entered from Block 612, FIG. 19.

In Block 654, Securities Transactions are entered from Block 608, FIG. 19.

In Block 656, Corporate Actions are entered from Block 622, FIG. 19. Corporate actions include such transactions as stock splits, mergers and acquisitions, stock dividend, spin-offs, callable bonds, principal pay-downs, and similar transactions.

In Block 658, Market Value Calculations are entered from Block 622, FIG. 19, which include such items as amortized book value, original issue discounts, unrealized gains and losses, and similar transactions.

In Bock 660, the Net Asset Value of each portfolio is calculated. From that calculation, reports and reconciliations are generated. The Net Asset Value is also transmitted to Block 753, FIG. 22, where it is used to determine the life insurance policy values.

In Block 664, the periodic Reconciliation Reports are generated, which can include various types of investment management information, such as dividend and interest, gains and losses schedule, book value verification between periods, custody reconciliation, and Net Asset Value roll-over. Reconciliations can be generated for any period, but are typically issued daily and monthly.

Specimen 11 is a representative sample of an Asset Reconciliation Report for a Replacement Plan. The specimen exemplifies the information that may be used to reconcile a bond portfolio. This statement includes the information needed to reconcile the value allocated to the particular division of the total portfolio, including the Trade Date, Settlement Date, Maturity Date, Currency Par Value, Book Value, Coupon Rate, and the current Market Value. At the end of the report details regarding sales and purchases, dividends and interest, other assets and liabilities, and accrued fees and charges are entered.

In Block 662, the periodic Accounting Reports are generated, which include general ledger and trial balances, dividend and interest ledgers, purchases and sales journal, and similar reports. When life insurance is used, this data is also transmitted to Blocks 880 through 896, FIG. 29, where it is used to calculate the policy's Investment Income, as part of the life insurance administration system.

In Block 666, the Quarterly Diversification Testing Report is generated in accordance with Internal Revenue Code Section 81 7 h. The testing format follows a prescribed format, which is an industry standard, and not unique to this invention.

In Block 668, other reports are generated, such as disaster recovery reports, error policies and procedures reports, and similar reports as needed.

Figure 21:
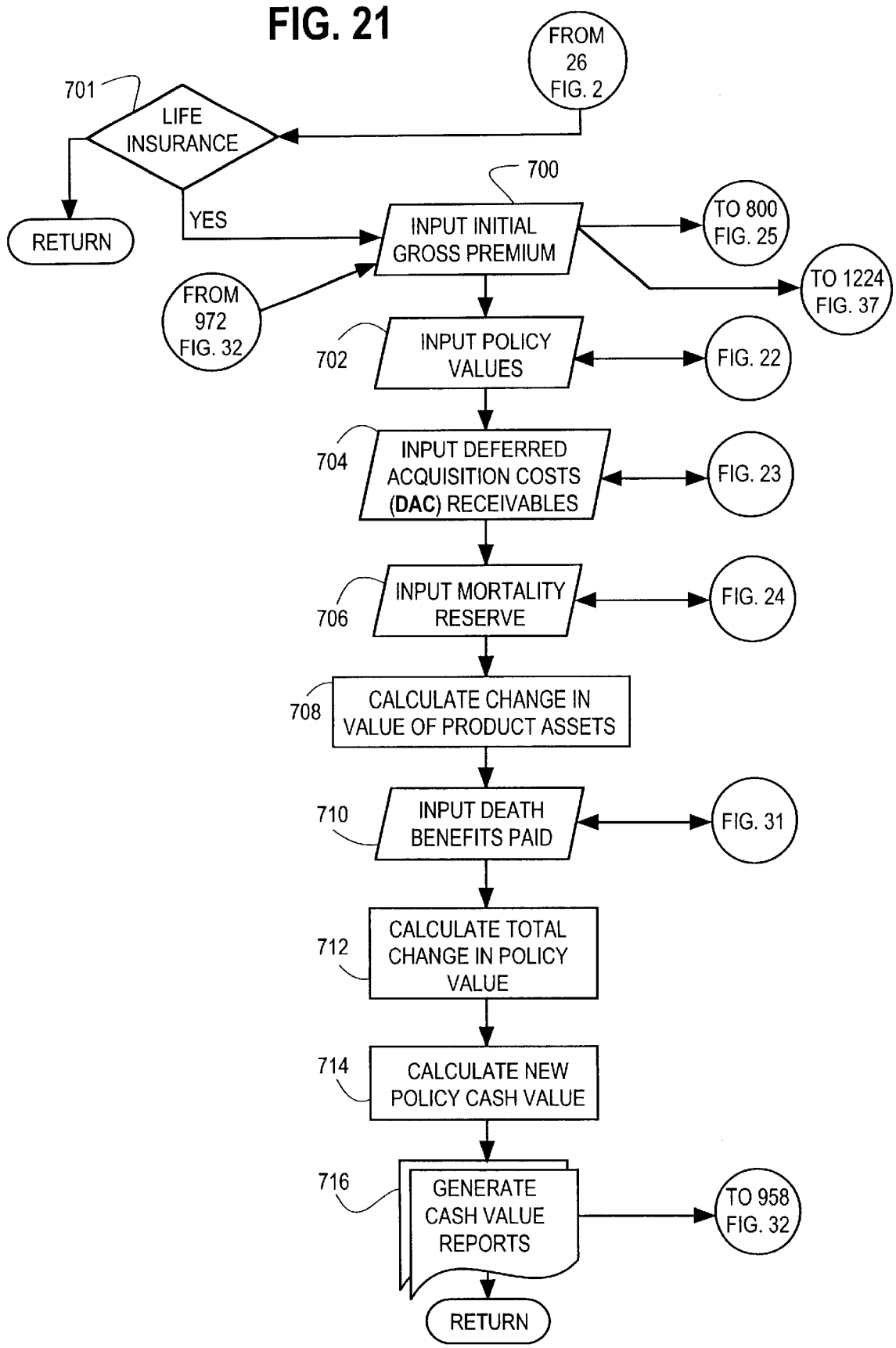
FIG. 21 is an overview logic flow diagram for the administering of a life insurance policy for use in a replacement plan.

Continuing to FIG. 21, life insurance may be selected as a funding vehicle for the replacement plan, and in fact, is the preferred method of funding. Although various forms of life insurance may be used for funded benefits with this invention, the type being illustrated is Group Private Placement Variable Universal Life, which is issued by a foreign carrier and purchased by the Trustee of an offshore trust. The Trustee is both the owner and the beneficiary of the insurance contract(s). The participants have no incidence of ownership, nor do they have any beneficial interest in the policy's values. They are only the insureds. In addition, the contract is underwritten on an aggregate-funded, guaranteed issue basis, and may not be subject to the taxes and expenses associated with U.S. regulated insurance contracts. Other features include variable mortality that can comply with IRC Section 7702 regulations to qualify in the U.S., or the mortality can be "dialed down" to meet foreign compliance. Prior to this invention, this life insurance product did not exist for the international marketplace. FIG. 21 is the system for administration of this new form of life insurance.

Specimen 14 is a representative sample of the Product Specifications for this new form of Group Private Placement Variable Universal Life Insurance Policy. The specimen outlines the design purpose of the contract, the unique ownership by an offshore trust, the special application of underwriting to lower risks associated with insuring foreign lives, and the flexible "dial-in" design features. The built-in charges are also specified, as well as the preferred investment options and world-class sub-advisors.

In Block 701, the decision is made by the Trustee of the benefits trust to use life insurance as a funding vehicle.

In Block 700, the initial Gross Premium is entered from the Trustee in Block 972, FIG. 32. The gross premium is equal to the net contribution into the plan, which can be the gross contribution to the plan less any plan Participation Fees and the Plan Administration Fees incurred to maintain the plan. For example, if the total plan contribution is $20,000,000.00 and the associated participation and plan administration fees totaled $200,000.00, the remaining $19,800,000.00 can be the gross premium. The Gross Premium is reduced by the applicable taxes (DAC and state premium tax) to produce the Net Premium (see FIG. 25). Further insurance company charges and fees will reduce the Net Premium to the net investment that is transferred to the money mangers/sub-advisors to invest in Block 602, FIG. 19. The Gross Premium is also transmitted to Block 800, FIG. 25, to be used in the calculation of the net premium for policy administration purposes. In addition, this data is transmitted to the Revenue Accounting Computer 72, Block 1224, FIG. 37, for use in calculating the policy fee.

Figure 22:
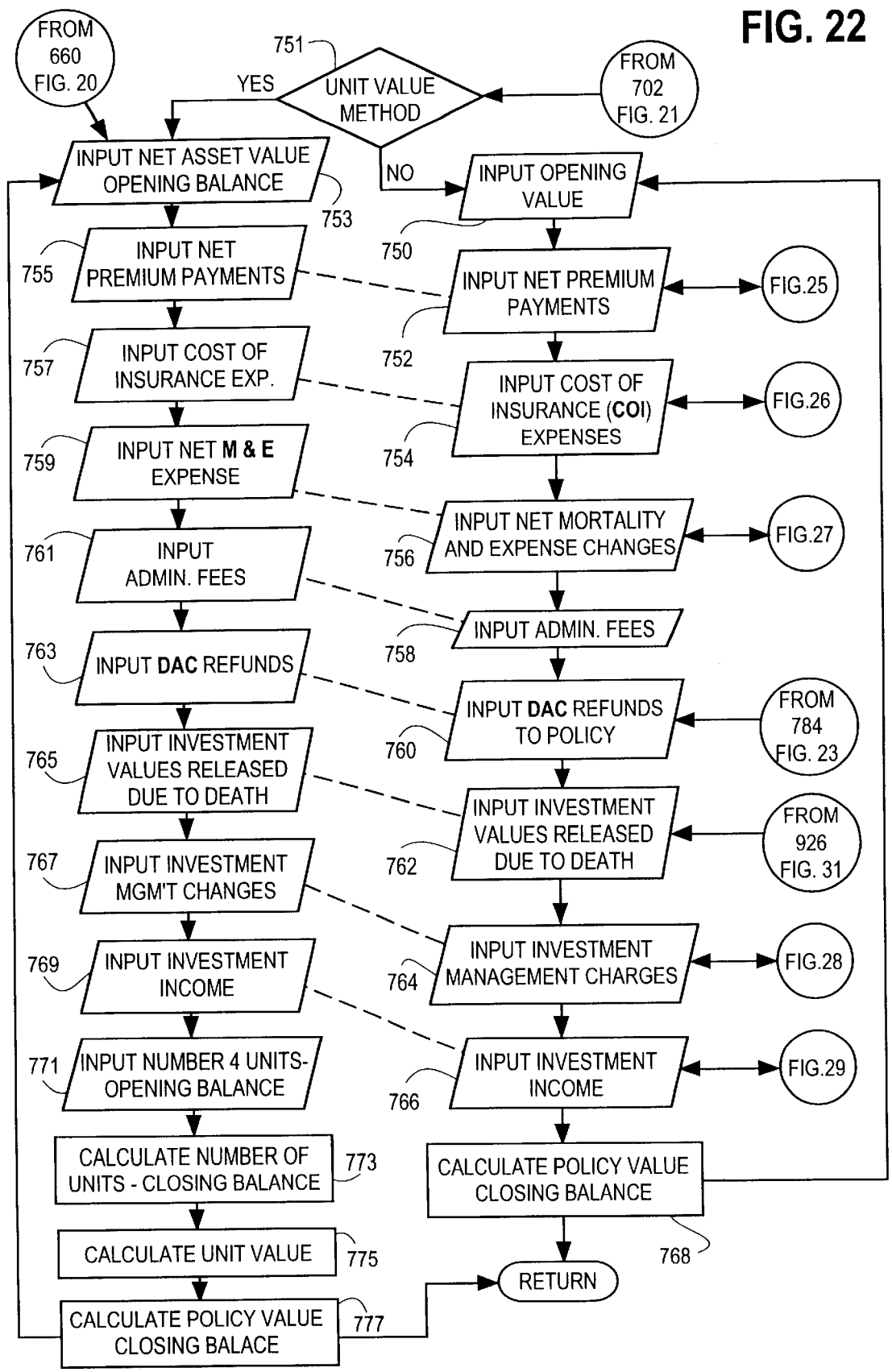
FIG. 22 is a logic flow diagram for valuing the life insurance policy for administering purposes.

In Block 702, the Policy Values are entered from FIG. 22.

Figure 23:
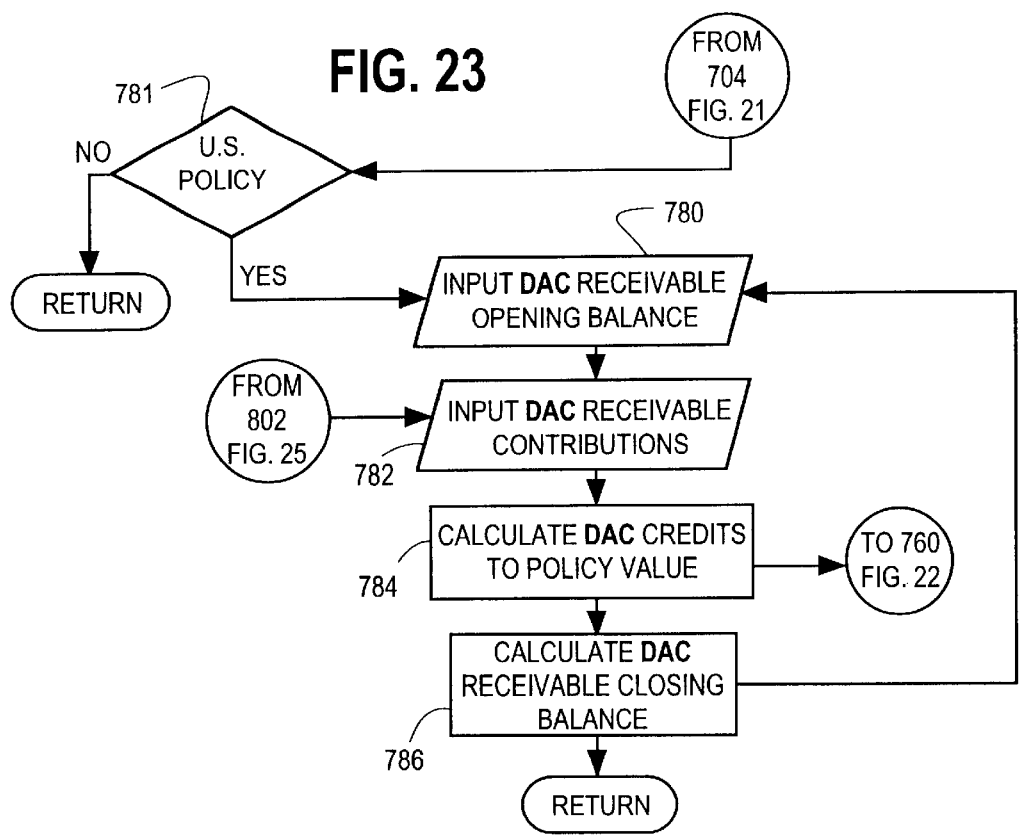
FIG. 23 is a logic flow diagram for valuing the life insurance policy's Deferred Acquisition Costs (DAC) receivable account for administering purposes.

In Block 704, the Deferred Acquisition Cost (DAC) receivable is entered from FIG. 23.

Figure 24:
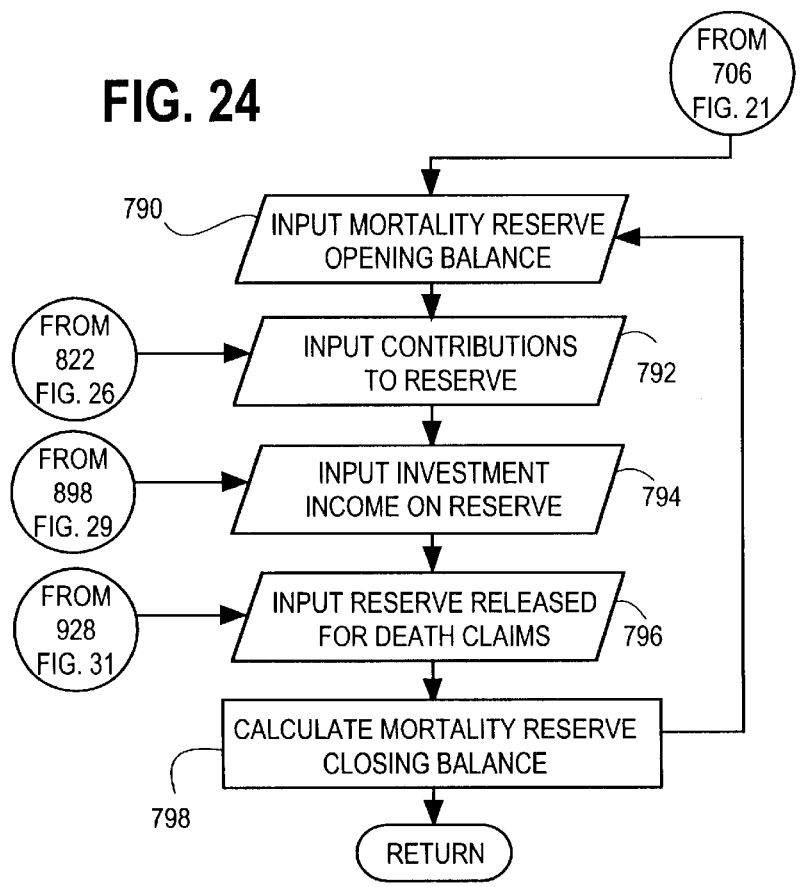
FIG. 24 is a logic flow diagram valuing the life insurance policy's Mortality Reserve for administering purposes.

In Block 706, the Mortality Reserve is entered from FIG. 24.

In Block 708, the Change in the Value of the Product Assets is calculated. The calculation is performed by subtracting the Total Product Assets Opening Balance from the Total Product Assets as of the last market date of the reporting period. The opening balance is the sum of the initial gross premium, the policy value. The DAC receivable, and the mortality reserve. The closing balance is the sum of the policy values, the DAC receivable, the mortality reserve, and the unamortized premium tax.

Figure 31:
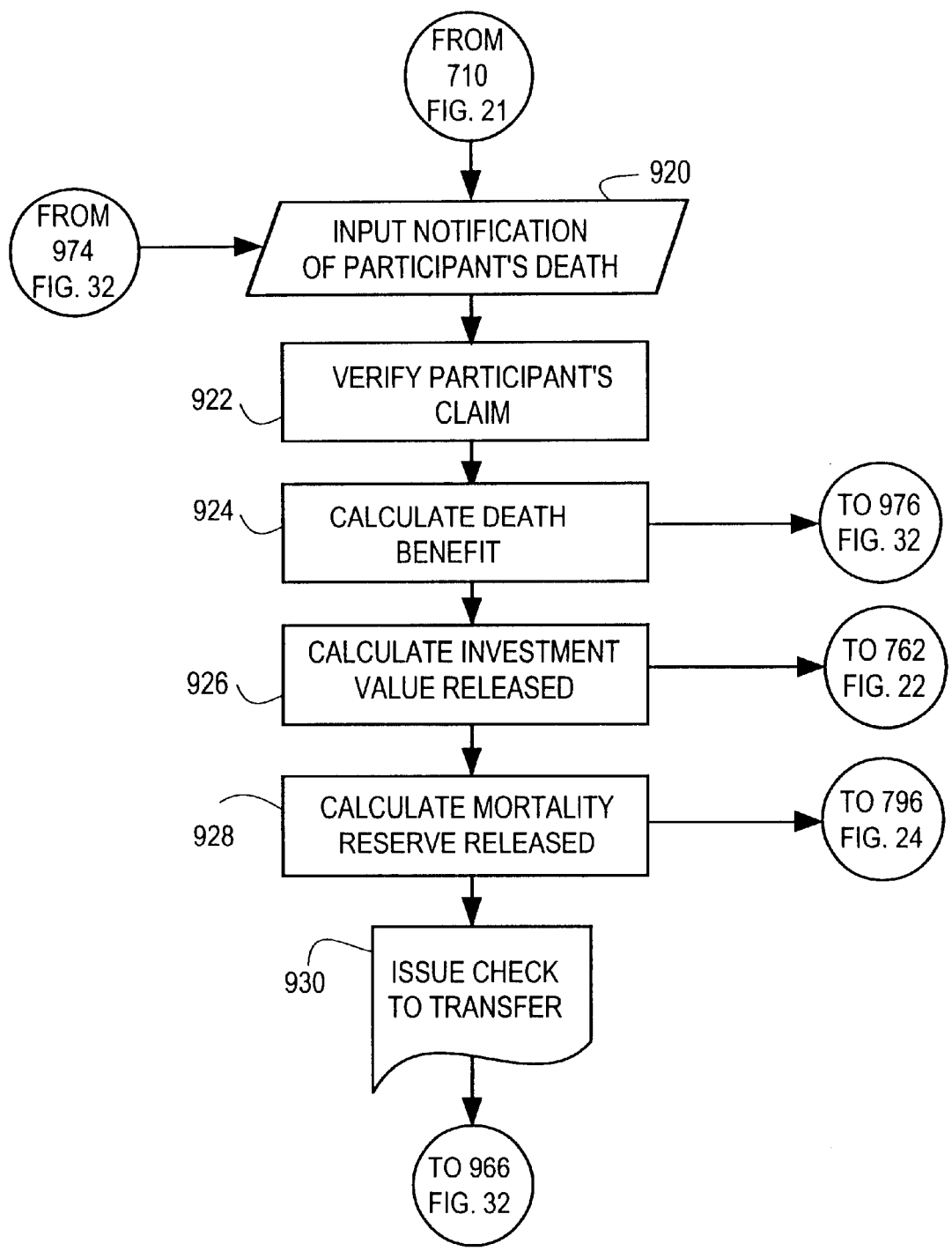
FIG. 31 is a logic flow diagram for the payment of life insurance death claims for administering purposes.

In Block 710, the Death Benefits Paid are entered from FIG. 31, which is the total proceeds paid resulting from claims. The death benefits will be increased by any interest paid on the proceeds from the date of death to the date of payment.

In Block 712, the Total Change in Policy Value is calculated, which is the total of the product change in value and death benefits paid.

In Block 714, the new policy value is calculated by adding the total change in policy value to the policy value entered in Block 702.

In Block 716, the Cash Value Reports are generated and transmitted to the Trustee in Block 958, FIG. 32. The Cash Value Report sent to the Trustee can be the aggregate assets of several plan sponsors' Replacement Plans or for a single plan, depending on the trust design. A Master Trust will tend to aggregate funds for several plans. An abbreviated Cash Value Report can be sent to the plan sponsor for each Replacement Plan.

Specimen 12 is a representative sample of a Trustee's Cash Value Report for a Private placement Variable Universal Life Insurance Policy used to fund a Replacement Plan. The report is composed of a Summary page and supporting schedules detailing the specifics of the policy administration. The Summary begins with the determination of the Total Opening Balance. The ending balances for the prior period become the opening balances for the current period. The Policy Values, DAC Receivable, Mortality Reserve, and any Free-look Adjustment opening balances are presented for the current reporting period and prior periods, and when added to provide the Total Opening Balance. New Premium Received or premium Rescinded is added to or subtracted from the Total Opening Balance. The Closing Balances of the Policy Values, DAC Receivable, Mortality Reserve, and any Free-look Adjustment are added to provide the Total Closing Balance. The opening is subtracted from the closing balance to provide the Assets Change in Value. The DAC Refunds are added to the value and Death Benefits Paid are subtracted to provide the Total Change in Value. For informational purposes, the Interest Income on Death Benefits is also shown, as well as the Annualized Yield on the Opening Balance.

The Asset Value Analysis is a supporting schedule that calculates the closing balance for the Policy Value, the DAC Receivable, and the Mortality Reserve for the current reporting period and prior periods. The Asset Charges and Net Cost of Insurance Analysis is a supporting schedule that calculates the Total Investment Management Charges, the Net Mortality and Expense Risk, and the Net Cost of Insurance for the current reporting period and prior periods. The Premium Report calculates the Net Premium Payments from the plan's inception, as well as any Premium Tax Adjustments. The Mortality Reserve Calculation analysis determines the End of Period Contingent Reserve.

Specimen 13 is a representative sample of a Plan Sponsor's Cash Value Report for a Private placement Variable Universal Life Insurance Policy used to fund a Replacement Plan. This report is Replacement plan specific and lists the cash value attributable to each participant, identified by a contract or certificate number. The Premium is itemized, from which is subtracted the Premium and DAC Tax Expense, the Administrative Fee and the Cost of Insurance to provide the Pre-Earnings Balance. The Investment Experience, which is the earnings, is added to produce the Ending Cash Value for the participants. The Total of the participant's cash values is the asset that offsets the total participants benefits liability.

Moving to FIG. 22, the Closing Balance Policy Value is determined. There are two alternatives for determining the policy value. Either the Unit Value Accounting Method is used, or it is not used. Both methods end with the calculation of Policy Value.

In Block 751, the Unit Value Accounting Method is selected.

In Block 750, the Policy Value Opening Balance is entered, which is the prior period's Policy Value Closing Balance.

Figure 25:
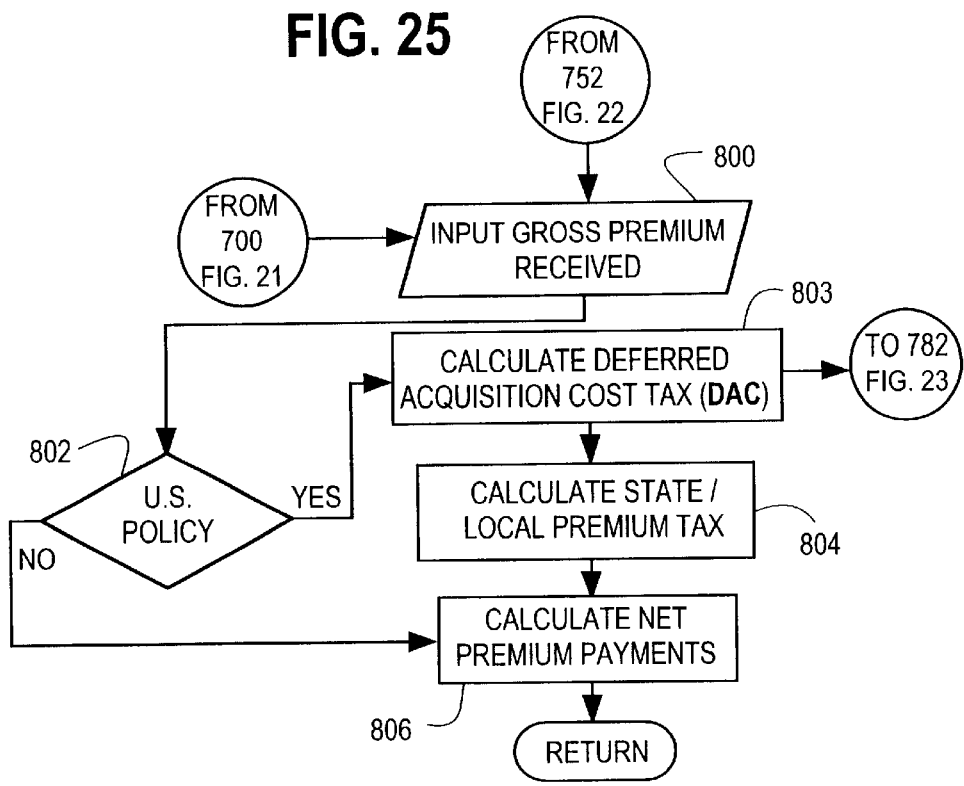
FIG. 25 is a logic flow diagram for valuing the life Net Premium for life insurance administering purposes.

Block 752 receives the Net Premium input from FIG. 25, which is the net premium paid during the reporting period.

Figure 26:
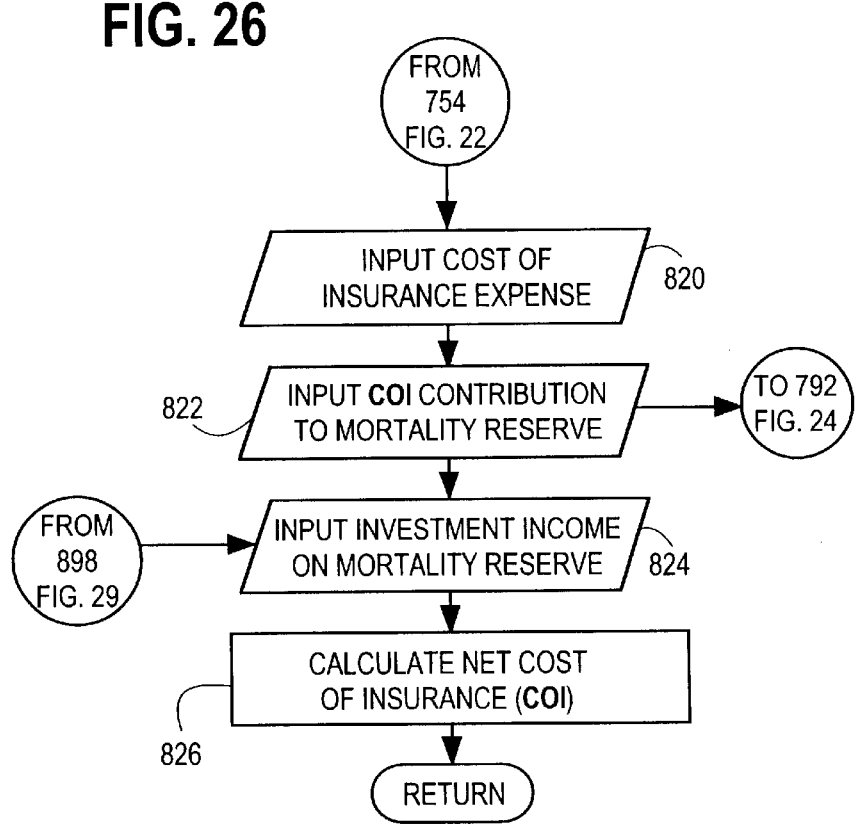
FIG. 26 is a logic flow diagram for valuing the life insurance policy's Cost of Insurance (COI) for administering purposes.

Bock 754 receives the Cost of Insurance (COI) expense input from FIG. 26, which is the cost of insurance charges deducted from the policy values during the reporting period.

Figure 27:
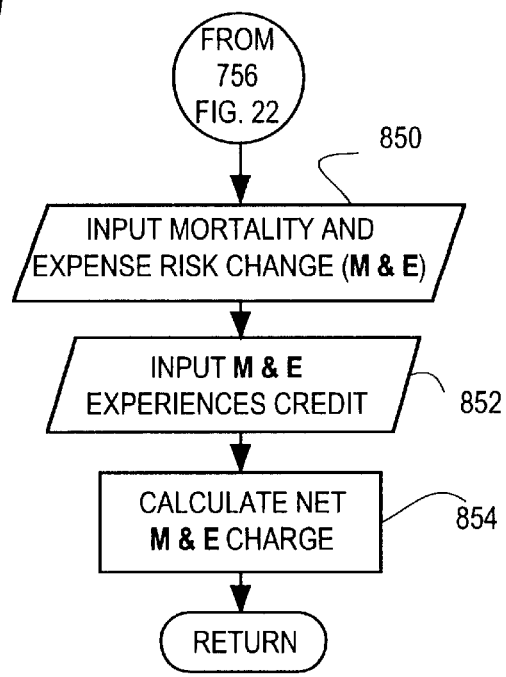
FIG. 27 is a logic flow diagram for valuing the life insurance policy's Mortality and Expense Risk (M&E) charge for administering purposes.

Block 756 receives the Net Mortality and Expense (M&E) charges from FIG. 27, which are the M&E charges deducted from the policy values during the reporting period.

In Bock 758, the Administration Fee is manually entered for each policy and is a per policy fee for policy administration. This is a fixed fee expressed as a percentage of the premium and is usually in the 15 to 25 basis points range. However, this fee is usually negotiable by the client.

In Block 760 the Deferred Acquisition Cost (DAC) tax refunds to the policy are entered from Block 784, FIG. 23, which are added to the policy values.

Block 762 receives the Investment Values Released Due to Death input from Block 926, FIG. 31, which is the amount of investment value released due to claim proceeds paid during the reporting period.

Figure 28:
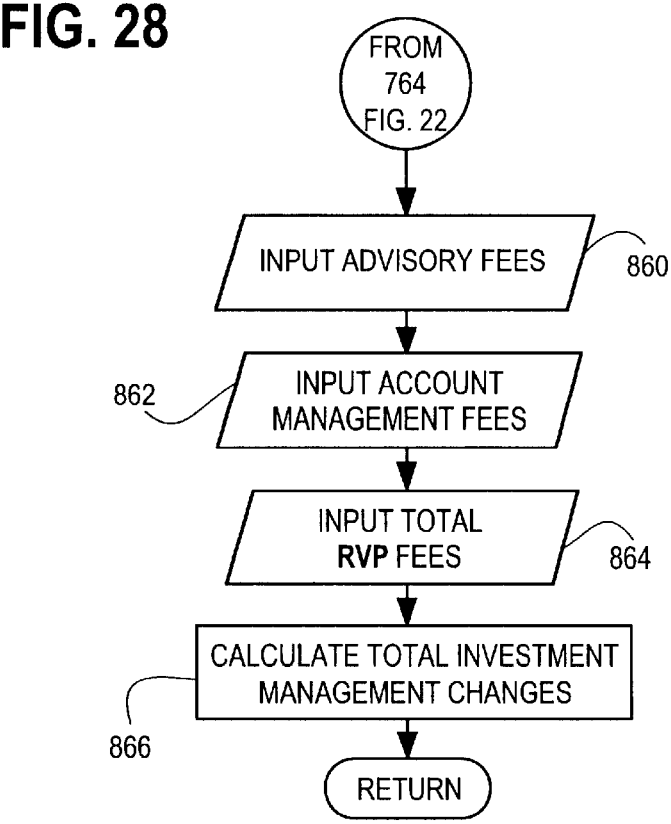
FIG. 28 is a logic flow diagram for valuing the life insurance policy's Investment Management (IM) fees for administering purposes.

Block 764 receives Investment Management Charges from FIG. 28, which are the investment management charges deducted from values.

Figure 29:
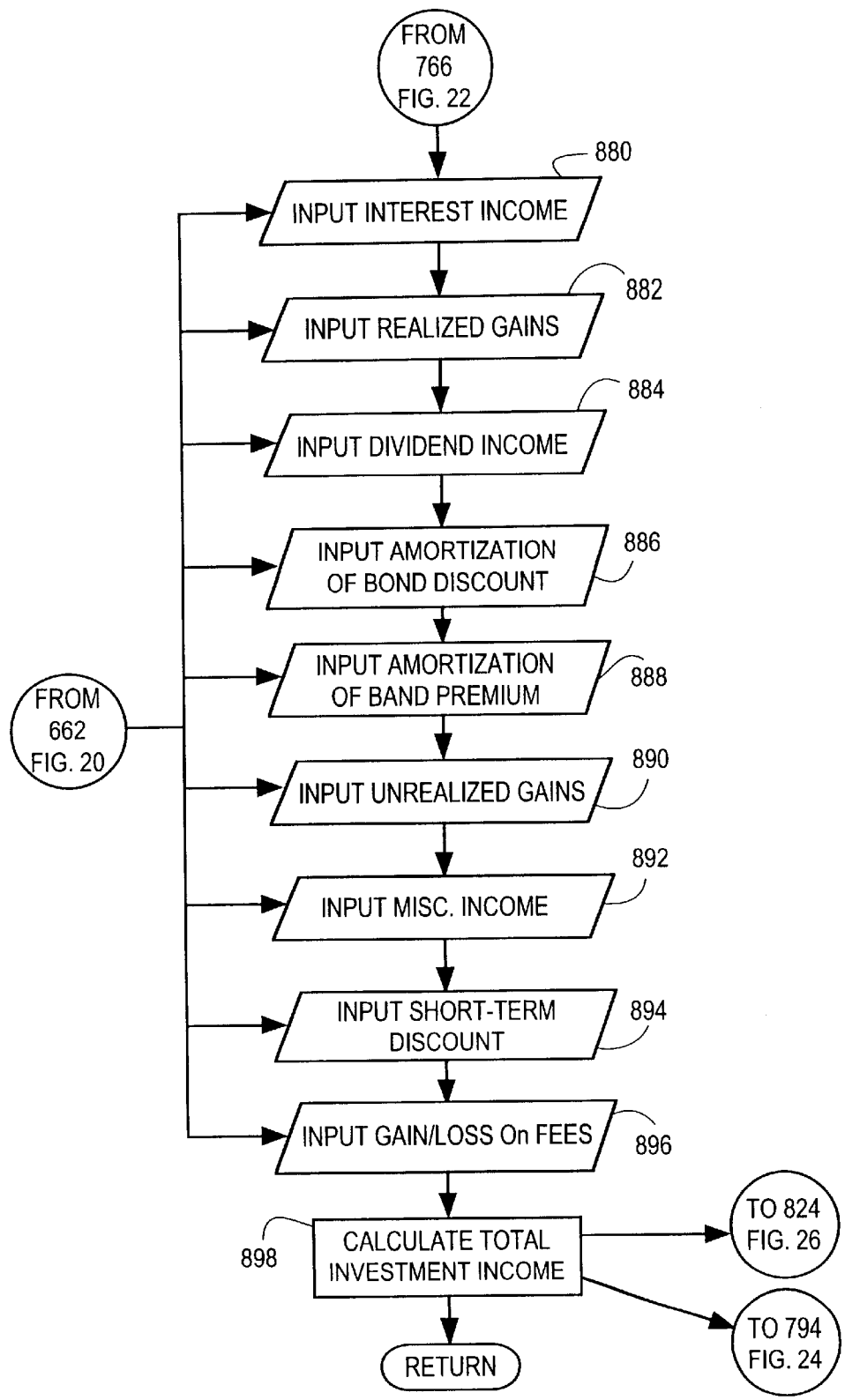
FIG. 29 is a logic flow diagram for valuing the investment income used in determining the life insurance policy value for administering purposes.

Block 766 receives the Investment Income input from FIG. 29, which is the investment income to the policy before any charges are made.

In Block 768, the Policy Value Closing Balance is calculated. The calculation begins with the policy value opening balance, adding net premium, DAC refunds, and investment income, ten subtracting COI expense, administration fees, M&E charges, investment values released, and investment management charges to derive the Policy Value Closing Balance.

When the Unit Value Accounting Method is used, Block 753 receives the Net Asset Value input from Block 660, FIG. 20.

Block 755 receives the Net Premium input from FIG. 25, which is the net premium paid during the reporting period.

Bock 757 receives the Cost of Insurance (COI) expense input from FIG. 26, which is the cost of insurance charges deducted from the policy values during the reporting period.

Block 759 receives the Net Mortality and Expense (M&E) charges from FIG. 27, which are the M&E charges deducted from the policy values during the reporting period.

In Bock 761, the Administration Fee is manually entered for each policy and is a per policy fee for policy administration. This is a fixed fee expressed as a percentage of the premium and is usually in the 15 to 25 basis points range. However, this fee is usually negotiable by the client.

In Block 763 the Deferred Acquisition Cost (DAC) tax refunds to the policy are entered from Block 784, FIG. 23, which are added to the policy values.

Block 765 receives the Investment Values Released Due to Death input from Block 926, FIG. 31, which is the amount of investment value released due to claim proceeds paid during the reporting period.

Block 767 receives Investment Management Charges from FIG. 28, which are the investment management charges deducted from values.

Block 769 receives the Investment Income input from FIG. 29, which is the investment income to the policy before any charges are made.

Block 771 receives an input of the number of Units Opening Value, which is the Units Closing Balance of the prior period. At the policy's issue, a certain number of units are assigned. Generally, the premium is buying the units, with a $10.00 value per unit, meaning that a unit is designated for each $10.00 of premium.

In Block 773, the number of Units Closing Balance is calculated. The calculation is the same as in Block 768, except that the additions and subtractions are in terms of units used or gained instead of dollars. For example, if a $1,000,000 policy has a premium of $10,000.00, the policy begins with 1,000 units at $10.00 each. With investment income of $1,000.00 (100 units), less charges and fees of $500.00 (50 units), the closing balance is 1,050 units.

In Block 775, the Unit Value is calculated. For example, if a $1,000,000 policy has a premium of $10,000.00, earnings of $1,000.00, and an end of year cash value of $11,000.00, the unit value is $10.48.

In Block 777, the Policy Value Closing Balance is calculated by multiplying the Unit Value times the number of Units. For example, for a policy with a closing balance of 1,050 units at $10.48 per unit, the Policy Value Closing Balance is $11,000.00.

Continuing to FIG. 23 for the detail of the Deferred Acquisition Cost (DAC) Receivable. The Deferred Acquisition Cost Tax is a U.S. Federal Tax currently equal to 4.146% of premium. The DAC tax is refunded over an eleven-year period on the policy anniversary. The DAC Receivable is the amount of the DAC Tax remaining to be refunded and is a product asset. For non-U.S. regulated policies, DAC is not applicable. Various actuarial techniques can be applied to the treatment of the DAC tax, depending on the life insurance company's practices.

In Block 781, an U.S. Regulated Policy form is selected.

In Block 780, the DAC Receivable Opening Balance is entered, which is the DAC Receivable closing balance for the prior reporting period.

In Block 782, DAC Receivable Contributions are entered from Block 802, FIG. 25. These are additions to the DAC receivable from premium payments made during the reporting period.

In Block 784, DAC Credits to the separate account are calculated and entered to the policy values. These are the amortized DAC refunds credited to the policy value. This data is also used in Block 760, FIG. 22.

In Block 786, the DAC Receivable Closing Balance is calculated, which is the DAC Receivable on the last market day of the reporting period. The calculation is performed by adding the contributions and credits to the opening balance.

Continuing to FIG. 24, the Mortality Reserve Closing Balance is determined. A percentage of the Cost of Insurance is allocated to the Mortality Reserve to support the payment of death claim proceeds. The Mortality Reserve applies to all policies and is a product asset. Various actuarial techniques can be applied to the treatment of the Mortality Reserve, depending on the life insurance company's practices.

In Block 790, the Mortality Reserve Opening Balance is entered from Block 822, FIG. 26, which is the Mortality Reserve Closing Balance for the prior reporting period.

In Block 792, the Contribution to Reserves is entered from Block 898, FIG. 29, which is the portion of the reporting period's Cost of Insurance charges allocated to the mortality reserve. Also included are any reversals of COI charges refunded due to death claims.

In Block 794, the Investment Income on the Reserve is entered. This is the investment earnings on the Mortality Reserve during the reporting period.

Block 796 receives the Mortality Reserve released for Death Claims input from Block 928, FIG. 31. This is the amount of the Mortality Reserve released to pay claim proceeds during the reporting period.

In Block 798, the Mortality Reserve Closing Balance is calculated, which is the Mortality Reserve on the last market date of the reporting period. The calculation is performed by adding the contributions and income to the opening balance and subtracting the released reserve to derive the closing balance.

Continuing to FIG. 25, the Net Premium is determined.

In Block 800, the Gross Premium Received is entered from Block 700, FIG. 21, which is the premium made prior to deductions for taxes, loads and charges.

In Block 802, an U.S. Regulated policy form is entered. If the policy is not U.S. regulated, the gross premium and the net premium can be equal.

In Block 803, the Deferred Acquisition Cost (DAC) Tax is calculated. The Deferred Acquisition Cost Tax is a Federal Tax currently equal to 4.146% times the premium, which is deducted from the premium. The DAC tax is also transmitted to Block 782, FIG. 23, for use in determining the DAC receivable.

In Block 804, State and Local Premium Taxes are calculated. These taxes are only applicable to U.S. regulated policies and are deducted from the Gross Premium. The State Premium taxes vary from 1% to 3% of the gross premium, depending on the state. Various actuarial techniques can be applied to the treatment of the premium tax, depending on the life insurance company's practices.

In Block 806, the Net Premium Payment is calculated by subtracting the applicable taxes from the Gross Premium. With a DAC Tax of 4.146% and a Premium Tax of 2%, the net Premium is 93.854% of the Gross Premium. Continuing to FIG. 26, the Net Cost of Insurance (COI) is determined. The COI charge is applicable to all policies.

In Block 820, the Cost of Insurance (COI) Expense for the reporting period is entered. The COI rate is received from the policy underwriters and is an actuarial calculation that is calculated based on the characteristics of each insured population. COI charges are deducted from the policy value on the processing date.

In Block 822, the COI Contribution to the Mortality Reserve made during the reporting period is entered. This input is an actuarial calculation based on the expected deaths of any given insured population. This data is also used in Block 792, FIG. 24.

In Block 824, the Investment Income on the Mortality Reserve is entered from Block 898, FIG. 29.

In Block 826, the Net Cost of Insurance for the reporting period is calculated. The calculation is performed by subtracting the Mortality Reserve contribution from the COI Charge and adding the Investment Earnings on the Mortality Reserve to derive the Net COI expense.

Continuing to FIG. 27, the Net Mortality and Expense Risk (M&E) Charge is determined.

In Block 850, the Gross Mortality and Expense Risk (M&E) Charge is entered, which is deducted from the policy values during the reporting period. The M&E charge is an actuarial calculation based on the characteristics of the insured population.

In Block 852, the Mortality and Expense Experience Credit ("M&E Dividend") is entered. The M&E Experience Credit is credited to the policy value on the monthly processing date, and the amount is based on the prior period (month) average daily investment value.

In Block 854, the Net M&E Risk Charge is calculated by subtracting the M&E Experience Credit from the M&E Charge.

Continuing on to FIG. 28, the Total Investment Management Charges are determined. The total investment management fees are comprised of two separate charges. The Account Management Fees are charged by the insurance carrier for having overall fiduciary responsibility for the investments within the policy. The Investment Advisory Fees are charged by the investment managers acting as "sub-advisors" to the carrier. Generally, both fees are calculated as a percentage of the assets under management (AUM), but the "Management Fee" can be a percentage of the "Advisory Fee."

In Block 860, the Investment Advisory Fees are entered, which are the total advisory fees charged daily during the reporting period. The percentage fee is detailed in the policy documents and will generally be in the 1 to 2% of assets under management. In those cases where the Advisor's fee is a percentage of the manager's fee, the range is 10 to 20%.

In Block 862, the Account Management Fees are entered, which are the total investment management fees charged daily during the reporting period. The Investment Management fees are also detailed in the policy documents and are a portion of the Advisory fee, usually 50 basis points to 1.5%. The Advisor generally pays them from the Advisory fees.

In Block 864, the RVP Fees are entered, which are the total RVP fees charged daily during the reporting period.

In Block 866, the Total Investment Management Fee is calculated by adding the advisory, management and RVP fees together.

Continuing to FIG. 29, the Total Investment Income is determined for each separate account. This is the total investment income to the policy before any charges are made. The data to calculate the investment income is received from the daily tracking of the investment managers' activities, recorded in Block 662, FIG. 20.

In Block 880, the interest income is entered. The interest income will be received from short-term and long-term bonds, money market accounts, guaranteed investment contracts, and other interest-bearing investments.

In Block 882, Realized Gains and Losses are entered. The gains and losses are from the sale of all investments.

In Block 884, the Dividend Income from stocks and mutual funds is entered.

In Block 886, the Amortization of Bond Discount is entered.

In Block 888, the Amortization of Bond Premium is entered.

In Block 890, the Unrealized Gains and Losses are entered.

In Bock 892, any Miscellaneous Income is entered.

In Block 894, any Short-term Discount and Premium is entered.

In Block 896, any Gains and Losses on Fees in the Separate Account are entered.

In Block 898, the Total Investment Income is calculated by the elements of income. This is the Gross Income to the separate account. This data is also used in Block 824, FIG. 26 to calculate the net COI and in Block 794, FIG. 24 to calculate the mortality reserve.

Figure 30:
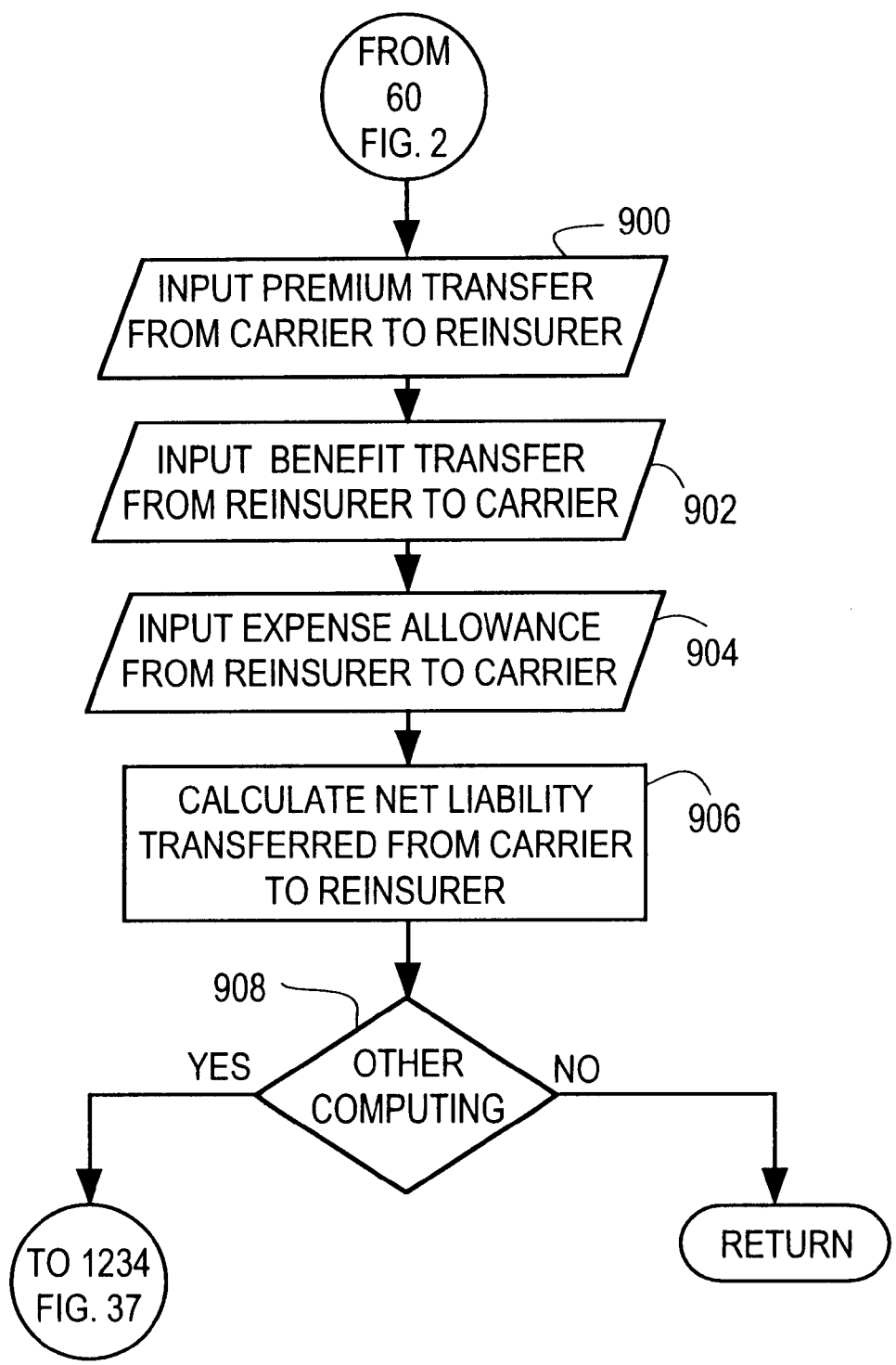
FIG. 30 is a logic flow diagram for valuing the net liability transferred from the life insurance carrier to the reinsurance facility for administering purposes.

Moving to FIG. 30, the Net liability Transferred from the Carrier to the Reinsurance Company is determined. An insurance carrier will usually work with a reinsurance company to share the risk of any particular policy or group of policies.

In Block 900, the portion of the Premium Transferred from the carrier to the Reinsurance Company is entered. This is an actuarial calculation negotiated between the carrier and the reinsurer on an automatic, facultative or case by case basis.

In Block 902, the portion of the Benefit Transferred from the Reinsurance Company back to the carrier is entered. The reinsurer can participate in a stop-loss arrangement with the carrier. This is an actuarial calculation negotiated between the carrier and the reinsurer on an automatic, facultative or case by case basis.

In Block 904, the portion of the Expense Allowance Transferred from the Reinsurance Company back to the carrier is entered. This is an actuarial calculation negotiated between the carrier and the reinsurer on an automatic, facultative or case by case basis.

In Block 906, the Net Liability Transferred from the Carrier to the Reinsurance Company is calculated. The calculation nets the liabilities transferred to the Reinsurance Company against the allowances received by the Carrier to determine the Net liability Transferred. The ceded mortality reserve is also determined. In addition, if the reinsurer participates in experience rating, an annual experience analysis is performed. These are all actuarial calculations negotiated between the carrier and the reinsurer on a case-by-case basis.

In Block 908, the reinsurance risk assumed from the carrier by the reinsurance arrangement is transmitted to the Revenue Accounting Computer 72, Block 1234, FIG. 37, for the calculation of revenue to the replacement plan provider Continuing to FIG. 31, the Death Claims procedure is analyzed. Using life insurance as a funding vehicle for the replacement benefits results in death clams when the participants die. Since it is advantageous to hold life insurance until it matures as a death benefit, the death claims procedure becomes an important step in the proper operation of the invention.

Block 920 receives a completed Death Claim Notification Form from the policy owner, which is the Trustee, Block 974, FIG. 32. Prior to the participant's benefit distributions being completed, it is expected that the participant's heirs will provide notification to the Trustee as they apply for the decedent's benefits. After the benefit distributions have been completed, it may be more difficult to locate deceased participants, especially on a global basis. For U.S. citizens, Social Security records are a source for locating decedents. Likewise, other countries may provide records of decedents. Plan Sponsor's are also good sources for decedent information as heirs submit claims for other benefit programs. As a failsafe, the life insurance policy is designed to mature at a specific age (e.g., endowment at age 85), at which time the policy will mature and the benefits paid to the Trustee.

In Block 922, the death claim is processed by the life insurance company, which verifies that the decedent is an eligible insured. The Trustee collaborates with the Plan administrator as necessary to authenticate the claim. The life insurance company will specify the proof of claim requirements, which can include the Death Claim Notification, a Certified Death Certificate or its equivalent, and other documentation that may be needed. For foreign insureds, other documentation can be required.

In Block 924, the Death Benefit is calculated by the insurance company and verified for accuracy by the Trustee, Block 762, FIG. 22. Any policy loans made by the Trustee will be repaid from the death proceeds prior to distribution.

In Block 926, the Investment Value Released due to death claims is calculated and transmitted to Block 762, FIG. 22.

In Block 928, the Mortality Reserve Released due to death claims is calculated and transmitted to block 796, FIG. 24

In Block 930, the net Death Claim proceeds and any interest due are forwarded to the Trustee by check or electronically, Block 966, FIG. 32.

Moving to FIG. 32, the Master Benefits Trust Central Administration Computer is the fourth primary system in the invention, with the Central Digital Computer, the Plan Administration Central Computer, and the Life Insurance Policy Administration Computer systems being the other three. The Master Benefits Trust assumes all fiduciary responsibility for the assets funding the replacement plans, for the maintenance of the plans, and for the accounting associated with both. Although flexible in form, the invention is submitted so that the Master Trust manages the co-mingled assets of various sub-trusts, which function to support the particular replacement plan for which the sub-trusts are settled. There are four primary sub-trusts submitted as part of this invention, with the intention of expanding the number as needed.

Block 950 is the Master Trust Central Administrative Database. It records and maintains data and transaction files for the management of the replacement plans' investment funds.

Block 960 receives the Replacement Plan Data input from the Plan Administration Central database, Block 261, FIG. 9 via electronic download. The Trust will receive the same Replacement Plan data and information as maintained by the Plan Administrator.

Block 952 receives the Participant Data input from the Plan Administration Central database, Block 261, FIG. 9 via electronic download. The Trust will receive the same Participant data and information as maintained by the Plan Administrator.

Block 954 receives the Plan Sponsor Data input from the Plan Administration Central database, Block 261, FIG. 9 via electronic download. The Trust will receive the same Plan Sponsor data and information as maintained by the Plan Administrator.

Block 956 receives the Plan Liabilities input from the Plan Administration Central database, Block 278, FIG. 9 via electronic download. The Trust will receive the same Plan Liabilities data and information as maintained by the Plan Administrator.

Block 958 receives the total Assets-under-Management (AUM) Data from the Plan Administration Central database, Block 261, FIG. 9 via electronic download. The Trust will receive the same contribution formation as maintained by the Plan Administrator. The total assets-under-management is the total plan contribution less the plan administration fees and participation fees, but prior to any deduction for insurance policy fees. If life insurance is used by the Trustee to fund a Replacement plan, the policy cash values will be the AUM and reported to the Benefits Trust database from Block 716, FIG. 21.

Block 961 receives the Benefits Claims data from the Participant's Computer 68 via Blocks 288 and 289, FIG. 10, and from the Plan Sponsor via the Replacement Plan Provisions sent from Block 304, FIG. 11.

Block 962 receives Contributions Collection data from the Plan Administration Central database, Block 261, FIG. 9 via electronic download. The Trust will receive the same contribution transaction data and information as maintained by the Plan Administrator. These transactions reflect changes in periodic contribution amounts and/or timing, as well as similar transactions that would effect the scheduled receipt of plan contributions.

Block 964 receives Trust Records Update data from the Trustee's periodic review of the Benefits Trust's provisions and procedures, resulting in changes in procedures, amendments to the trust document, change of trustees, and similar transactions that would affect the administration of the trust.

Block 966 receives Death Claims proceeds payment from the life insurance company, Block 930, FIG. 31. The proceeds in excess of the premiums are recorded as gains and added to the assets-under-management.

In Block 968, the Trustee calculates the Variance between the total assets and liabilities. The variance analysis will result in a match-funded, under-funded or over-funded asset account.

If the benefit liability and fiduciary responsibility remains with the plan sponsor, the calculation is performed for each replacement plan for each plan sponsor. For example, if USCo is sponsoring a synthetic defined contribution plan, with current liabilities of $10,000,000.00 and dedicated trust assets of $10,500,000.00, the plan is over-funded by $500,000.00.

For those plans in which the liability and fiduciary responsibility has been assigned to a third-party provider, the calculation may be performed on a plan-by-plan basis or on an aggregate basis. For example, a sub-trust is created to assume the fiduciary responsibility for a master synthetic defined contribution plan, and several employers are using the master plan for their overseas employees. If the total liability for the plans, in the aggregate, is $100 million and the trust assets total $99 million, the trust is under-funded by $1 million.

In Block 970, the logic continues by using the results of the variance analysis to determine the adjustments to the asset allocation of the trust assets. The revised asset allocation is transmitted to the investment management sub-advisors, Block 604, FIG. 19 via the Investment Advisor, if life insurance is being used as the funding device. In calculating the adjustments the system uses various methods, including Modern Portfolio Theory and Efficient Frontier Analysis to derive asset allocation decisions. As part of the analysis, the participant's allocation must be considered, which is available electronically from the Plan Administrator, Block 282, FIG. 10. For example, in an $1 million under-funded situation, the asset allocation analysis can determine that a higher rate of return is needed to make up the deficit. The extent of the higher return will depend on the projected performance of the participants' allocation. If the participant's allocation is projected to yield a fixed-income return (6% to 9%), the allocation adjustment may not need to be as aggressive, as if the participants' allocation was a S&P return (10% to 12%).

In Block 972, the logic uses the asset allocation adjustments to determine the distribution of the investment funds to the various investment management sub-advisors. When a plan is initially implemented and the initial contribution is invested, the system will determine the initial distribution of funds to the sub-advisors, Block 602, FIG. 19 and produce an investment policy for the sub-advisors, Block 606, FIG. 19. Subsequent asset allocation adjustments may require shifting assets from one investment manager to another. For example, if an asset allocation adjustment requires increased investments in aggressive equities and less in government bonds, funds may be moved from the government bond manager to the small company equity manager. When life insurance is used as the primary funding vehicle, the gross distribution is made to the insurance company, acting as the investment advisor, Block 700, FIG. 21, which then distributes the assets to the appropriate sub-advisors.

In Block 974, the Trustee receives benefit claim requests from the Plan Administrator, FIGS. 10 and 11, and verifies with the appropriate sub-trust that the decedent is a plan participant and eligible for the benefit request. The Master Trustee collaborates with the Plan administrator as necessary to authenticate the claim. As the owner of any life insurance policies, the Trustee submits all death claims to the insurance company, Block 920, FIG. 31, for processing and payment of the claim.

In Block 976, Replacement Plan Benefit Payments are calculated by the sub-trust managing the plan, based on the plan provisions, vesting and benefit liability and confirmed by the Master Trust. The benefit payment is based on the growth of the participant's benefit liability and not the growth of the trust assets. For example, a participant in a Cost Reduction Incentive Plan had a contribution of $100,00.00 set aside for his benefit, payable in 10 years. During the 10 years the benefit grew to $250,000.00, based on the participant's selection of hypothetical investments. On the tenth anniversary of the participant's entry into the plan, a $250,000.00 payment is made to the participant, either as a lump sum or an annuity, irregardless of the return realized on the trust assets.

For death claims, Block 976 receives the calculation of the death benefit from the life insurance company, Block 924, FIG. 31, which is verified and recorded.

In Block 978, the benefit payment is authorized by the appropriate sub-trust and confirmed by the Master Trust before being transmitted to the Plan Administrator, Block 255, FIG. 9, for payment. Once the claim is verified as a valid claim and the benefit is calculated, the Trustee ensures that the funds are available for the payment before authorizing payment.

In Block 986, the Replacement Plan Data and Trust Data is transmitted to the various sub-trusts held under the Master Trust Central Administration Computer. The sub-trusts are used to provide the fiduciary accounting for each replacement plan, and different types of trusts are used to meet the designs of different plans.

In Block 980, trust accounting data from the Various Sub-trusts is entered into the Master Trust system.

In Block 982, the Master Trust generates Output Reports, detailing the assets under management, the asset allocation, the benefit claims paid and pending, the accounting reconciliations, the investment transactions, and similar reports, as needed for specific purposes. The Master Trust Output Reports generated will be unique to the system in place and used by the Trustee for the Replacement Plan. The Trustee for this invention is anticipated to be a major international financial institution with established systems and a global custody network for tracking assets held by investment managers in most major countries of the world. This invention will interface with the Trustee's existing systems to produce a seamless service network system. Where adaptations are required, they will need to be customized for the end user.

In Block 984, the assets-under-management total is transmitted to the Revenue Accounting Computer 72, Block 1216, FIG. 37, for the calculation of co-trustee fees.

Figure 33:
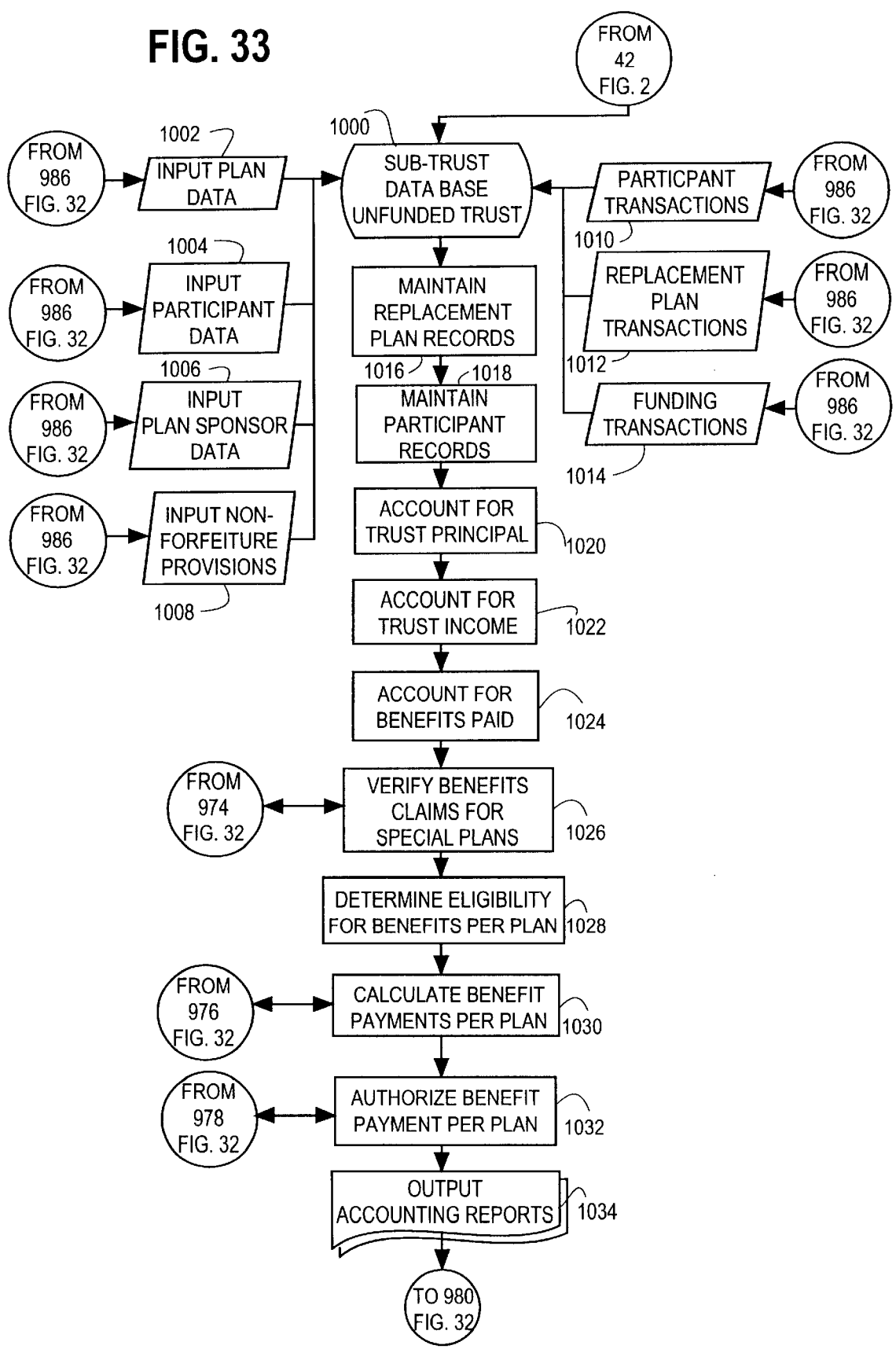
FIG. 33 is a logic flow diagram for administering the accounting for the unfunded sub-trust for the administering of the replacement plan funding assets.

Continuing to FIG. 33, an "Unfunded, Deferred Taxation Sub-Trust" is created by the Master Trust or alternatively, by the Plan Sponsor, for certain Benefit Replacement Plans. Specific types of Sub-Trusts are created for certain replacement plans depending on the plan design and/or the plan sponsor's preferences. This particular trust is considered unfunded and defers taxation based on the existence of certain "Risks of Forfeiture." In the U.S., as in most jurisdictions, to avoid current taxation of contributions made into an "unfunded" benefit trust, substantial risks of forfeiture must exist to avoid current taxation. Typically, substantial risks include change of control, change of heart, inability to pay benefits and plan sponsor bankruptcy. The participant is, in effect, a general creditor of the plan sponsor. If the plan sponsor's objective is to tie the participants to their employment with the plan sponsor, the unfunded trust will accomplish that objective for most replacement plans.

Block 1000 is the Unfunded Sub-Trust Database, which records and maintains data and transaction files for the management and accounting of certain replacement plans.

Block 1002 receives Plan Data input from the master Trust, Block 986, FIG. 32, for the particular plan that is to be maintained within the sub-trust.

Block 1004 receives Participant Data input from the master Trust, Block 986, FIG. 32, for the particular plan that is to be maintained within the sub-trust.

Block 1006 receives Plan Sponsor Data input from the master Trust, Block 986, FIG. 32, for the particular plan that is to be maintained within the sub-trust.

Block 1008 receives the Non-Forfeiture Provisions input from the master Trust, Block 986, FIG. 32, for the particular plan that is to be maintained within the sub-trust.

Block 1010 receives the Participant's Transactions input from the master Trust, Block 986, FIG. 32, for the particular plan that is to be maintained within the sub-trust.

Block 1012 receives the Replacement Plan Transactions input from the master Trust, Block 986, FIG. 32, for the particular plan that is to be maintained within the sub-trust.

Block 1014 receives the Funding Transactions input from the master Trust, Block 986, FIG. 32, for the particular plan that is to be maintained within the sub-trust.

Block 1016 maintains the Replacement Plan Records. The trust agreement is drafted to parallel the plan document and facilitate the plan's management. The trust computer records all changes and transactions. The plan changes that require changes to the trust agreement are identified and processed.

In Block 1018, the Participant Records are maintained. Almost all of the replacement plans require separate accounting for each plan participant. Records of participants' transactions and communications are maintained electronically.

Block 1020 accounts for all Trust Principal in accordance with trust accounting rules. Trust contributions are usually considered principal, while the earnings on the principal is considered income. Accounting is in accordance with Generally Accepted Accounting Principles (GAAP).

Block 1022 accounts for all Trust Income in accordance with trust accounting rules. Accounting is in accordance with Generally Accepted Accounting Principles (GAAP).

In Block 1024, the records of all Benefits Paid are maintained and archived electronically.

In Block 1026, Benefit Claims request are received from the Master Trust, Block 974, FIG. 32, for verification of the claimant's participation in a plan.

In Block 1028, the Participant's eligibility for benefits is determined, comparing plan requirements to the participant's fulfillment of those requirements. Compliance with non-forfeiture provisions is also verified.

In Block 1030, the Benefit Payment is calculated and transmitted to the Master Trust, Block 976, FIG. 32.

In Block 1032, authorization to pay the benefit is transmitted to the Master Trust, Block 978, FIG. 32.

In Block 1034, the sub-trust generates accounting reports to be submitted to the Master Trust, Block 980, FIG. 32. The reports will include a transactions log, accounting reports delineating contributions (principal) and earnings (income), claims and benefit payments logs, and other reports needed to manage the replacement plans. The Sub-Trust Accounting Reports generated will be unique to the system in place and used by the Trustee for the Replacement Plan. The Trustees for this invention are anticipated to be major international financial institutions with established systems and a global custody network for tracking assets held by investment managers in most major countries of the world. This invention will interface with the Trustee's existing systems to produce a seamless service network system. Where adaptations are required, they will need to be customized for the end user.

Figure 34:
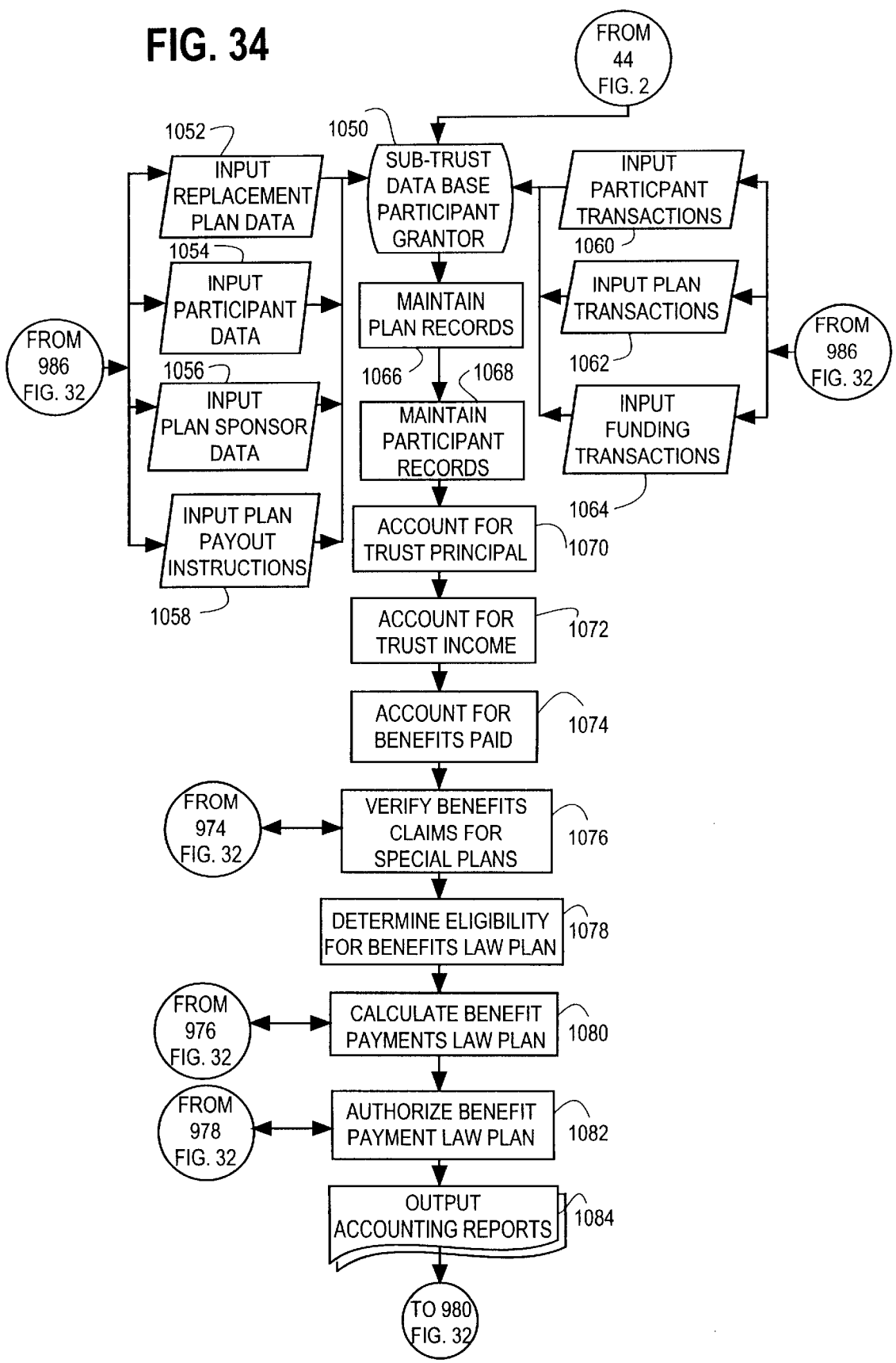
FIG. 34 is a logic flow diagram for administering the accounting for the funded, participant owned sub-trust for the administering of the replacement plan funding assets.

Continuing to FIG. 34, an "Funded, Immediately Taxable Participant Sub-Trust" is created by the Participant through the Master Trust for certain Benefit Replacement Plans, where the participant is deemed to own the trust and corresponding assets. This particular trust is considered funded and subject to immediate taxation when the contribution is made. The plan sponsor receives a corresponding tax deduction when the contribution is made.

Block 1050 is the Participant-Owned Sub-Trust Database, which records and maintains data and transactions files for the management and accounting of certain replacement plans.

Block 1052 receives Plan Data input from the master Trust, Block 986, FIG. 32, for the particular plan that is to be maintained within the sub-trust.

Block 1054 receives Participant Data input from the master Trust, Block 986, FIG. 32, for the particular plan that is to be maintained within the sub-trust.

Block 1056 receives Plan Sponsor Data input from the master Trust, Block 986, FIG. 32, for the particular plan that is to be maintained within the sub-trust.

Block 1058 receives the Distributions Payout Provisions input from the master Trust, Block 986, FIG. 32, for the particular plan that is to be maintained within the sub-trust.

Block 1060 receives the Participant's Transactions input from the master Trust, Block 986, FIG. 32, for the particular plan that is to be maintained within the sub-trust.

Block 1062 receives the Replacement Plan Transactions input from the master Trust, Block 986, FIG. 32, for the particular plan that is to be maintained within the sub-trust.

Block 1064 receives the Funding Transactions input from the master Trust, Block 986, FIG. 32, for the particular plan that is to be maintained within the sub-trust.

Block 1066 maintains the Replacement Plan Records. The trust agreement is drafted to parallel the plan document and facilitate the plan's management. The trust computer records all changes and transactions. The plan changes that require changes to the trust agreement are identified and processed.

In Block 1068, the Participant Records are maintained. Almost all of the replacement plans require separate accounting for each plan participant. Records of participants' transactions and communications are maintained electronically.

Block 1070 accounts for all Trust Principal in accordance with trust accounting rules. Trust contributions are usually considered principal, while the earnings on the principal is considered income. Accounting is in accordance with Generally Accepted Accounting Principles (GAAP).

Block 1072 accounts for all Trust Income in accordance with trust accounting rules. Accounting is in accordance with Generally Accepted Accounting Principles (GAAP).

In Block 1074, the records of all Distributions and/or Benefits Paid are maintained and archived electronically.

In Block 1076, Distribution Requests are received from the Master Trust, Block 974, FIG. 32, for verification of the claimant's participation in a plan.

In Block 1078, the Participant's eligibility for distribution is determined, comparing plan requirements to the participant's fulfillment of those requirements.

In Block 1080, the Distribution Payment is calculated and transmitted to the Master Trust, Block 976, FIG. 32.

In Block 1082, authorization to pay the distribution is transmitted to the Master Trust, Block 978, FIG. 32.

In Block 1084, the sub-trust generates accounting reports to be submitted to the Master Trust, Block 980, FIG. 32. The reports will include a transactions log, accounting reports delineating contributions (principal) and earnings (income), claims and benefit payments logs, and other reports needed to manage the replacement plans. The Sub-Trust Accounting Reports generated will be unique to the system in place and used by the Trustee for the Replacement Plan. The Trustees for this invention are anticipated to be major international financial institutions with established systems and a global custody network for tracking assets held by investment managers in most major countries of the world. This invention will interface with the Trustee's existing systems to produce a seamless service network system. Where adaptations are required, they will need to be customized for the end user.

Figure 35:
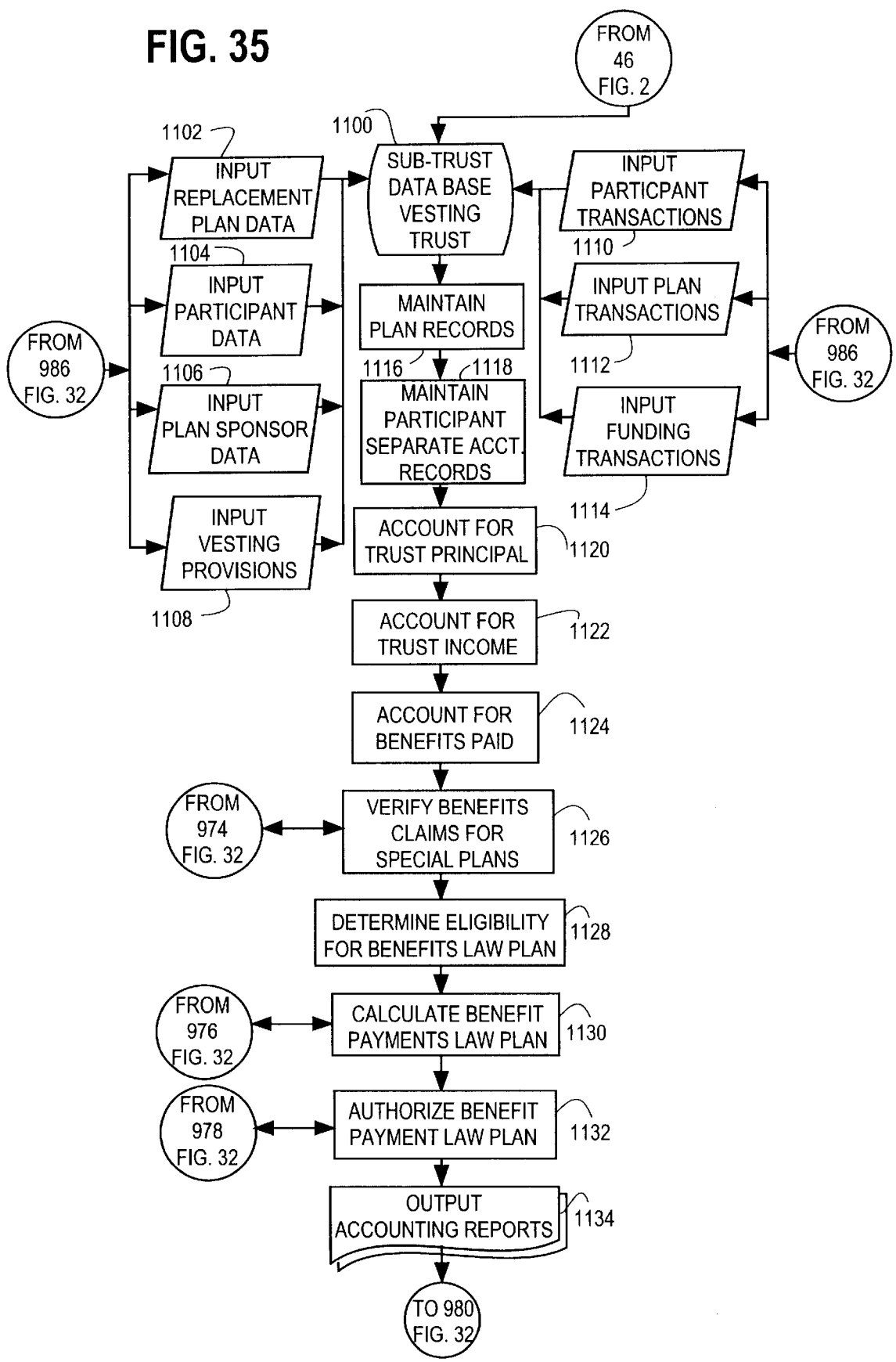
FIG. 35 is a logic flow diagram for administering the accounting for the funded vesting sub-trust for the administering of the replacement plan funding assets.

Continuing to FIG. 35, an "Funded, Third-Party Vesting Sub-Trust" is created by the Master Trust for certain Benefit Replacement Plans. This particular trust is considered funded and defers taxation based on the existence of a vesting schedule. The plan sponsor is not the grantor of this sub-trust, and therefore, avoids the adverse accounting and tax effects of being the grantor. This sub-trust arrangement is the preferred arrangement for most replacement plans. It allows for the portability of the participants' benefits and is easier to administer.

Block 1100 is the Funded, Third-Party Vesting Sub-Trust Database, which records and maintains data and transaction files for the management and accounting of certain replacement plans.

Block 1102 receives Plan Data input from the master Trust, Block 986, FIG. 32, for the particular plan that is to be maintained within the sub-trust.

Block 1104 receives Participant Data input from the master Trust, Block 986, FIG. 32, for the particular plan that is to be maintained within the sub-trust.

Block 1106 receives Plan Sponsor Data input from the master Trust, Block 986, FIG. 32, for the particular plan that is to be maintained within the sub-trust.

Block 1108 receives the Vesting Provisions input from the master Trust, Block 986, FIG. 32, for the particular plan that is to be maintained within the sub-trust.

Block 1110 receives the Participant's Transactions input from the master Trust, Block 986, FIG. 32, for the particular plan that is to be maintained within the sub-trust.

Block 1112 receives the Replacement Plan Transactions input from the master Trust, Block 986, FIG. 32, for the particular plan that is to be maintained within the sub-trust.

Block 1114 receives the Funding Transactions input from the master Trust, Block 986, FIG. 32, for the particular plan that is to be maintained within the sub-trust.

Block 1116 maintains the Replacement Plan Records. The trust agreement is drafted to parallel the plan document and facilitate the plan's management. The trust computer records all changes and transactions. The plan changes that require changes to the trust agreement are identified and processed.

In Block 1118, the Participant Records are maintained. All of the replacement plans using this sub-trust require separate accounting for each plan participant. Records of participants' transactions and communications are maintained electronically.

Block 1120 accounts for all Trust Principal in accordance with trust accounting rules. Trust contributions are usually considered principal, while the earnings on the principal is considered income. Accounting is in accordance with Generally Accepted Accounting Principles (GAAP).

Block 1122 accounts for all Trust Income in accordance with trust accounting rules. Accounting is in accordance with Generally Accepted Accounting Principles (GAAP).

In Block 1124, the records of all Benefits Paid are maintained and archived electronically.

In Block 1126, Benefit Claims request are received from the Master Trust, Block 974, FIG. 32, for verification of the claimant's participation in a plan.

In Block 1128, the Participant's eligibility for benefits is determined, comparing plan requirements to the participant's fulfillment of those requirements. Compliance with vesting provisions is verified.

In Block 1130, the Benefit Payment is calculated and transmitted to the Master Trust, Block 976, FIG. 32.

In Block 1132, authorization to pay the benefit is transmitted to the Master Trust, Block 978, FIG. 32.

In Block 1134, the sub-trust generates accounting reports to be submitted to the Master Trust, Block 980, FIG. 32. The reports will include a transactions log, accounting reports delineating contributions (principal) and earnings (income), claims and benefit payments logs, and other reports needed to manage the replacement plans. The Sub-Trust Accounting Reports generated will be unique to the system in place and used by the Trustee for the Replacement Plan. The Trustees for this invention are anticipated to be major international financial institutions with established systems and a global custody network for tracking assets held by investment managers in most major countries of the world. This invention will interface with the Trustee's existing systems to produce a seamless service network system. Where adaptations are required, they will need to be customized for the end user.

Figure 36:
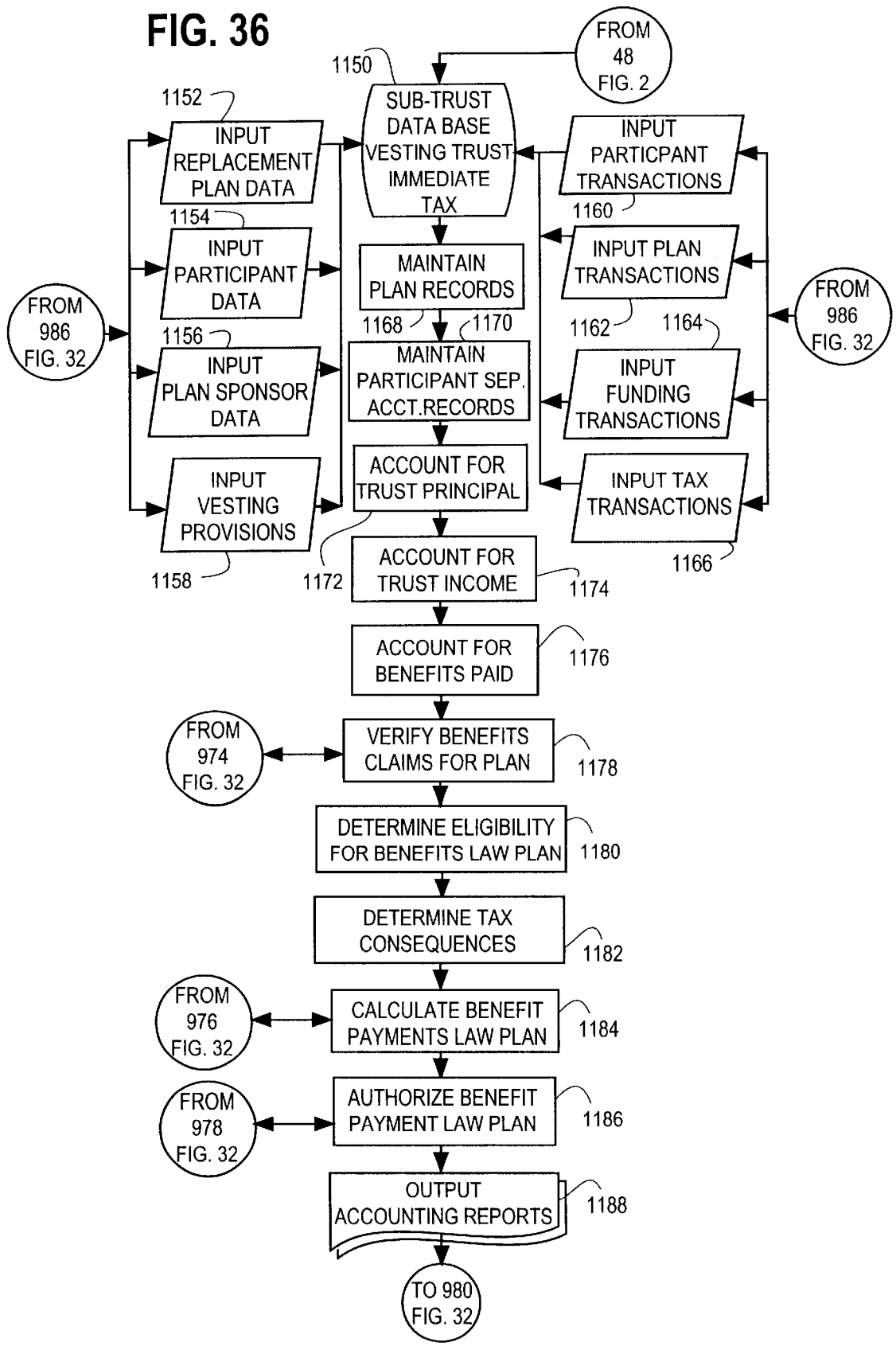
FIG. 36 is a logic flow diagram for administering the accounting for the funded, currently taxable, vesting sub-trust for the administering of the replacement plan funding assets.

Continuing to FIG. 36, an "Funded, Third-Party Vesting Sub-Trust with Immediate Taxation" is created by the Master Trust for certain Benefit Replacement Plans. This particular trust is considered funded and makes benefit distributions based on the existence of a vesting schedule. The sub-trust provisions allow for an election to claim the contribution as income to the participant when the trust is funded, under IRC Section 83 (b). The plan sponsor receives an immediate tax deduction when the contribution is made. This sub-trust arrangement is the preferred arrangement for replacement plans that may extend beyond the life of the plan sponsor. It allows for the portability of the participants' benefits and saves the tax deduction for a business entity that is to be dissolved at the end of a project. For example, an oil company may want to use a 10-year vesting plan for the employees of a two-year exploration joint venture. Since the joint venture company will be dissolved before the benefits are paid in 10 years, the company can take the tax deduction currently while the employees receive their benefits in the future. Using this arrangement, the plan sponsor will usually pay the tax for participant that is currently incurred, in exchange for the participant paying the tax on the earnings at distribution.

Block 1150 is the Funded, Third-Party Vesting Sub-Trust with Immediate Taxation Database, which records and maintains data and transaction files for the management and accounting of certain replacement plans.

Block 1152 receives Plan Data input from the master Trust, Block 986, FIG. 32, for the particular plan that is to be maintained within the sub-trust.

Block 1154 receives Participant Data input from the master Trust, Block 986, FIG. 32, for the particular plan that is to be maintained within the sub-trust.

Block 1156 receives Plan Sponsor Data input from the master Trust, Block 986, FIG. 32, for the particular plan that is to be maintained within the sub-trust.

Block 1158 receives the Vesting and Tax Provisions input from the master Trust, Block 986, FIG. 32, for the particular plan that is to be maintained within the sub-trust.

Block 1160 receives the Participant's Transactions input from the master Trust, Block 986, FIG. 32, for the particular plan that is to be maintained within the sub-trust.

Block 1162 receives the Replacement Plan Transactions input from the master Trust, Block 986, FIG. 32, for the particular plan that is to be maintained within the sub-trust.

Block 1164 receives the Funding Transactions input from the master Trust, Block 986, FIG. 32, for the particular plan that is to be maintained within the sub-trust.

Block 1166 receives the Income Tax Transactions, which is the plan sponsor's decision to elect immediate taxation, under IRC Section 83(b).

Block 1168 maintains the Replacement Plan Records. The trust agreement is drafted to parallel the plan document and facilitate the plan's management, The trust computer records all changes and transactions. The plan changes that require changes to the trust agreement are identified and processed.

In Block 1170, the Participant Records are maintained. All of the replacement plans using this sub-trust arrangement require separate accounting for each plan participant. Records of participants' transactions and communications are maintained electronically.

Block 1172 accounts for all Trust Principal in accordance with trust accounting rules. Trust contributions are usually considered principal, while the earnings on the principal is considered income. Accounting is in accordance with Generally Accepted Accounting Principles (GAAP).

Block 1174 accounts for all Trust Income in accordance with trust accounting rules. Accounting is in accordance with Generally Accepted Accounting Principles (GAAP).

In Block 1176, the records of all Benefits Paid are maintained and archived electronically.

In Block 1178, Benefit Claims request are received from the Master Trust, Block 974, FIG. 32, for verification of the claimant's participation in a plan.

In Block 1180, the Participant's eligibility for benefits is determined, comparing plan requirements to the participant's fulfillment of those requirements. Compliance with vesting and tax provisions is also verified.

In Block 1182, the Tax Consequences, under the applicable jurisdiction's tax code, is determined and the reporting requirements are documented, which are forwarded to the participant.

In Block 1184, the Benefit Payment is calculated and transmitted to the Master Trust, Block 976, FIG. 32., along with the tax consequences documentation.

In Block 1186, authorization to pay the benefit is transmitted to the Master Trust, Block 978, FIG. 32.

In Block 1188, the sub-trust generates accounting reports to be submitted to the Master Trust, Block 980, FIG. 32. The reports will include a transactions log, accounting reports delineating contributions (principal) and earnings (income), claims and benefit payments logs, and other reports needed to manage the replacement plans. The Sub-Trust Accounting Reports generated will be unique to the system in place and used by the Trustee for the Replacement Plan. The Trustees for this invention are anticipated to be major international financial institutions with established systems and a global custody network for tracking assets held by investment managers in most major countries of the world. This invention will interface with the Trustee's existing systems to produce a seamless service network system. Where adaptations are required, they will need to be customized for the end user.

Turning to FIG. 37, the Revenue Accounting Computer 72 is used to account for the revenue generated by the invention from the various sources. The revenue is based on fees paid by plan sponsors and providers. The Revenue Generating Computer 72 is linked directly with to the Central Digital Computer 2 and communicates with each of the other computer systems for the collection of data. The computer receives data input from each revenue source, applies the agreed revenue formula stored in its database, calculates the division of revenue, issues checks to the appropriate providers, and generates reports detailing the source and division of revenue.

Block 1202 receives an input from the Plan Administration Computer (Block 278, FIG. 9) of the number of participants in an existing replacement plan. For example, if there are 500 participants in a Pension Gap plan, then 500 is entered. The number of participants in a new plan is received from Block 252, FIG. 8 for the determination of the first-year participation fee. For example, if a Severance plan is implemented with 100 new participants, then 100 is entered.

Block 1200 calculates the Per Capita Participation Fee by applying the fee rate times the number of participants. For example, if the first-year participation fee is $1,000 per capita, the total participation fee for 500 participants is $500,000.00. The rate for ongoing participation, which may be less than the first-year rate, is applied to the ongoing participants.

In Block 1204, the Finder's Fee is calculated for the consultant or other entity that brought the client to the program. The Finder's Fee is paid out of the Participation Fees, based on an agreed formula. For example, if the Finder's Fee is 50% of a $1,000.00 first-year participation fee on a per capita basis, then the finder receives $250,000.00 for a 500 participant plan.

In Block 1206, the Finder (marketer) is issued a check in the net amount of the Finder's Fee from the Revenue Accounting Computer 72.

Block 1208 receives an input from the Plan Administration Computer (Block 278, FIG. 9) of the number of participants in a replacement plan. For example, if there are 500 participants, then 500 is entered. If 100 new participants are added, then 100 is entered as it happens.

Block 1210 calculates the Per Capita Annual Administrative Fee by applying the fee rate times the number of new participants. For example, if the participation fee is $100 per capita, the total administrative fee for 500 participants is $50,000.00. The per capita rate for administration can decrease as the number of participants increases.

In Block 1212, the Third-Party Administrator's (TPA) fee is calculated for the consultant or other entity to which the plan administration is being out-sourced. For example, if the TPA's Fee is $50.00 per capita, then the TPA receives $25,000.00 for 500 participants.

In Block 1214, the TPA is issued a check in the net amount of their Administrator's Fee from the Revenue Accounting Computer 72.

Block 1216 receives an input of the total Trust assets-under-management from the Master Trust (Block 984, FIG. 32).

In Block 1218, the Co-Trustee fees are calculated as a percentage of the AUM or the Trustee fees. For example, the Co-Trust fees may be 25 basis points of the AUM or 20% of the Trustee Fees.

In Block 1220, the Net Payment to the Master Trustee is calculated. Trustee fees vary among institutions, but for example, if the Trustee fees are 1.5% of assets under management and the co-trustee fee is 0.3%, a net fee of 1.2% is due the Master Trustee.

In Block 1222, the Master Trustee is paid from the Revenue Accounting Computer 72. If the assets-under-management total $10 million and the net Trustee Fee is 1.2%, the net Trustee fee paid is $120,000.00.

Block 1224 receives an input of the total new Insurance Premium amount from Block 700, FIG. 21.

In Block 1226, the Policy Fee is calculated, if applicable. For example, this can be a 1% fee on all new premium paid into the policy.

In Block 1228, the Net Premium Amount is forwarded to the insurance carrier to be applied to the policy. For example, the plan sponsor makes a net replacement plan contribution of $10 million, which is to be invested into a life insurance policy by the Trustee. The contribution is received by the Central Computer, which retains the $100,000.00 policy fee (1%) and forwards the remaining funds to the insurance company. Otherwise, the total premium is forwarded to the insurance company, which then pays the policy fee directly to the Replacement Plan provider. In this case, the Revenue Accounting Computer 72 calculates the policy fee only for verification of its correct payment.

Block 1230 receives the amount of Total Assets-Under-Management as input from Block 624, FIG. 19.

In Block 1232, the Investment Trailers are calculated. The Trailer Fees are usually calculated as a percentage of the investment advisory fees, paid annually. The Asset Trailer may be percentage of the advisory fee. For example, if the investment advisory fee is 1% and the Asset Trailer is 20% of the advisory fee, the Trailer fee would be $2,000.00 per $1 million of AUM paid annually. The trailer is paid by the insurance company, as the account manager, or the sub-advisors directly.

Block 1234 receives the input of the amount of risk assumed by the reinsurance company from Block 908, FIG. 30.

In Block 1236, the revenue from the reinsurance arrangement is calculated using the agreed revenue sharing arrangement. The insurance carrier pays the fee.

Block 1238 receives the input number of uses of the Internet Financial Services from Block 512, FIG. 17.

In Block 1240, the revenue from the Internet Financial Services revenue sharing arrangement is used to calculate the expected revenue. It is paid by the service providers.

In Block 1242, the Total Revenue from all sources is calculated by adding the participation fees, administrative fees, co-trustee fees, policy fees, investment trailers, reinsurance fees, and financial services fees.

In Block 1244, the calculations are detailed in separate reports for each provider and a consolidated statement for the use of the Replacement Plan provider.

Turning now to the specimens, consider the following:

SPECIMEN SAMPLES
Table of Contents

| Fig. | Output Reports | Specimen |
|---|---|---|
| 3 | Replacement Plan Illustration | 1 |
| 9 | Plan Sponsor Administration Guide | 2 |
| 14 | Participant's Statement of Account | 3 |
|  | Plan Sponsor Asset Allocation Report | 4 |
|  | Plan Sponsor Payment Summary | 5 |
|  | Plan Sponsor Asset/Liability Comparison | 6 |
|  | Plan Sponsor Contribution Confirmation | 7 |
|  | Participant's Hypothetical Fund Performance Report | 8 |
|  | Participant's Transaction Confirmation Statement | 9 |
| 17 | Private Banking Internet Services Offering | 10 |
| 20 | Asset Reconciliation Report | 11 |
| 21 | Trustee's Cash Value Reports | 12 |
|  | Plan Sponsor's Cash Value Report | 13 |
|  | Offshore Group PPVUL Product Specifications | 14 |
| 17 | Strategic Investment Plan - Internet Services Offering | 15 |

Thus, it can be seen that this invention is a valuable tool that allows meeting the objectives of the invention. As a result, it is respectfully submitted that this invention improves significantly over the known prior art. While the above description contains many specificities, these should not be construed as limitations on the scope of the invention, but rather as an exemplification of one preferred embodiment thereof. Many other variations are possible such as, but not limited to, those described in the Objects and Advantages section above. Thus, the scope of the invention should be determined by the appended claims and their legal equivalents, rather than by the principal embodiment and other examples described above.

SPECIMEN 1

**REPRESENTATIVE SAMPLE
OF AN
ILLUSTRATION
FOR A
REPLACEMENT PLAN
FOR A
401(k) RETIREMENT PLAN**

SAMPLE REPLACEMENT PLAN
For a 401(k) Plan

Specimen 1

Participant Summary Illustration:

Sample Assumptions:

Participant:
    Current Age: 45
    Tax Rate: 40.00%
    Retirement Age: 65

401(k) Plan:
    Current Balance: $100,000
    Annual Contribution: $10,000
    Rate of Return: 10.00%
    Participation Lapse (yrs.): 5

Replacement Plan:
    Contribution: $50,000
    Vesting (yrs.): 20

Insurance Policy:
    Single Premium: $50,000
    Net Crediting Rate: 10.00%
    MEC Contract: Yes Timing Assumptions:
    Contributions: End of Year
    Interest: End of Year
    Taxes: End of Year
    Benefit Payments: End of Year

SAMPLE REPLACEMENT PLAN
For a 401(k) Plan

Specimen 1

Participant Summary Illustration:

| Year | Age | SECTION A 401(k)Plan w/o Lapse | | SECTION B 401(k) w Lapse | | SECTION C Replacement Plan | |
|---|---|---|---|---|---|---|---|
| | | Account Balance | Annual Contribut'n | Account Balance | Annual Contribut'n | Account Balance | Annual Contribut'n |
| 1999 | 45 | 100,000 | 10,000 | 100,000 | 0 | 0 | 50,000 |
| 2000 | 46 | 120,000 | 10,000 | 110,000 | 0 | 50,000 | 0 |
| 2001 | 47 | 142,000 | 10,000 | 121,000 | 0 | 55,000 | 0 |
| 2002 | 48 | 166,200 | 10,000 | 133,100 | 0 | 60,500 | 0 |
| 2003 | 49 | 192,820 | 10,000 | 146,410 | 0 | 66,550 | 0 |
| 2004 | 50 | 222,102 | 10,000 | 161,051 | 10,000 | 73,205 | 0 |
| 2005 | 51 | 254,312 | 10,000 | 187,156 | 10,000 | 80,526 | 0 |
| 2006 | 52 | 289,743 | 10,000 | 215,872 | 10,000 | 88,578 | 0 |
| 2007 | 53 | 328,718 | 10,000 | 247,459 | 10,000 | 97,436 | 0 |
| 2008 | 54 | 371,590 | 10,000 | 282,205 | 10,000 | 107,179 | 0 |
| 2009 | 55 | 418,748 | 10,000 | 320,425 | 10,000 | 117,897 | 0 |
| 2010 | 56 | 470,623 | 10,000 | 362,468 | 10,000 | 129,687 | 0 |
| 2011 | 57 | 527,686 | 10,000 | 408,715 | 10,000 | 142,656 | 0 |
| 2012 | 58 | 590,454 | 10,000 | 459,586 | 10,000 | 156,921 | 0 |
| 2013 | 59 | 659,500 | 10,000 | 515,545 | 10,000 | 172,614 | 0 |
| 2014 | 60 | 735,450 | 10,000 | 577,099 | 10,000 | 189,875 | 0 |
| 2015 | 61 | 818,995 | 10,000 | 644,809 | 10,000 | 208,862 | 0 |
| 2016 | 62 | 910,894 | 10,000 | 719,290 | 10,000 | 229,749 | 0 |
| 2017 | 63 | 1,011,983 | 10,000 | 801,219 | 10,000 | 252,724 | 0 |
| 2018 | 64 | 1,123,182 | 10,000 | 891,341 | 10,000 | 277,996 | 0 |
| 2019 | 65 | 1,245,500 | 10,000 | 990,475 | 10,000 | 305,795 | 0 |
| less: Tax | | (498,200) | | (396,190) | | (122,318) | |
| Sub-Totals | | 747,300 | | 594,285 | | 183,477 | |

| | | |
|---|---|---|
| NET INCOME | $747,300 | $777,762 |
| Replacement Plan Improvement | | $30,462  4.08% |

SPECIMEN 2

**REPRESENTATIVE SAMPLE
OF A
PLAN SPONSOR'S ADMINISTRATIVE GUIDEBOOK
FOR A
REPLACEMENT PLAN
FOR A
DEFERRED COMPENSATION PLAN**

Sample Table Of Contents

Section 1   *Plan Administrator and Contact Listing*
        About
        Tax, Legal, Actuarial and Accounting Information
        Administration Contact Listing
        Plan Sponsor Contact Listing

Section 2   *Background Information*
        Plan Inception
        Design Parameters
        Underwriting Offer Letter

Section 3   *Product Selection and Specifications*
        Product Overview
        Investment Options

Section 4   *Plan Illustrations and Annual Performance Evaluations*
*Initial Illustrations*
        Assumptions
        Sample Initial Composite Illustration
*Current Investment Allocation* – {this section is reserved to insert future reports}
*Anniversary Performance Reports* - {this section is reserved to insert future reports}
*Anniversary Investment Allocation Reports* - {this section is reserved to insert future reports}

Section 5   *Plan Administration*
*Plan Phases*
        Deferral Phase
        Distribution Phase
*Participant Additions and Changes*
        New Participant Enrollments
        Change of Status
        Smoker Status Review
        Annual Compensation Update
        Death Tracking
        Death Claim Procedures

Sample Table Of Contents (continued)

| | |
|---|---|
| Section 6 | *Premium Payment and Transfer Procedures*<br>Funds Payment and Transfer Procedures<br>Wire and Check Instructions |
| Section 7 | *Plan Service Calendar* |
| Section 8 | *Plan Servicing Agreement* |
| Section 9 | *Sample Reports*<br>*Plan Sponsor Reports*<br>    Premium Confirmation<br>    Current Hypothetical Fund Allocation<br>    Asset/Liability Comparison<br>    Payment Summary<br>*Participant Reports*<br>    Participant Statement<br>    Fund Performance Report<br>    Confirmation Statements<br>        Deferral Confirmation<br>        Realignment Confirmation<br>        Payment Confirmation |
| Section 10 | *Processing Forms*<br>*Policy Administration*<br>    Fax Cover Page<br>    Request for Annual Illustration<br>    Premium Allocation Form<br>    Re-balancing Form<br>*Participant Administration*<br>    Request to Add New Participant<br>    Beneficiary Declaration and Deferral Election<br>    Employee Status Notification Form<br>    Death Claim Notification Form |

SAMPLE DEFERRED COMPENSATION PLAN SERVICE CALENDAR

Policy Date: January 1, 1998

| Description | Due Date | Sent To | |
|---|---|---|---|
| Participant Deferral Information | Five business days prior to receipt of premium | | Electronic file sent via e-mail or on diskette |
| Premium Payment | Monthly | [Carrier] | Via check or wire |
| Premium Confirmation | Three business days after effective date | [Plan Sponsor] | |
| Deferral Confirmation | Fifteen business days after effective date | [Plan Sponsor] | |
| Fee Payment | Jan. 1 | | Via check or wire |
| Year End Cash Surrender Value Report | Jan. 15 | [Plan Sponsor] | |
| Asset/Liability Comparison | Jan. 15 | [Plan Sponsor] | Based upon current Allocations |
| Participant Statements | Jan. 15, Apr. 15, July 15, Oct. 15 | [Plan Sponsor] | |
| Fund Performance Report | Jan. 15, Apr. 15, July 15, Oct. 15 | [Plan Sponsor] | |
| Fund Allocation Report | Jan. 15, Apr. 15, July 15, Oct. 15 | [Plan Sponsor] | |
| Re-Illustrations | Mar. 31 | [Plan Sponsor] | |
| New Participant Addition Notifications | Nov. 15 | | As Applicable |
| New Participants Enrollment Booklets | Nov. 20 | New Participants | As Applicable |
| Compensation Updates | Dec. 10 | | |
| Fee Billing | Dec. 15 | [Plan Sponsor] | |
| Re-Illustration Request | Dec. 15 | [Plan Sponsor] | |
| Re-Illustration Receipt | Dec. 31 | | |
| Death Claim Processing | As Applicable | | |

SPECIMEN 3

**REPRESENTATIVE SAMPLE
OF A
PARTICIPANT'S STATEMENT OF ACCOUNT
FOR A
REPLACEMENT PLAN
FOR A
DEFERRED COMPENSATION PLAN**

Run Date: 2/10/99

PLAN SPONSOR : Pilot Plan
Plan Statement From: 9/30/98 To: 12/31/98

Douglas Jeckyl
14939 Zenith Avenue
Lake Shores, ME 00050

Birth Date: 7/31/58

SSN: 900-00-0073

| Fund Name | Beginning Balance<br>Value As Of Closing On 9/30/98 | Deferral | Transfers Realign | Payments | Earnings (Losses) | Ending Balance<br>Value As Of Closing On 12/31/98 |
|---|---|---|---|---|---|---|
| BOND - 007 | | | | | | |
| Bonus | $0 | $0 | $26,435 | ($1,886) | ($29) | $24,520 |
| Match | $0 | $750 | $34,653 | $0 | ($34) | $35,368 |
| Salary | $0 | $3,000 | $36,236 | $0 | ($27) | $39,209 |
| Fund Total | $0 | $3,750 | $97,323 | ($1,886) | ($90) | $99,097 |
| GROWTH | | | | | | |
| Bonus | $42,437 | $0 | ($13,028) | ($2,580) | $6,712 | $33,541 |
| Match | $55,642 | $750 | ($17,089) | $0 | $8,886 | $48,188 |
| Salary | $58,219 | $3,000 | ($17,903) | $0 | $9,550 | $52,865 |
| Fund Total | $156,297 | $3,750 | ($48,020) | ($2,580) | $25,148 | $134,595 |
| PRIZE FUND | | | | | | |
| Bonus | $48,850 | $0 | ($13,407) | ($2,593) | $859 | $33,709 |
| Match | $64,025 | $1,000 | ($17,563) | $0 | $1,113 | $48,575 |
| Salary | $66,917 | $4,000 | ($18,333) | $0 | $1,127 | $53,710 |
| Fund Total | $179,791 | $5,000 | ($49,303) | ($2,593) | $3,098 | $135,994 |
| Total | $336,089 | $12,500 | $0 | ($7,059) | $28,157 | $369,686 |

SPECIMEN 4

**REPRESENTATIVE SAMPLE
OF A
PLAN SPONSOR'S ASSET ALLOCATION REPORT
FOR A
REPLACEMENT PLAN
FOR A
DEFERRED COMPENSATION PLAN**

Current Hypothetical Fund Allocation

As of: 6/30/98

Project:
Sponsor: PLAN SPONSOR
Plan Group: Pilot Plan
Plan: Pilot Plan

Report Type: Liability
DC - Elective
Date: 7/24/98
Page: 1

| Fund Name | Fund Manager Name | Total Balance | Allocation |
|---|---|---|---|
| BOND - 007 | SAMPLE 1 fund mana | $2,740,272.75 | 14.99% |
| FIRST FUND | SAMPLE 3 fund mana | $1,936,782.84 | 10.60% |
| GROWTH | SAMPLE 1 fund mana | $2,335,686.51 | 12.78% |
| GROWTH _99 | SAMPLE 1 fund mana | $2,101,922.37 | 11.50% |
| PRIZE FUND | SAMPLE 2 fund mana | $1,420,154.43 | 7.77% |
| STAR FUND | SAMPLE 2 fund mana | $4,721,964.00 | 25.83% |
| SUPER FUND | SAMPLE 3 fund mana | $2,681,239.47 | 14.67% |
| TRUST FUND | SAMPLE 3 fund mana | $339,850.33 | 1.86% |
| | | $18,277,872.70 | 100.00% |
| | | $18,277,872.70 | |

SPECIMEN 5

**REPRESENTATIVE SAMPLE
OF A
PLAN SPONSOR'S PAYMENT SUMMARY
FOR ANY
REPLACEMENT PLAN**

Payment Summary

From: 10/1/98  To: 12/31/98

Project:
Sponsor: PLAN SPONSOR
Plan Group: Pilot Plan
Plan: Pilot Plan

Report Type: Liability

Date: 3/15/99
Page: 1

| Name | SSN | | | Payment |
|---|---|---|---|---|
| Jeckyl, Douglas | 900-00-0073 | | | |
| Date: 12/31/98 | Source | Fund | | Payment |
| | Bonus | BOND - 007 | | $1,886.15 |
| | | GROWTH | | $2,580.07 |
| | | PRIZE FUND | | $2,592.99 |
| | | Source Total: | $7,059.21 | |
| | | | Total: | $7,059.21 |

SPECIMEN 6

**REPRESENTATIVE SAMPLE
OF A
PLAN SPONSOR'S ASSET/LIABILITY COMPARISON
FOR A
REPLACEMENT PLAN
FOR A
DEFERRED COMPENSATION PLAN**

Asset / Liability Comparison

As of: 12/31/98

Project:
Sponsor: PLAN SPONSOR
Plan Group: DEFERRED COMP LIABILITY

Report: Combined
A/L Compare
Date: 1/29/99
Page: 1

ASSET FUND BALANCE

| Fund Name | Fund Manager Name | Total Balance | Vested Balance | As of Date |
|---|---|---|---|---|
| FUND A | SAMPLE 2 fund manager | $2,273,961.32 | $0.00 | 12/31/98 |
| FUND B | SAMPLE 3 fund manager | $1,314,429.38 | $0.00 | 12/31/98 |
| FUND C | SAMPLE 1 fund manager | $1,300,064 | $0.00 | 12/31/98 |
| FUND D | SAMPLE 2 fund manager | $1,220,403 | $0.00 | 12/31/98 |
| FUND F | SAMPLE 3 fund manager | $748,040.94 | $0.00 | 12/31/98 |
| FUND G | SAMPLE 1 fund manager | $2,880,495 | $0.00 | 12/31/98 |
| FUND J | SAMPLE 1 fund manager | $1,800,783 | $0.00 | 12/31/98 |
| FUND L | SAMPLE 2 fund manager | $206,484.30 | $0.00 | 12/31/98 |
|  |  | $9,470,699.42 | $0.00 |  |

LIABILITY FUND BALANCE

| Fund Name | Fund Manager Name | Total Balance | Vested Balance | As of Date |
|---|---|---|---|---|
| BOND - 007 | SAMPLE 1 fund manager | ($3,393,972) | ($3,393,972) | 12/31/98 |
| FIRST FUND | SAMPLE 3 fund manager | ($1,851,309) | ($1,851,309) | 12/31/98 |
| GROWTH | SAMPLE 1 fund manager | ($2,166,774) | ($2,166,774) | 12/31/98 |
| GROWTH_99 | SAMPLE 1 fund manager | ($1,968,393) | ($1,968,393) | 12/31/98 |
| PRIZE FUND | SAMPLE 2 fund manager | ($1,267,866) | ($1,267,866) | 12/31/98 |
| STAR FUND | SAMPLE 2 fund manager | ($4,645,959) | ($4,645,959) | 12/31/98 |
| SUPER FUND | SAMPLE 3 fund manager | ($2,952,103) | ($2,952,103) | 12/31/98 |
| TRUST FUND | SAMPLE 3 fund manager | ($275,312) | ($275,312) | 12/31/98 |
|  |  | ($18,521,687) | ($18,521,687) |  |

Difference ($9,050,988)

SPECIMEN 7

**REPRESENTATIVE SAMPLE
OF A
PLAN SPONSOR'S CONTRIBUTION CONFIRMATION
FOR A
REPLACEMENT PLAN**

Confirmation Statement

Plan Name: Pilot Plan　　　　　　　　　　　　　　　　　　　　2/11/99 5:29:41 PM

Mr Douglas Jeckyl　　　　　　　　　　　　　　SSN:　900-00-0073
14939 Zenith Avenue
Lake Shores, ME 00050

| Source | Fund Name | | Amount | Count |
|---|---|---|---:|---:|
| Effective Date: 12/01/1998 | | Record Date: 11/30/1998 | | |
| Match | | | | |
| | BOND - 007 | | $750.00 | 1 |
| | GROWTH | | $750.00 | 1 |
| | PRIZE FUND | | $1,000.00 | 1 |
| | | | $2,500.00 | 3 |
| Salary | | | | |
| | BOND - 007 | | $3,000.00 | 1 |
| | GROWTH | | $3,000.00 | 1 |
| | PRIZE FUND | | $4,000.00 | 1 |
| | | | $10,000.00 | 3 |
| | | Total: | $12,500.00 | 6 |

SPECIMEN 8

**REPRESENTATIVE SAMPLE
OF A
PLAN PARTICIPANT'S HYPOTHETICAL FUND
INVESTMENT PERFORMANCE REPORT
FOR A
REPLACEMENT PLAN**

Fund Performance
PLAN SPONSOR: Pilot Plan

Period from 10/01/1998 to 12/31/1998

| Fund Name | Percentage Change In Value | YTD Percentage Change |
|---|---|---|
| BOND - 007 | 0.48% | 7.85% |
| FIRST FUND | 10.13% | 9.44% |
| GROWTH | 27.07% | 15.53% |
| GROWTH_99 | 26.75% | 14.39% |
| PRIZE FUND | 2.58% | -3.09% |
| STAR FUND | 10.79% | 13.56% |
| SUPER FUND | 14.72% | 24.06% |
| TRUST FUND | 12.02% | -29.39% |

VALUE CHANGE This represents the weekly valuation of $1,000 if invested at the beginning of the period being measured.

The Value Change graph uses the left vertical axis as well as the horizontal date axis.

FRACTIONAL CHANGE This represents the weekly percent change in value for each fund during the period being measured.

The Fractional Change graph line uses only the right vertical axis as well as the horizontal date axis.

Graph Key: ◆ Value Change ($1,000 Base) ■ Fractional Change

Print Date: 3/15/99 12:10:58 PM

SPECIMEN 9

**REPRESENTATIVE SAMPLE
OF A
PARTICIPANT'S TRANSACTION CONFIRMATION
STATEMENTS
FOR A
REPLACEMENT PLAN**

Confirmation Statement
- Payment -

Plan Name: Pilot Plan　　　　　　　　　　　　　　　　2/11/99 5:29:17 PM

Mr Douglas Jeckyl　　　　　　　　　　　　　　　　SSN:　900-00-0073
14939 Zenith Avenue
Lake Shores, ME 00050

| Source | Fund Name | | Payment Amount |
|---|---|---|---|
| | | Effective Date: | 12/31/98 |
| | | Record Date: | 12/31/98 |
| Bonus | | | |
| | BOND - 007 | | $1,886.15 |
| | GROWTH | | $2,580.07 |
| | PRIZE FUND | | $2,592.99 |
| | | | $7,059.21 |
| | | Total: | $7,059.21 |

Confirmation Statement
- Realignment -

Plan Name: Pilot Plan　　　　　　　　　　　　　　　2/11/99 5:28:47 PM

Mr Douglas Jeckyl　　　　　　　　　　　　　　　SSN: 900-00-0073
14939 Zenith Avenue
Lake Shores, ME 00050

| Source | Fund Name | Realignment % | |
|---|---|---|---|
| Salary | | Effective Date: | 10/2/98 |
| | | Record Date: | 10/1/98 |
| | BOND - 007 | 30.00 | % |
| | GROWTH | 30.00 | % |
| | PRIZE FUND | 40.00 | % |
| | | Total: 100.00 | % |

SPECIMEN 10

**REPRESENTATIVE SAMPLE
OF A
PRIVATE BANKING INTERNET SERVICES OFFERING
FOR A
REPLACEMENT PLAN PARTICIPANT**

Passport Financial Services

Personal Banking for Overseas Executives

Passport Financial Services Pricing Information

Passport Banking Services are available at $50 per month or no additional cost if you maintain a Wealth Management average monthly balance of $100,000 or more.

The Passport Financial Advisory Services and Passport Investment Management Services listed in this brochure are also available on a fee basis. Call your Personal Banker for more information.

Easy Access to Your Problem Solver

With Passport Banking, working across time zones will not be an obstacle. Call when it's convenient in your time zone and leave a message on your Personal Banker's voice mail. He or she will handle your requests during eastern time and then get back to you right away. You can also reach your Personal Banker by phone, fax or telex.

Call Us Today and Profit From Our Experience

You're Relocating Overseas

Are you worried about being able to take care of your U.S. financial obligations while you're many miles and many hours away from home?

Do you have an investment plan that makes the most of the money you save overseas and that prepares you for the challenges of repatriation?

Do you have questions on how expatriation will affect your tax situation?

Passport Financial Services offers the products and services to meet your needs while you're working abroad. Passport Financial Services means personalized service and peace of mind -- anywhere in the world.

What is Passport Financial Services?

Passport Financial Services provides you with convenient banking services such as payroll deposit, bill payment (including standing orders to make repetitive payments such as your mortgage), and debit card access to cash at Visa ATM locations worldwide. All these services are coordinated through a Personal Banker who is dedicated to managing your day-to-day financial needs.

Passport Financial Services also offers financial advisory and investment management services such as international investment and cash repatriation planning through experienced Financial Planners.

We Can Bridge the Distance

Personal Bankers are highly trained professionals who are knowlegeable about credit and investment products. They can fulfill nearly all of your routine banking needs by telephone or by fax. The following services are offered as part of the Passport Banking package:

Personal Banking Debit Card which gives you access to cash at Visa and PLUS System ATMs worldwide.

Prompt Bill Payment including automatic payment of mortgages, college allowances, etc.

Overdraft Protection[1]

Lines of Credit[1]

Foreign Currency Transactions

International/Domestic Money Transfers

Deposit of rents, royalties, & investment income

Letters of Introduction

Wide range of Investment options including tax-free, global money market, income and equity mutual funds and U.S. Treasuries.[2]

Cash Management through our exclusive Wealth Management Account which features a daily sweep of idle cash from your checking account to your choice of eight investment options.

Direct Deposit of Payroll

Mortgage Financing[1]

How Will This Assignment Affect Your Income?

Personal Financial Planners, among them Certified Public Accountants, attorneys and Certified Financial Planners, have extensive experience in financial planning and analysis. As part of the Passport Financial Program, these experts can provide the following consultative services:

CashFlow/Income Tax Analysis

International Investment Planning

Strategic Asset Allocation

Investment Management

Stock Option Planning

Retirement Planning and Distribution Analysis

Insurance Analysis

International Estate Planning

Repatriation Planning to assist in determining and preparing for the costs of returning to the U.S.

SPECIMEN 11

**REPRESENTATIVE SAMPLE
OF A
ASSET RECONCILIATION REPORT
FOR A
REPLACEMENT PLAN**

Sample
XX-XXX
Series IV-JPM-RVP Public Bond Division
January 29, 1999

PORTFOLIO ASSETS SCHEDULE

| Cusip Number | Security Description | Trade Date | Settlement Date | Maturity Date | Currency Par Value | Book Value | Coupon Rate | Market Value |
|---|---|---|---|---|---|---|---|---|
| 36209HUH6 | Gnma #0472284 | 11/13/1998 | 11/18/1998 | 06/15/2028 | 28,689.54 | 29,302.32 | 7.00 | 29,397.88 |
| 36208RYX6 | Gnma #0458926 | 08/25/1998 | 09/21/1998 | 09/15/2028 | 925,235.11 | 940,351.65 | 7.00 | 948,079.17 |
| 36208SWB4 | Gnma #0459742 | 11/13/1998 | 11/18/1998 | 06/25/2028 | 283,920.02 | 289,984.35 | 7.00 | 290,930.01 |
| 36208VJ89 | Gnma #0462087 | 11/13/1998 | 11/18/1998 | 06/25/2028 | 103,576.29 | 105,788.59 | 7.00 | 106,133.59 |
| 36208XVY4 | Gnma #0464231 | 11/13/1998 | 11/18/1998 | 10/15/2028 | 114,904.84 | 117,359.24 | 7.00 | 117,741.84 |
| 36209AWM8 | Gnma #0466052 | 08/14/1998 | 09/21/1998 | 09/15/2028 | 986,447.08 | 1,001,642.85 | 7.00 | 1,010,802.46 |
| 36209AWM8 | Gnma #0466052 | 08/14/1998 | 09/21/1998 | 09/15/2028 | 986,447.08 | 1,001,642.85 | 7.00 | 1,010,802.46 |
| 36209AXQ8 | Gnma #0466087 | 11/13/1998 | 11/18/1998 | 11/25/2028 | 149,149.15 | 152,335.10 | 7.00 | 152,831.64 |
| 36209DCD4 | Gnma #0468168 | 08/25/1998 | 09/21/1998 | 08/15/2028 | 99,648.23 | 101,275.94 | 7.00 | 102,108.54 |
| 36209EX98 | Gnma #0469704 | 11/13/1998 | 11/18/1998 | 11/25/2028 | 241,712.78 | 246,875.96 | 7.00 | 247,680.67 |
| 36210AE37 | Gnma #0486254 | 11/13/1998 | 11/18/1998 | 11/25/2028 | 440,572.46 | 449,983.42 | 7.00 | 451,450.19 |
| 36209EX98 | Gnma #0469704 | 11/13/1998 | 11/18/1998 | 11/25/2028 | 703,059.01 | 718,076.89 | 7.00 | 720,417.54 |
| 36208QQ82 | Gnma #0457779 | 08/25/1998 | 09/21/1998 | 07/15/2028 | 874,851.36 | 889,141.20 | 7.00 | 896,451.44 |
| 36209KM21 | Gnma #0473877 | 08/14/1998 | 09/21/1998 | 07/15/2028 | 586,776.63 | 595,810.73 | 7.00 | 601,264.14 |
| 36209PBT3 | Gnma #0477150 | 11/18/1998 | 11/18/1998 | 07/25/2028 | 299,113.87 | 305,502.81 | 7.00 | 306,498.99 |
| 36209PUT2 | Gnma #0477694 | 11/13/1998 | 11/18/1998 | 06/15/2028 | 98,179.74 | 100,276.76 | 7.00 | 100,603.80 |
| 36209SVE8 | Gnma #0480413 | 11/13/1998 | 11/18/1998 | 07/25/2028 | 145,714.76 | 148,827.17 | 7.00 | 149,312.46 |
| 36209US98 | Gnma #0482144 | 11/13/1998 | 11/18/1998 | 08/25/2028 | 366,758.63 | 374,592.55 | 7.00 | 375,813.90 |
| 36209US98 | Gnma #0482144 | 11/13/1998 | 11/18/1998 | 08/25/2028 | 775,143.10 | 791,700.05 | 7.00 | 794,281.38 |
| 36209VNB6 | Gnma #0482886 | 12/17/1998 | 01/21/1999 | 12/15/2028 | 419,137.33 | 428,687.62 | 7.00 | 429,610.61 |
| 36210AE29 | Gnma #0486253 | 11/13/1998 | 11/18/1998 | 11/25/2028 | 216,777.50 | 221,408.03 | 7.00 | 222,129.74 |
| 36210AE37 | Gnma #0486254 | 11/13/1998 | 11/18/1998 | 11/25/2028 | 776,069.73 | 792,647.18 | 7.00 | 795,230.89 |
| 007655AA1 | Aerial Communications | 04/02/1998 | 04/07/1998 | 02/01/2008 | 3,345,000.00 | 1,640,890.81 | - | 1,530,963.02 |
| 36209EX98 | Gnma #0469704 | 11/13/1998 | 11/18/1998 | 11/25/2028 | 567,786.38 | 579,914.73 | 7.00 | 581,805.03 |
| 34527RBK8 | Ford Credit Auto Owner Trust | 08/06/1998 | 08/11/1998 | 03/15/2002 | 2,100,000.00 | 2,101,946.87 | 5.81 | 2,119,929.00 |
| 101137AA5 | Boston Scientific | 03/05/1998 | 03/10/1998 | 03/15/2005 | 1,220,000.00 | 1,219,441.86 | 6.63 | 1,189,113.26 |
| 13606QYG2 | Canadian Imperial Bank | 09/30/1997 | 10/03/1997 | 08/01/2000 | 2,000,000.00 | 2,000,022.12 | 6.20 | 2,023,156.00 |
| 161581BG7 | Chase Manhattan Auto Owner | 08/13/1998 | 08/18/1998 | 01/15/2002 | 2,300,000.00 | 2,301,733.15 | 5.80 | 2,318,354.00 |
| 17303CBA8 | Citibank Credit Card Master T | 01/22/1998 | 01/29/1998 | 02/07/2005 | 97,000.00 | 96,935.90 | 5.80 | 98,201.83 |
| 17303CBA8 | Citibank Credit Card Master T | 01/22/1998 | 01/29/1998 | 02/07/2005 | 438,000.00 | 437,710.59 | 5.80 | 443,426.82 |
| 19957RAA1 | Columbus Southern Power | 09/30/1997 | 10/03/1997 | 10/03/2005 | 2,000,000.00 | 2,000,000.00 | 6.85 | 2,106,272.00 |
| 219868AG1 | Corp Andina De Fomento | 03/12/1998 | 03/17/1998 | 03/15/2005 | 1,600,000.00 | 1,593,666.67 | 6.75 | 1,532,459.20 |
| 24820RAG3 | Statoil | 12/10/1998 | 12/15/1998 | 12/01/2028 | 1,500,000.00 | 1,492,705.99 | 6.50 | 1,474,230.00 |
| 268766AZ5 | Equity Office Properties | 02/12/1998 | 02/18/1998 | 02/15/2002 | 1,500,000.00 | 1,500,000.00 | 6.38 | 1,498,485.00 |
| 30217VAA5 | Express Pipeline | 01/30/1998 | 02/06/1998 | 12/31/2013 | 749,000.25 | 749,000.25 | 6.47 | 727,256.77 |
| 36208RYX6 | Gnma #0458926 | 08/25/1998 | 09/21/1998 | 09/15/2028 | 840,955.54 | 854,695.13 | 7.00 | 861,718.73 |
| 313801WP4 | Fnma #0441754 | 09/16/1998 | 10/14/1998 | 09/01/2028 | 2,418,542.54 | 2,467,672.06 | 7.00 | 2,469,181.98 |
| 36208RYD0 | Gnma #0458908 | 11/13/1998 | 11/18/1998 | 07/25/2028 | 132,177.72 | 135,000.98 | 7.00 | 135,441.19 |
| 36205NLX2 | Gnma #0395542 | 08/06/1998 | 08/19/1998 | 04/15/2028 | 605,142.31 | 615,585.06 | 7.00 | 620,083.27 |
| 36206BUJ8 | Gnma #0406585 | 05/12/1998 | 06/18/1998 | 05/15/2026 | 461,037.63 | 466,429.91 | 7.00 | 472,420.65 |

Sample
XX-XXX
Series IV-JPM-RVP Public Bond Division
January 29, 1999

PORTFOLIO ASSETS SCHEDULE

| Cusip Number | Security Description | Trade Date | Settlement Date | Maturity Date | Currency Par Value | Book Value | Coupon Rate | Market Value |
|---|---|---|---|---|---|---|---|---|
| 36206F5U2 | Gnma #0410459 | 11/13/1998 | 11/18/1998 | 04/25/2028 | 414,245.65 | 423,093.37 | 7.00 | 424,473.38 |
| 3620716U2 | Gnma #0433883 | 11/13/1998 | 11/18/1998 | 07/13/2028 | 250,660.87 | 256,014.85 | 7.00 | 256,849.69 |
| 36207KBM1 | Gnma #0433944 | 11/13/1998 | 11/18/1998 | 08/25/2028 | 123,810.40 | 126,454.98 | 7.00 | 126,867.28 |
| 36208KWG0 | Gnma #0453447 | 11/13/1998 | 11/18/1998 | 11/25/2028 | 536,081.22 | 547,532.33 | 7.00 | 549,317.07 |
| 36208KWG0 | Gnma #0453447 | 11/13/1998 | 11/18/1998 | 11/25/2028 | 614,796.68 | 627,929.21 | 7.00 | 629,976.01 |
| 36208MLG8 | Gnma #0454927 | 05/12/1998 | 06/18/1998 | 12/15/2027 | 294,719.25 | 298,169.83 | 7.00 | 301,995.87 |
| 36208QQ82 | Gnma #0457779 | 08/25/1998 | 09/21/1998 | 07/15/2028 | 88,644.26 | 90,092.16 | 7.00 | 90,832.89 |
| 36210AE37 | Gnma #0486254 | 11/13/1998 | 11/18/1998 | 11/25/2028 | 506,993.23 | 517,823.01 | 7.00 | 519,510.89 |
| 31379VJM2 | Fnma #0430568 7% | 06/18/1998 | 07/14/1998 | 06/01/2028 | 961,919.11 | 976,257.10 | 7.00 | 983,474.95 |
| 912810FF0 | Us Treasury Bond | 01/22/1999 | 01/26/1999 | 11/15/2028 | 2,160,000.00 | 2,216,684.09 | 5.25 | 2,211,976.08 |
| 675748AA5 | Ocwen | 03/25/1998 | 03/30/1998 | 10/25/2030 | 932,302.37 | 905,687.91 | 4.00 | 933,759.09 |
| 36210AE37 | Gnma #0486254 | 11/13/1998 | 11/18/1998 | 11/25/2028 | 75,922.14 | 77,543.89 | 7.00 | 77,796.66 |
| 786427AC8 | Safeco Capital Trust I | 09/04/1997 | 09/09/1997 | 07/15/2037 | 1,500,000.00 | 1,495,508.41 | 8.07 | 1,611,165.00 |
| 871928AV9 | Cincinnati Gas & Electric | 10/08/1997 | 10/14/1997 | 10/01/2007 | 1,000,000.00 | 972,760.28 | 6.50 | 1,028,750.00 |
| 892317AB4 | Toyota Auto Lease Trust | 08/10/1998 | 08/13/1998 | 04/26/2004 | 2,000,000.00 | 2,020,625.88 | 6.35 | 2,041,740.00 |
| 89352LAC4 | Trans-canada Pipeline | 10/03/1997 | 10/14/1997 | 10/14/2025 | 1,500,000.00 | 1,492,853.30 | 7.06 | 1,574,763.00 |
| 912810EX2 | U S A Treasury Bond 6.75% | 06/09/1998 | 06/11/1998 | 08/15/2026 | 10,000.00 | 11,182.82 | 6.75 | 12,046.88 |
| 912810EX2 | U S A Treasury Bond 6.75% | 09/10/1997 | 09/12/1997 | 08/15/2026 | 40,000.00 | 40,282.70 | 6.75 | 48,187.52 |
| 992678CH3 | U S A Treasury Bond 6.75% | 05/12/1998 | 05/14/1998 | 08/15/2026 | 1,190,000.00 | 1,301,190.29 | 6.75 | 1,433,578.72 |
| 912810FF0 | Fnma Tba 6.5% Due 1/1/29 | 01/06/1999 | 02/11/1999 | 01/01/2029 | 5,290,000.00 | 5,319,756.25 | 6.50 | 5,342,841.81 |
| 655894AF1 | Us Treasury Bond | 01/08/1999 | 01/12/1999 | 11/15/2028 | 370,000.00 | 368,555.85 | 5.25 | 378,903.31 |
| 912827AF1 | Noble Affiliates | 03/25/1998 | 03/25/1998 | 04/01/2027 | 2,160,000.00 | 2,401,342.62 | 8.00 | 2,295,678.24 |
| 912827L83 | Us Treasury Note | 11/04/1998 | 11/06/1998 | 06/30/2000 | 210,000.00 | 212,546.86 | 5.38 | 211,968.75 |
| 912827V82 | Us Treasury Note | 06/04/1998 | 06/09/1998 | 08/15/2003 | 625,000.00 | 628,562.10 | 5.75 | 653,125.00 |
| 912833DC1 | U S A Treasury Notes | 06/30/1998 | 07/06/1998 | 11/15/2005 | 340,000.00 | 346,059.38 | 5.88 | 362,631.42 |
| 912833KB5 | Us Treas Strip | 09/10/1998 | 09/14/1998 | 08/15/2012 | 9,600,000.00 | 4,691,402.65 | . | 4,691,126.40 |
| 948571AA2 | Us Treas Strips | 09/28/1998 | 09/30/1998 | 11/15/2013 | 1,115,000.00 | 508,717.10 | . | 504,246.49 |
| 992678CG5 | Weeks Residential | 03/17/1998 | 03/20/1998 | 03/15/2005 | 500,000.00 | 498,342.52 | 6.88 | 489,224.00 |
| 992678CG5 | Fnma Tba 6.0% | 01/07/1999 | 02/11/1999 | 02/15/2029 | 2,650,000.00 | 2,612,734.38 | 6.00 | 2,622,376.40 |
| 992678CH3 | Fnma Tba 6.0% | 01/07/1999 | 02/11/1999 | 02/15/2029 | 3,055,000.00 | 3,012,993.75 | 6.00 | 3,023,154.68 |
| 992678CH3 | Fnma Tba 6.5% Due 1/1/29 | 01/07/1999 | 02/11/1999 | 01/01/2029 | 6,000,000.00 | 6,031,875.00 | 6.50 | 6,059,934.00 |
| 992678CH3 | Fnma Tba 6.5% Due 1/1/29 | 01/07/1999 | 02/11/1999 | 01/01/2029 | 1,540,000.00 | 1,548,181.25 | 6.50 | 1,555,383.06 |
| 912810FB9 | Us Treasury Bond | 11/04/1998 | 11/06/1998 | 11/15/2027 | 350,000.00 | 383,917.36 | 6.13 | 393,093.75 |
| 501773AZ8 | Lb Commercial Conduit Mtge | 02/27/1998 | 02/27/1998 | 02/18/2030 | 544,964.27 | 547,822.18 | 6.33 | 559,732.80 |
| 36210AE45 | Gnma #0486255 | 11/13/1998 | 11/18/1998 | 11/25/2028 | 151,701.82 | 154,942.29 | 7.00 | 155,447.34 |
| 36210AE45 | Gnma #0486255 | 11/13/1998 | 11/18/1998 | 11/25/2028 | 484,014.55 | 494,353.47 | 7.00 | 495,964.87 |
| 36210AE45 | Gnma #0486255 | 11/13/1998 | 11/18/1998 | 11/25/2028 | 732,581.18 | 748,229.67 | 7.00 | 750,668.61 |
| 36210AE52 | Gnma #0486256 | 11/13/1998 | 11/18/1998 | 11/25/2028 | 521,351.42 | 532,487.89 | 7.00 | 534,223.59 |
| 36210HPR7 | Gnma #0492832 | 11/13/1998 | 11/18/1998 | 10/25/2028 | 486,956.76 | 497,358.39 | 7.00 | 498,979.72 |
| 36210HPR7 | Gnma #0492832 | 11/13/1998 | 11/18/1998 | 10/25/2028 | 501,274.65 | 511,982.11 | 7.00 | 513,651.12 |

Sample
XX-XXX
Series IV-JPM-RVP Public Bond Division
January 29, 1999

PORTFOLIO ASSETS SCHEDULE

| Cusip Number | Security Description | Trade Date | Settlement Date | Maturity Date | Currency Par Value | Book Value | Coupon Rate | Market Value |
|---|---|---|---|---|---|---|---|---|
| 36210KHL2 | Gnma #0494435 | 12/17/1998 | 01/21/1999 | 12/15/2028 | 105,563.60 | 107,968.93 | 7.00 | 108,201.39 |
| 441812FY5 | Household Finance | 01/28/1999 | 02/02/1999 | 06/17/2008 | 400,000.00 | 414,876.72 | 6.40 | 414,040.00 |
| 456866AK8 | Ingersoll-rand | 11/19/1997 | 11/24/1997 | 11/15/2027 | 1,500,000.00 | 1,500,000.00 | 6.39 | 1,541,088.00 |
| 743863AA0 | Provident Companies Inc | 03/11/1998 | 03/16/1998 | 03/15/2038 | 650,000.00 | 650,000.00 | 7.41 | 668,829.20 |
| 494492AA9 | Kincaid | 04/21/1998 | 04/28/1998 | 06/15/2020 | 650,000.00 | 650,000.00 | 7.33 | 645,781.50 |
| 63618EAU5 | National Fuel Gas | 09/18/1997 | 09/23/1997 | 08/12/2027 | 2,000,000.00 | 1,993,371.76 | 6.21 | 2,095,960.00 |
| 50730KAL1 | Laidlaw Inc | 09/24/1997 | 09/29/1997 | 10/01/2027 | 1,500,000.00 | 1,500,000.00 | 6.72 | 1,500,694.50 |
| 51808BAC6 | Lasmo (usa) Inc | 02/02/1998 | 02/05/1998 | 06/30/2006 | 2,000,000.00 | 2,091,540.26 | 7.50 | 2,041,826.00 |
| 589929QA9 | Merrill Lynch Mortgage Inves | 03/23/1998 | 03/27/1998 | 02/15/2030 | 1,412,027.72 | 1,419,026.13 | 6.22 | 1,445,535.14 |
| 60934XBT8 | The Money Store Home Equit | 04/17/1998 | 04/21/1998 | 12/15/2038 | 1,000,000.00 | 1,008,247.39 | 6.49 | 1,017,100.00 |
| 60935BBR9 | The Money Store | 07/08/1998 | 07/13/1998 | 04/15/2028 | 2,000,000.00 | 2,049,084.53 | 7.00 | 2,061,356.00 |
| 61745MDB6 | Morgan Stanley Capital | 10/09/1997 | 10/17/1997 | 10/03/2030 | 964,695.68 | 969,341.89 | 6.59 | 1,004,248.20 |
| 61745MFF5 | Morgan Stanley Capital | 03/18/1998 | 03/27/1998 | 01/15/2007 | 1,378,296.28 | 1,384,142.10 | 6.19 | 1,414,876.26 |
| 61745MGW7 | Morgan Stanley Capital Ser 9 | 06/04/1998 | 06/15/1998 | 07/15/2030 | 318,457.15 | 320,923.91 | 6.34 | 328,415.31 |
| 61910DDA7 | Mrtgage Capital Funding, Inc | 11/20/1997 | 11/28/1997 | 01/20/2027 | 464,624.46 | 466,914.39 | 6.53 | 481,727.29 |
| 61910DDN9 | Mortgage Capital Funding, In | 04/29/1998 | 04/30/1998 | 06/18/2007 | 1,145,932.71 | 1,151,307.79 | 6.42 | 1,186,395.59 |
| 48262E | Kn Energy, Inc. | 01/07/1999 | 01/14/1999 | 02/11/1999 | 3,000,000.00 | 2,994,850.00 | 5.15 | 2,994,850.00 |
| 90783M | Union Pacific Resources | 01/07/1999 | 01/14/1999 | 02/11/1999 | 2,000,000.00 | 1,996,533.33 | 5.20 | 1,996,533.33 |
| 313384 | Federal Home Loan Bank | 01/29/1999 | 01/29/1999 | 02/01/1999 | 20,464,000.00 | 20,458,747.57 | 4.62 | 20,458,747.57 |

Total S/T Instruments, Stocks and Bonds Value: 122,417,692.71
Cash: 1,094.33
Foreign Cash Receivable: -
Receivable Securities Sold: 909,980.59
Receivable dividends and interest: 852,731.09
Other assets: (356.24)
Payable Securities Purchased: (18,943,620.63)
Other Liabilities: 1,346,277.34
Redemption Value Protection (RVP) Agreement: (884,929.55)
Accrued Fees and Charges: (125,165.20)
Value Allocated to Division: 105,573,704.44

SPECIMEN 12

REPRESENTATIVE SAMPLE
OF A
TRUSTEE'S CASH VALUE REPORT
FOR A
PRIVATE PLACEMENT VARIABLE UNIVERSAL
LIFE INSURANCE POLICY
USED TO FUND A
REPLACEMENT PLAN

Sample
VG XXX
January 29, 1999

SUMMARY

| | January, 1999 | December, 1998 | November, 1998 | October, 1998 | September, 1998 |
|---|---|---|---|---|---|
| Opening Balance | | | | | |
| Initial Premium | 0.00 | 0.00 | 0.00 | 0.00 | 0.00 |
| Policy Values | 105,168,946.27 | 104,736,197.25 | 104,315,071.29 | 103,909,955.77 | 103,505,988.69 |
| DAC Receivable | 3,524,099.95 | 3,524,099.95 | 3,524,099.95 | 3,524,099.95 | 3,524,099.95 |
| Mortality Reserve | 476,834.56 | 444,733.74 | 412,849.26 | 381,001.12 | 349,255.62 |
| Free Look Adjustment | 0.00 | 0.00 | 0.00 | 0.00 | 0.00 |
| Total Opening Balance | 109,169,880.78 | 108,705,030.94 | 108,252,020.50 | 107,815,056.84 | 107,379,342.26 |
| Premium Received / (Rescinded) | 0.00 | 0.00 | 0.00 | 0.00 | 0.00 |
| Closing Balance | | | | | |
| Policy Values | 105,573,704.44 | 105,168,946.27 | 104,736,197.25 | 104,315,071.29 | 103,909,955.77 |
| DAC Receivable | 3,524,099.95 | 3,524,099.95 | 3,524,099.95 | 3,524,099.95 | 3,524,099.95 |
| Mortality Reserve | 508,996.10 | 476,834.56 | 444,733.74 | 412,849.26 | 381,001.12 |
| Free Look Adjustment | 0.00 | 0.00 | 0.00 | 0.00 | 0.00 |
| Total Closing Balance | 109,606,800.49 | 109,169,880.78 | 108,705,030.94 | 108,252,020.50 | 107,815,056.84 |
| Product Assets Change in Value | 436,919.71 | 464,849.84 | 453,010.44 | 436,963.66 | 435,714.58 |
| DAC Refund on Prior Deaths | 0.00 | 0.00 | 0.00 | 0.00 | 0.00 |
| Death Benefits Paid | 0.00 | 0.00 | 0.00 | 0.00 | 0.00 |
| Total Change in Value | 436,919.71 | 464,849.84 | 453,010.44 | 436,963.66 | 435,714.58 |
| Interest Income on Death Benefits | 0.00 | 0.00 | 0.00 | 0.00 | 0.00 |
| Annualized Yield on Opening Balance | 5.16% | 5.15% | 5.04% | 5.04% | 5.05% |

Sample
VG XXX
January 29, 1999

ASSET VALUE ANALYSIS

| | January, 1999 | December, 1998 | November, 1998 | October, 1998 | September, 1998 |
|---|---|---|---|---|---|
| Policy Value | | | | | |
| Opening Balance | 105,168,946.27 | 104,736,197.25 | 104,315,071.29 | 103,909,955.77 | 103,505,986.69 |
| Net Premium Payments | 0.00 | 0.00 | 0.00 | 0.00 | 0.00 |
| Premium Tax Adjustment | 0.00 | 0.00 | 0.00 | 0.00 | 0.00 |
| COI Expense | (33,871.84) | (33,872.62) | (33,888.92) | (33,921.50) | (33,989.78) |
| Administration Fees | (2,442.50) | (2,442.50) | (2,442.50) | (2,442.50) | (2,442.50) |
| Net M&E | (9,773.92) | (10,816.26) | (11,841.49) | (10,725.16) | (9,980.77) |
| DAC Refunds To Policy | 0.00 | 0.00 | 0.00 | 0.00 | 0.00 |
| Investment Values Released (due to death) | 0.00 | 0.00 | 0.00 | 0.00 | 0.00 |
| Investment Management Charges | (49,135.91) | (52,404.60) | (52,088.38) | (50,518.86) | (50,106.61) |
| Investment Income | 499,982.34 | 532,285.00 | 521,387.25 | 502,723.54 | 500,488.74 |
| Closing Balance: Policy Value | 105,573,704.44 | 105,168,946.27 | 104,736,197.25 | 104,315,071.29 | 103,909,955.77 |
| DAC Receivable | | | | | |
| Opening Balance | 3,524,099.95 | 3,524,099.95 | 3,524,099.95 | 3,524,099.95 | 3,524,099.95 |
| DAC Receivable Contributions | 0.00 | 0.00 | 0.00 | 0.00 | 0.00 |
| DAC Paid in Cash | 0.00 | 0.00 | 0.00 | 0.00 | 0.00 |
| DAC Credits to Separate Account | 0.00 | 0.00 | 0.00 | 0.00 | 0.00 |
| Closing Balance: DAC Receivable | 3,524,099.95 | 3,524,099.95 | 3,524,099.95 | 3,524,099.95 | 3,524,099.95 |
| Mortality Reserve | | | | | |
| Opening Balance | 476,834.56 | 444,733.74 | 412,849.26 | 381,001.12 | 349,255.62 |
| Contributions to Reserves | 30,291.46 | 30,292.61 | 30,307.64 | 30,336.87 | 30,398.91 |
| Investment Income on Reserves | 1,870.08 | 1,808.21 | 1,576.84 | 1,511.27 | 1,346.59 |
| Released for Death (adjusted for backdating) | 0.00 | 0.00 | 0.00 | 0.00 | 0.00 |
| Closing Balance: Mortality Reserve | 508,996.10 | 476,834.56 | 444,733.74 | 412,849.26 | 381,001.12 |
| Reporting Month Days | 29 | 31 | 31 | 30 | 30 |

Sample
VG XXX
January 29, 1999

ASSET CHARGES and NET COST of INSURANCE ANALYSIS

| | January, 1999 | December, 1998 | November, 1998 | October, 1998 | September, 1998 |
|---|---|---|---|---|---|
| Investment Management Charges | | | | | |
| Advisory Fees | (19,811.65) | (21,188.75) | (21,008.48) | (20,545.88) | (20,423.55) |
| Management Fees | (2,512.13) | (2,674.31) | (2,663.05) | (2,568.42) | (2,395.87) |
| RVP Fees | (26,812.13) | (28,541.54) | (28,416.85) | (27,404.56) | (27,287.19) |
| Total Investment Management Charges | (49,135.91) | (52,404.60) | (52,088.38) | (50,518.86) | (50,106.61) |
| | | | | | |
| Mortality and Expense Risk | | | | | |
| M&E Charge | (20,925.62) | (22,280.21) | (22,189.67) | (21,389.11) | (21,305.70) |
| M&E Experience Credit | 11,151.70 | 11,463.95 | 10,348.18 | 10,663.95 | 11,324.93 |
| Net Mortality and Expense Risk | (9,773.92) | (10,816.26) | (11,841.49) | (10,725.16) | (9,980.77) |
| | | | | | |
| Net Cost of Insurance Analysis | | | | | |
| Cost of Insurance Expense | (33,871.84) | (33,872.62) | (33,888.92) | (33,921.50) | (33,989.78) |
| COI Contribution to Mortality Reserve | 30,291.46 | 30,292.61 | 30,307.64 | 30,336.87 | 30,398.91 |
| Investment Income on Mortality Reserve | 1,870.08 | 1,808.21 | 1,576.84 | 1,511.27 | 1,346.59 |
| Net Cost of Insurance | (1,710.30) | (1,771.80) | (2,004.44) | (2,073.36) | (2,244.28) |

144

PREMIUM REPORT
Sample Company
VG XXX

| | April, 1998 | March, 1998 | February, 1998 | January, 1998 | December, 1997 | November, 1997 | October, 1997 | September, 1997 | August, 1997 | July, 1997 | June, 1997 |
|---|---|---|---|---|---|---|---|---|---|---|---|
| Gross Premium Received | 0.00 | 0.00 | 0.00 | 0.00 | 0.00 | 0.00 | 0.00 | 0.00 | 0.00 | 0.00 | 100,000,000.00 |
| DAC Expense | 0.00 | 0.00 | 0.00 | 0.00 | 0.00 | 0.00 | 0.00 | 0.00 | 0.00 | 0.00 | (4,146,000.00) |
| State Premium Taxes | 0.00 | 0.00 | 0.00 | 0.00 | 0.00 | 0.00 | 0.00 | 0.00 | 0.00 | 0.00 | (1,980,202.45) |
| Net Premium Payments | 0.00 | 0.00 | 0.00 | 0.00 | 0.00 | 0.00 | 0.00 | 0.00 | 0.00 | 0.00 | 93,873,797.55 |
| Premium Tax Adjustment | 0.00 | | | | | | | 1,980,202.26 | 0.00 | 0.00 | 0.00 |

Premium Report

MORTALITY RESERVE CALCULATION
VG XXX

| ACTIVITY DATE | COST OF INSURANCE | RISK AND RETENTION | REINSUR. ADJUST. # | DEATH BENEFITS | INVESTMENT VALUE REL. AT DEATH | INTEREST ON DB - IV | MORT/BASED EXPERIENCE CREDITS | CONTRIB. TO CONT. RESERVE | INTEREST TO END OF PERIOD | END OF PERIOD CONT. RES. | PERIOD ENDING |
|---|---|---|---|---|---|---|---|---|---|---|---|
| 05/29/98 | - | - | - | - | - | - | - | - | - | 253,964.34 | 05/29/98 |
| 06/08/98 | 34,329.48 | 3,622.35 | - | - | - | - | - | 30,707.13 | 1,063.52 | 285,734.99 | 06/30/98 |
| 07/08/98 | 34,215.23 | 3,611.64 | - | - | - | - | - | 30,603.59 | 1,155.20 | 317,493.78 | 07/31/98 |

04/28/1999 4:27 PM

SPECIMEN 13

**REPRESENTATIVE SAMPLE
OF A
PLAN SPONSOR'S CASH VALUE REPORT
FOR A
PRIVATE PLACEMENT VARIABLE UNIVERSAL
LIFE INSURANCE POLICY
USED TO FUND A
REPLACEMENT PLAN**

IV-7

Plan Sponsor - Policy Number: VL0XX

SAMPLE CASH SURRENDER VALUE REPORT as of 12/31/1998

| Contract Number | Beginning Cash Value | Premium | Premium & DAC Expense | Adminstrative Fee | Cost of Insurance | Pre-Earnings Balance | Investment Experience | Ending Cash Value |
|---|---|---|---|---|---|---|---|---|
| VL00xx-000001 | - | 12,134.81 | 837.30 | 5.00 | 169.89 | 11,122.62 | 111.23 | 11,233.84 |
| VL00xx-000002 | - | 13,267.45 | 915.45 | 5.00 | 159.21 | 12,187.79 | 121.88 | 12,309.67 |
| VL00xx-000003 | - | 14,945.58 | 1,031.25 | 5.00 | 239.13 | 13,670.21 | 136.70 | 13,806.91 |
| VL00xx-000004 | - | 10,249.17 | 707.19 | 5.00 | 153.74 | 9,383.24 | 93.83 | 9,477.07 |
| VL00xx-000005 | - | 12,869.43 | 887.99 | 5.00 | 172.45 | 11,803.99 | 118.04 | 11,922.03 |
| VL00xx-000006 | - | 11,802.13 | 814.35 | 5.00 | 182.93 | 10,799.85 | 108.00 | 10,907.85 |
| VL00xx-000007 | - | 10,804.81 | 745.53 | 5.00 | 151.27 | 9,903.01 | 99.03 | 10,002.04 |
| VL00xx-000008 | - | 9,806.17 | 676.63 | 5.00 | 117.67 | 9,006.87 | 90.07 | 9,096.93 |
| VL00xx-000009 | - | 11,530.04 | 795.57 | 5.00 | 184.48 | 10,544.99 | 105.45 | 10,650.44 |
| VL00xx-000010 | - | 6,404.69 | 441.92 | 5.00 | 96.07 | 5,861.70 | 58.62 | 5,920.31 |
| VL00xx-000011 | - | 12,661.16 | 873.62 | 5.00 | 169.66 | 11,612.88 | 116.13 | 11,729.01 |
| VL00xx-000012 | - | 9,797.75 | 676.05 | 5.00 | 151.87 | 8,964.84 | 89.65 | 9,054.49 |
| VL00xx-000013 | - | 11,800.63 | 814.24 | 5.00 | 165.21 | 10,816.18 | 108.16 | 10,924.34 |
| VL00xx-000014 | - | 4,774.28 | 329.43 | 5.00 | 57.29 | 4,382.56 | 43.83 | 4,426.39 |
| VL00xx-000015 | - | 10,506.04 | 724.92 | 5.00 | 168.10 | 9,608.02 | 96.08 | 9,704.10 |
| VL00xx-000016 | - | 11,948.60 | 824.45 | 5.00 | 179.23 | 10,939.92 | 109.40 | 11,049.32 |
| VL00xx-000017 | - | 14,793.08 | 1,020.72 | 5.00 | 198.23 | 13,569.13 | 135.69 | 13,704.82 |
| VL00xx-000018 | - | 9,865.20 | 680.70 | 5.00 | 152.91 | 9,026.59 | 90.27 | 9,116.85 |
| VL00xx-000019 | - | 8,654.09 | 597.13 | 5.00 | 121.16 | 7,930.80 | 79.31 | 8,010.11 |
| VL00xx-000020 | - | 13,655.52 | 942.23 | 5.00 | 163.87 | 12,544.43 | 125.44 | 12,669.87 |
| VL00xx-000021 | - | 14,362.42 | 991.01 | 5.00 | 229.80 | 13,136.61 | 131.37 | 13,267.98 |
| VL00xx-000022 | - | 9,401.56 | 648.71 | 5.00 | 141.02 | 8,606.83 | 86.07 | 8,692.90 |
| VL00xx-000023 | - | 15,547.67 | 1,072.79 | 5.00 | 208.34 | 14,261.55 | 199.03 | 14,460.58 |
| Total | 0.00 | 261,582.28 | 18,049.18 | 115.00 | 3,733.51 | 239,684.59 | 2,453.26 | 242,137.85 |

*Cash Value Report as of 12/31/98*

SPECIMEN 14

**REPRESENTATIVE SAMPLE
OF THE
PRODUCT SPECIFICATIONS
FOR A
PRIVATE PLACEMENT VARIABLE UNIVERSAL
LIFE INSURANCE POLICY
USED TO FUND A
REPLACEMENT PLAN**

Specimen 14

Offshore Private Placement Variable Universal Life Insurance Product

Product Specifications

| | |
|---|---|
| Purpose | To use for funding of offshore benefit programs that provide Replacement Benefits for benefit plans that are not viable in the location of the Replacement plan. The insureds can be U.S. expatriates, third-country nationals, local nationals, and resident aliens in the U.S. |
| Ownership | The product will be owned by a foreign master trust and/or its sub-trusts, which will also be the beneficiary. |
| Policy Design | Private placement variable universal design with managed accounts, supported by an offering memorandum to the trustees. |
| Features | "Dial-in" death benefit, up to U.S. limits |
| Underwriting | Guaranteed issue, using aggregate funding<br>Individual underwriting for individuals |
| Charges | Premium Tax – none<br>Deferred Acquisition Cost (DAC) tax – none<br>Administrative Charges – variable<br>Mortality Expense Charge – variable<br>Cost of Insurance – depends on mortality risk design<br>Account management Fee – variable<br>Policy Design Fee – 1%<br>Other Charges – variable |
| Investments | Managed accounts invested in global fixed income, equity, cash and hard asset investments |
| Sub-Advisors | Top international money managers, such as:<br>    J.P. Morgan              Barings Bank<br>    Goldman Sachs       Deutsche Morgan Grenfell<br>    Invesco                  Bear Stearns<br>    Etc. |

SPECIMEN 15

**REPRESENTATIVE SAMPLE
OF A
STRATEGIC INVESTMENT PLAN
FOR A
INVESTMENT MANAGEMENT AND FINANCIAL PLANNING
INTERNET SERVICES OFFERING
FOR A
REPLACEMENT PLAN PARTICIPANT**

Replacement Plan Participant
Sample Strategic Investment Plan
Scenario Dated Feb 9, 1999

Specimen 15

*Without Real Estate*

Objective:       10.00% Pre-retirement net-after tax total rate of return

Investable Assets:     $407,000

| Strategic Allocation | ASSET CLASS<br>ASSET SUB-CLASS<br>Security Title | Security Percent Allocation | ASSET CLASS Allocation | Dollar Allocation |
|---|---|---|---|---|
| 10.00% | CASH | | | |
| | MONEY MARKET | | | |
| |   Schwab Money Market | | | |
| | ULTRA-SHORT-TERM TREASURIES | | | |
| |   Smith Breeden Short Dur Govt | 10.00% | | $40,700 |
| | | | 10.00% | |
| 25.00% | FIXED INCOME | | | |
| | SHORT-TERM GOVERNMENT BONDS | | | |
| | INTERMEDIATE-TERM GOVERNMENTS | | | |
| |   Vanguard F/I - GNMA | 5.00% | | $20,350 |
| |   Strong Govt securities | 5.00% | | $20,350 |
| | SHORT-TERM MUNICIPAL BONDS | | | |
| | INTERMEDIATE-TERM MUNICIPALS | | | |
| | SHORT-TERM CORPORATE BONDS | | | |
| | INTERMEDIATE-TERM CORPORATES | | | |
| |   SIT Tax Free Income Fund | 6.51% | | $26,496 |
| | HIGH-YIELD CORPORATES | | | |
| |   Northeast Investors | 9.88% | | $40,212 |
| | INTERNATIONAL BONDS | | | |
| | | | 26.39% | |
| 55.00% | EQUITIES | | | |
| | EQUITY-INCOME | | | |
| |   T. Rowe Price Equity-Income | 8.61% | | $35,043 |
| |   Gabelli Equity-Income | 5.00% | | $20,350 |
| | GROWTH & INCOME | | | |
| |   Vanguard 500 Index | 5.00% | | $20,350 |
| |   T. Rowe Price Capital Appreciation | 10.00% | | $40,700 |
| |   T. Rowe Price Dividend Growth | 5.00% | | $20,350 |

| Strategic Allocation | ASSET CLASS<br>ASSET SUB-CLASS<br>Security Title | Security Percent Allocation | ASSET CLASS Allocation | Dollar Allocation |
|---|---|---|---|---|
| | EQUITIES (con't) | | | |
| | GROWTH | | | |
| |     Oakmark Fund | 10.00% | | $40,700 |
| |     Torray Fund | 5.00% | | $20,350 |
| | AGGRESSIVE GROWTH / SMALL CAP | | | |
| |     Barron Asset Fund | 5.00% | | $20,350 |
| | SPECIALTY / SECTORS | | | |
| | INTERNATIONAL | | | |
| |     T. Rowe Price European Stk | 10.00% | | $40,700 |
| | | | 63.61% | |
| 10.00% | HARD ASSETS | | | |
| | REAL ESTATE | | | |
| |     St. Simons Island Lot | 0.00% | | $0 |
| | PRECIOUS METALS | | | |
| | NATURAL RESOURCES | | | |
| | | | 0.00% | |
| 100.00% | TOTAL | | 100.00% | $407,000 |

I claim:

1. A method implemented with a machine comprising a digital electrical computer having a processor programmed for electrically processing input data into output data, the computer electrically connected to an input device and to an output device, for illustrating a replacement of a benefit plan, the method including the steps of:

entering information defining a benefit plan that is viable at one location but not viable at a replacement plan location, to convert the information into a portion of the input data that is electrically conveyed to the digital electrical computer for processing;

engaging the digital electrical computer for the processing of the input data into the output data, the output data corresponding to characteristics for a replacement of the benefit plan, the replacement being viable at the replacement plan location; and generating an illustration of the replacement at the output device.

2. The method of claim 1, further including the step of computer-assisted administering of the replacement in accordance with the illustration.

3. The method of claim 2, further including the step of computer-assisted accounting of payments for the replacement in accordance with the administrating.

4. The method of claim 3, further including providing Internet-based computerized banking service in response to data communicated over the Internet to a banking service computer, the data confirming an identity for a participant receiving the replacement.

5. The method of claim 3, further including providing Internet-based computerized investment service in response to data communicated over the Internet to an investment service computer, the data confirming an identity for a participant receiving the replacement.

6. The method of claim 3, further including providing Internet-based computerized financial planning service in response to data communicated over the Internet to a financial planning service computer, the data confirming an identity for a participant receiving the replacement.

7. The method of claim 3, further including providing Internet-based computerized relocation service in response to data communicated over the Internet to a relocation service computer, the data confirming an identity for a participant receiving the replacement.

8. The method of claim 3, further including providing Internet-based computerized estate planning service in response to data communicated over the Internet to an estate planning service computer, the data confirming an identity for a participant receiving the replacement.

9. The method of claim 3, wherein:

the step of generating is carried out with the replacement being a replacement effective in more than one nation; and further including the step of:
    providing an Internet communication accessible to computers of respective participants in the replacement.

10. The method of claim 2, further including the step of computer-assisted trust accounting for the replacement in accordance with the administrating.

11. The method of claim 10, wherein the step of computer-assisted trust accounting for the replacement in accordance with the administrating includes the step of computer-assisted trust accounting for an unfunded deferred tax plan trust.

12. The method of claim 11, wherein:

the step of generating is carried out with the replacement being a replacement effective in more than one nation; and further including the step of:
    providing an Internet communication accessible to computers of respective participants in the replacement.

13. The method of claim 10, wherein the step of computer-assisted trust accounting for the replacement in accordance with the administrating includes the step of computer-assisted trust accounting for a funded current tax, immediate-vesting plan trust.

14. The method of claim 13, wherein:

the step of generating is carried out with the replacement being a replacement effective in more than one nation; and further including the step of:
    providing an Internet communication accessible to computers of respective participants in the replacement.

15. The method of claim 10, wherein the step of computer-assisted trust accounting for the replacement in accordance with the administrating includes the step of computer-assisted trust accounting for a funded deferred tax, deferred-vesting plan trust.

16. The method of claim 15, wherein:

the step of generating is carried out with the replacement being a replacement effective in more than one nation; and further including the step of:
    providing an Internet communication accessible to computers of respective participants in the replacement.

17. The method of claim 10, wherein the step of computer-assisted trust accounting for the replacement in accordance with the administrating includes the step of computer-assisted trust accounting for a funded 83(b) election, deferred tax deferred-vesting plan trust.

18. The method of claim 17, wherein:

the step of generating is carried out with the replacement being a replacement effective in more than one nation; and further including the step of:
    providing an Internet communication accessible to computers of respective participants in the replacement.

19. The method of claim 10, wherein the step of computer-assisted trust accounting for the replacement in accordance with the administrating includes the step of computer-assisted trust accounting for a plurality of trusts for plans from at least two of the group: unfunded deferred tax plan; funded current tax, immediate-vesting; funded 83(b) election, deferred tax, deferred-vesting plan trust; and funded deferred tax, deferred-vesting.

20. The method of claim 19, wherein:

the step of generating is carried out with the replacement being a replacement effective in more than one nation; and further including the step of:
    providing an Internet communication accessible to computers of respective participants in the replacement.

21. The method of claim 10, further including the step of computer-assisted policy administration for funding for the replacement in accordance with the trust accounting.

22. The method of claim 21, further including the step of computer-assisted calculating of net asset accumulation of the funding for the replacement for reporting and in accordance with the policy administration.

23. The method of claim 22 further including the step of computer-assisted reinsurance administration for the policy in accordance with the policy administration.

24. The method of claim 23, wherein:

the step of generating is carried out with the replacement being a replacement effective in more than one nation; and further including the step of:

providing an Internet communication accessible to computers of respective participants in the replacement.

25. The method of claim 1, further including the step of computer-assisted calculating of investment performance for the asset accumulation of the funding for the replacement for reporting and in accordance with the policy administration.

26. The method of claim 25, wherein:

the step of generating is carried out with the replacement being a replacement effective in more than one nation; and further including the step of:

providing an Internet communication accessible to computers of respective participants in the replacement.

27. The method of claim 5, wherein:

the step of generating is carried out with the replacement being a replacement effective in more than one nation; and further including the step of:

providing an Internet communication accessible to computers of respective participants in the replacement.

28. The method of claim 21, wherein:

the step of generating is carried out with the replacement being a replacement effective in more than one nation; and further including the step of:

providing an Internet communication accessible to computers of respective participants in the replacement.

29. The method of claim 10, wherein the step of computer-assisted trust accounting for the replacement in accordance with the administrating includes accounting for a trust investment.

30. The method of claim 29, wherein:

the step of generating is carried out with the replacement being a replacement effective in more than one nation; and further including the step of:

providing an Internet communication accessible to computers of respective participants in the replacement.

31. The method of claim 10, wherein:

the step of generating is carried out with the replacement being a replacement effective in more than one nation; and further including the step of:

providing an Internet communication accessible to computers of respective participants in the replacement.

32. The method of claim 2, wherein:

the step of generating is carried out with the replacement being a replacement effective in more than one nation; and further including the step of:

providing an Internet communication accessible to computers of respective participants in the replacement.

33. The method of claim 1, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for a cost-reduction sharing replacement for the benefit plan.

34. The method of claim 33, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a retirement plan as the benefit plan.

35. The method of claim 34, wherein:

the step of generating is carried out with the replacement being a replacement effective in more than one nation; and further including the step of:

providing an Internet communication accessible to computers of respective participants in the replacement.

36. The method of claim 33, wherein the step of engaging the digital electrical computer for the processing of the input data into the output data, the output data corresponding to characteristics for a replacement for the benefit plan, the replacement being viable at the replacement plan the replacement plan location, includes engaging the digital electrical computer for the processing of the input data into the output data, the output data corresponding to characteristics for the replacement for a deferred compensation plan as the benefit plan.

37. The method of claim 36, wherein:

the step of generating is carried out with the replacement being a replacement effective in more than one nation; and further including the step of:

providing an Internet communication accessible to computers of respective participants in the replacement.

38. The method of claim 33, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for an incentive plan as the benefit plan.

39. The method of claim 38, wherein:
the step of generating is carried out with the replacement being a replacement effective in more than one nation; and
further including the step of:
provinding an Internet communication accessible to computers of respective participants in the replacement.

40. The method of claim 33, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a participation plan as the benefit plan.

41. The method of claim 40, wherein:
the step of generating is carried out with the replacement being a replacement effective in more than one nation; and
further including the step of:
providing an Internet communication accessible to computers of respective participants in the replacement.

42. The method of claim 33, wherein:
the step of generating is carried out with the replacement being a replacement effective in more than one nation; and
further including the step of:
providing an Internet communication accessible to computers of respective participants in the replacement.

43. The method of claim 1, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for a synthetic 401 (k) plan as the replacement for the benefit plan.

44. The method of claim 43, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a deferred compensation plan as the benefit plan.

45. The method of claim 44, wherein:
the step of generating is carried out with the replacement being a replacement effective in more than one nation; and
further including the step of:
providing an Internet communication accessible to computers of respective participants in the replacement.

46. The method of claim 43, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for an incentive plan as the benefit plan.

47. The method of claim 46, wherein:
the step of generating is carried out with the replacement being a replacement effective in more than one nation; and
further including the step of:
providing an Internet communication accessible to computers of respective participants in the replacement.

48. The method of claim 43, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a participation plan as the benefit plan.

49. The method of claim 48, wherein:
the step of generating is carried out with the replacement being a replacement effective in more than one nation; and
further including the step of:
providing an Internet communication accessible to computers of respective participants in the replacement.

50. The method of claim 43, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a retirement plan as the benefit plan.

51. The method of claim 50, wherein:
the step of generating is carried out with the replacement being a replacement effective in more than one nation; and
further including the step of:
providing an Internet communication accessible to computers of respective participants in the replacement.

52. The method of claim 43, wherein:
the step of generating is carried out with the replacement being a replacement effective in more than one nation; and
further including the step of:
providing an Internet communication accessible to computers of respective participants in the replacement.

53. The method of claim 1, wherein the step of engaging the digital electrical computer for the processing of the input data into the output data, the output data corresponding to characteristics for a replacement for the benefit plan, the replacement being viable at the replacement plan location includes engaging the digital electrical computer for the processing of the input data into the output data, the output data corresponding to characteristics for a stock option substitute as the replacement for the benefit plan.

54. The method of claim 53, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a deferred compensation plan as the benefit plan.

55. The method of claim 54, wherein:
the step of generating is carried out with the replacement being a replacement effective in more than one nation; and
further including the step of:
providing an Internet communication accessible to computers of respective participants in the replacement.

56. The method of claim 53, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for an incentive plan as the benefit plan.

57. The method of claim 56, wherein:
the step of generating is carried out with the replacement being a replacement effective in more than one nation; and
further including the step of:
providing an Internet communication accessible to computers of respective participants in the replacement.

58. The method of claim 53, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a participation plan as the benefit plan.

59. The method of claim 58, wherein:
the step of generating is carried out with the replacement being a replacement effective in more than one nation; and
further including the step of:
providing an Internet communication accessible to computers of respective participants in the replacement.

60. The method of claim 53, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a retirement plan as the benefit plan.

61. The method of claim 60, wherein:
the step of generating is carried out with the replacement being a replacement effective in more than one nation; and
further including the step of:
providing an Internet communication accessible to computers of respective participants in the replacement.

62. The method of claim 53, wherein:
the step of generating is carried out with the replacement being a replacement effective in more than one nation; and
further including the step of:
providing an Internet communication accessible to computers of respective participants in the replacement.

63. The method of claim 1, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for a pension gap supplement as the replacement for the benefit plan.

64. The method of claim 63, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a deferred compensation plan as the benefit plan.

65. The method of claim 64, wherein:
the step of generating is carried out with the replacement being a replacement effective in more than one nation; and
further including the step of:
providing an Internet communication accessible to computers of respective participants in the replacement.

66. The method of claim 63, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for an incentive plan as the benefit plan.

67. The method of claim 66, wherein:
the step of generating is carried out with the replacement being a replacement effective in more than one nation; and
further including the step of:
providing an Internet communication accessible to computers of respective participants in the replacement.

68. The method of claim 63, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a participation plan as the benefit plan.

69. The method of claim 68, wherein:
the step of generating is carried out with the replacement being a replacement effective in more than one nation; and
further including the step of:
providing an Internet communication accessible to computers of respective participants in the replacement.

70. The method of claim 63, wherein the step of engaging the digital electrical computer for the processing of the input data into the output data, the output data corresponding to characteristics for a replacement for the benefit plan, the replacement being viable at the replacement plan location, includes engaging the digital electrical computer or the processing of the input data into the outout data, the output data corresponding to characteristics for the replacement for a retirement plan as the benefit plan.

71. The method of claim 70, wherein:
the step of generating is carried out with the replacement being a replacement effective in more than one nation; and
further including the step of:
providing an Internet communication accessible to computers of respective participants in the replacement.

72. The method of claim 63, wherein:
the step of generating is carried out with the replacement being a replacement effective in more than one nation; and
further including the step of:
providing an Internet communication accessible to computers of respective participants in the replacement.

73. The method of claim 1, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for a voluntary contribution as the replacement for the benefit plan.

74. The method of claim 73, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a deferred compensation plan as the benefit plan.

75. The method of claim 74, wherein:
the step of generating is carried out with the replacement being a replacement effective in more than one nation; and
further including the step of:
providing an Internet communication accessible to computers of respective participants in the replacement.

76. The method of claim 73, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for an incentive plan as the benefit plan.

77. The method of claim 76, wherein:
the step of generating is carried out with the replacement being a replacement effective in more than one nation; and
further including the step of:
providing an Internet communication accessible to computers of respective participants in the replacement.

78. The method of claim 73, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a participation plan as the benefit plan.

79. The method of claim 78, wherein:
the step of generating is carried out with the replacement being a replacement effective in more than one nation; and
further including the step of:
providing an Internet communication accessible to computers of respective participants in the replacement.

80. The method of claim 73, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a retirement plan as the benefit plan.

81. The method of claim 80, wherein:
the step of generating is carried out with the replacement being a replacement effective in more than one nation; and
further including the step of:
providing an Internet communication accessible to computers of respective participants in the replacement.

82. The method of claim 73, wherein:
the step of generating is carried out with the replacement being a replacement effective in more than one nation; and
further including the step of:
providing an Internet communication accessible to computers of respective participants in the replacement.

83. The method of claim 1, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for an employer supplemental contribution as the replacement for the benefit plan.

84. The method of claim 83, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a deferred compensation plan as the benefit plan.

85. The method of claim 84, wherein:
the step of generating is carried out with the replacement being a replacement effective in more than one nation; and further including the step of:
    providing an Internet communication accessible to computers of respective participants in the replacement.

86. The method of claim 83, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for an incentive plan as the benefit plan.

87. The method of claim 86, wherein:
    the step of generating is carried out with the replacement being a replacement effective in more than one nation; and
    further including the step of:
        providing an Internet communication accessible to computers of respective participants in the replacement.

88. The method of claim 83, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a participation plan as the benefit plan.

89. The method of claim 88, wherein:
    the step of generating is carried out with the replacement being a replacement effective in more than one nation; and
    further including the step of:
        providing an Internet communication accessible to computers of respective participants in the replacement.

90. The method of claim 83, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a retirement plan as the benefit plan.

91. The method of claim 90, wherein:
    the step of generating is carried out with the replacement being a replacement effective in more than one nation; and
    further including the step of:
        providing an Internet communication accessible to computers of respective participants in the replacement.

92. The method of claim 83, wherein:
    the step of generating is carried out with the replacement being a replacement effective in more than one nation; and
    further including the step of:
        providing an Internet communication accessible to computers of respective participants in the replacement.

93. The method of claim 1, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for a plan covering at least one of health, life, and disability as the replacement for the benefit plan.

94. The method of claim 93 wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a deferred compensation plan as the benefit plan.

95. The method of claim 94, wherein:
    the step of generating is carried out with the replacement being a replacement effective in more than one nation; and
    further including the step of:
        providing an Internet communication accessible to computers of respective participants in the replacement.

96. The method of claim 93, wherein the step of engaging the digital electrical computer for the processing of the input data into the output data, the output data corresponding to characteristics for a replacement for the benefit plan, the replacement being viable at the replacement plan location, includes engaging the digital electrical electrical computer for the processing of the input data into the output data, the output data corresponding to characteristics for the replacement for an incentive plan as the benefit plan.

97. The method of claim 96, wherein:
    the step of generating is carried out with the replacement being a replacement effective in more than one nation; and
    further including the step of:
        providing an Internet communication accessible to computers of respective participants in the replacement.

98. The method of claim 93, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a participation plan as the benefit plan.

99. The method of claim 98, wherein:
    the step of generating is carried out with the replacement being a replacement effective in more than one nation; and
    further including the step of:
        providing an Internet communication accessible to computers of respective participants in the replacement.

100. The method of claim 93, wherein the step of engaging the digital electrical computer for the processing of the input data into the output data, the output data corresponding to characteristics for a replacement for the benefit plan, the replacement being viable at the replacement plan location, includes engaging the digital electrical computer for the processing of the input data into the output data, the output data corresponding to characteristics for the replacement for a retirement plan as the benefit plan.

101. The method of claim 100, wherein:
the step of generating is carried out with the replacement being a replacement effective in more than one nation; and
further including the step of:
providing an Internet communication accessible to computers of respective participants in the replacement.

102. The method of claim 93, wherein:
the step of generating is carried out with the replacement being a replacement effective in more than one nation; and
further including the step of:
providing an Internet communication accessible to computers of respective participants in the replacement.

103. The method of claim 1, wherein the processing is carried out with funding for the replacement plan including a life insurance policy optionally compliant with United States regulations.

104. The method of claim 103, wherein:
the step of generating is carried out with the replacement being a replacement effective in more than one nation; and
further including the step of:
providing an Internet communication accessible to computers of respective participants in the replacement.

105. The method of claim 1, wherein the processing is carried out with funding for the replacement plan including life insurance with a dial-in death benefit.

106. The method of claim 105, wherein:
the step of generating is carried out with the replacement being a replacement effective in more than one nation; and
further including the step of:
providing an Internet communication accessible to computers of respective participants in the replacement.

107. The method of claim 1, wherein:
the step of generating is carried out with the replacement being a replacement effective in more than one nation; and
further including the step of:
providing an Internet communication accessible to computers of respective participants in the replacement.

108. A computer-based system for illustrating a replacement of a benefit plan that is available at one location but not viable at a location for the replacement, the system comprising:
a memory device storing input data defining a benefit plan that is viable at one location but not viable at a location for a replacement of the benefit plan;
a computer-to-computer communication device for obtaining at least some of the input data in the memory device from at least one other computer located remote from said memory device;
an input device for obtaining at least some of the input data in the memory device;
a processor coupled to the memory device, the processor programmed to control the computer-to-computer communication device and the input device in the respective obtaining and processing the input data into output data corresponding to characteristics for the replacement of the benefit plan; and
a printing device for generating an illustration of the replacement in response to respective control of the processor.

109. The system of claim 3 wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a replacement administering computer programmed to control administering of the replacement in accordance with the illustration; and
said additional documentation includes a reporting of said administering.

110. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a plan sponsor accounting computer programmed to control accounting of payments for the replacement in accordance with the illustration; and
said additional documentation includes a reporting of said accounting payments.

111. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a trust accounting computer programmed to control the trust accounting for the replacement in accordance with the illustration; and
said additional documentation includes a reporting of said trust accounting.

112. The system of claim 111, wherein the trust accounting computer is programmed to control the trust accounting for an unfunded deferred tax plan trust.

113. The system of claim 111, wherein the trust accounting computer is programmed to control the trust accounting for a funded current tax immediate-vesting plan trust.

114. The system of claim 111, wherein the trust accounting computer is programmed to control the trust accounting for a funded deferred tax deferred-vesting plan trust.

115. The system of claim 111, wherein the trust accounting computer is programmed to control the trust accounting for a funded 83(b) election, deferred tax deferred-vesting plan trust.

116. The system of claim 111, wherein the trust accounting computer is programmed to control the trust accounting for a plurality of trusts for plans from at least two of the group consisting of an unfunded deferred tax plan, a funded current tax immediate-vesting, a funded 83(b) election and deferred tax deferred-vesting plan trust, and a funded deferred tax deferred-vesting plan.

117. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a life insurance policy administering computer programmed to compute the policy values, net of all expenses and charges, for fiduciary accounting in accordance with the illustration; and
said additional documentation includes a reporting of the policy values, net of all expenses and charges.

118. The system of claim 117, wherein the life insurance policy administering computer is respectively programmed to compute a determination of the transfer of risk liability between a carrier of the policy and a reinsurer in accordance with the illustration; and
said additional documentation includes a reporting of the determination.

119. The system of claim 118, wherein the life insurance policy administering computer is respectively programmed to compute a net asset value of investments held by at least one money manager, the net asset value for use in determining the policy values for life insurance policy administration, in accordance with the illustration.

120. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes an assets value calculating computer respectively programmed to determine a net asset value of investments held by at least one money manager, the net asset value used in determining the policy values for life insurance policy administration, in accordance with the illustration; and
said additional documentation includes a reporting of the net asset value.

121. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a trust funds investment manager computer respectively programmed to track custody, current market value, and allocation of assets held by at least one money manager in accordance with the illustration; and
said additional documentation includes a reporting of the custody, current market value, and allocation of assets.

122. A The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a banking services computer respectively programmed to control at least one member of the group consisting of cash management, lending, letters of credit, personal financial statement preparation, for a participant in the replacement; and
said additional documentation includes a reporting of the at least one member of the group.

123. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a investment services computer respectively programmed to control at least one member of the group consisting of asset allocation, fixed-ingome investment management, equity investment management, tax-efficient investment management, Guaranteed Return Income Plan, investment performance reporting, and investment manager selection services, for a participant in the replacement; and
said additional documentation includes a reporting of the at least one member of the group.

124. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a relocation services computer respectively programmed to control at least one member from the group consisting of real estate brokerage support, education/school location, language support, local area familiarization, buying services, and moving services, for a participant in the replacement; and
said additional documentation includes a reporting of the at least one member of the group.

125. The system of claim 111, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes an estate planning computer respectively programmed to control at least one member from the group consisting of current estate analysis, host country jurisdictional analysis, current will review, current trust review, multi-jurisdictional estate planning, legal referral service, trust services, and estate settlement services, for a participant in the replacement; and said additional documentation includes a reporting of the at least one member of the group.

126. The system of claim 109, wherein:

said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;

the at least one other computer includes at least one sub-trust illustration computer respectively programmed to control accounting for an unfunded sub-trust and for administering of the replacement plan funding assets in accordance with the illustration; and said additional documentation includes a reporting of the accounting for the unfunded sub-trust and the administering of the replacement plan funding assets.

127. The system of claim 109, wherein:

said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;

the at least one other computer includes at least one sub-trust illustration computer respectively programmed to control accounting for a participant-owned sub-trust and for administering of the replacement plan funding assets in accordance with the illustration; and said additional documentation includes a reporting of the accounting for the participant-owned sub-trust and the administering of the replacement plan funding assets.

128. The system of claim 109, wherein:

said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;

the at least one other computer includes at least one sub-trust illustration computer respectively programmed to control accounting for a funded vesting sub-trust and for administering of the replacement plan funding assets in accordance with the illustration; and said additional documentation includes a reporting of the accounting for the funded vesting sub-trust and the administering of the replacement plan funding assets.

129. The system of claim 109, wherein:

said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;

the at least one other computer includes at least one sub-trust illustration computer respectively programmed to control accounting for a funded, currently taxable, vesting sub-trust and for administering of the replacement plan funding assets in accordance with the illustration; and said additional documentation includes a reporting of the accounting for the currently taxable, vesting and the administering of the replacement plan funding assets.

130. The system of claim 109, wherein:

said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;

the at least one other computer includes a marketing computer respectively programmed to generate marketing proposals from pre-entered text combined with later-computed data inserted therein, in accordance with the illustration.

131. The system of claim 109, wherein:

said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;

the at least one other computer includes a reinsurance computer respectively programmed to determine a net liability transferred from a carrier to a reinsurance company in sharing risk of a policy or group of policies in accordance with the administering, and in response to entering data reflecting a portion of premium transferred from the carrier to the reinsurance company, a portion of a benefit transferred from the reinsurance company back to the carrier, and a portion of an expense allowance transferred from the reinsurance company back to the carrier; and said additional documentation includes a reporting of the net liability transferred from a carrier to a reinsurance company.

132. The system of claim 109, wherein:

said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;

the at least one other computer includes an off-shore payroll accounting computer respectively programmed to control payroll accounting in accordance with the illustration; and said additional documentation includes a reporting of the payroll accounting.

133. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a plurality of replacement plan participant's computers respectively programmed to communicate data over the Internet to obtain replacement plan participant reports and asset allocation data for the participant's liability accounts in accordance with the illustration; and
said additional documentation includes a reporting of the reports and asset allocation data.

134. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a consultant's computer respectively programmed to generate, as the additional documentation, a comparative study showing equivalent benefits for the consultant's client in response to input data identifying a plan to be illustrated for potential replacement.

135. The system of claim 134, wherein the at least one other computer includes a compliance computer respectively programmed for generating accounting and tax data, which is input data to said consultant's computer for further processing to enable said consultant's computer to generate said comparative study.

136. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a consultant's computer respectively programmed for generating, as the additional documentation, a compliance report for due diligence analysis of the replacement plan in accordance with the illustration.

137. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a case study and sensitivity computer respectively programmed for generating, as the additional documentation, a plurality of documents collectively showing ramifications of at least one from the group consisting of a change in performance, an analytic assumption, and a target for the replacement in accordance with the illustration.

138. The system of claim 109, wherein:
said at least one other computer respectively includes a memory device storing additional input data corresponding to said benefit plan, a computer-to-computer communication device, an input device for obtaining the additional input data, and a processor programmed to control the at least one other computer, and a printing device for generating additional documentation at a location proximate to said at least one other computer;
the at least one other computer includes a revenue accounting computer respectively programmed for computing at least one of the fees from the group consisting of participation fees, plan administration fees, co-trustee fees, insurance policy fees, reinsurance participation fees, investment management trailer fees, and Internet usage fees in accordance with the illustration; and
said additional documentation includes a reporting of calculations for the fee, in accordance with said illustration.

139. A machine for illustrating a replacement of a benefit plan that is available at one location but not viable at a location for the replacement, the system comprising:
"a memory divice storing input data defining a benefit plan that is viable at one location but not viable at a location for a replacement of the benefit plan;"
an input device for obtaining at least some of the input data in the memory device;
means for processing input electronic signals into output electronic signals, said input data corresponding to characteristics of a benefit plan that is viable at one location but not viable at another location, and said output data corresponding to characteristics for the replacement of the benefit plan;
a printing device for generating an illustration of the replacement in response to respective control of the processor.

140. The machine of claim 139, further including:
means for computer-assisted administering of the replacement in accordance with the illustration.

141. A computer-based system for illustrating a replacement of a benefit plan that is available at one location but not viable at a location for the replacement, the system comprising:
"a memory device storing input data defining a benefit plan that is viable at one location but not viable at a location for a replacement of the benefit plan;"
a computer-to-computer communication device for obtaining at least some of input data in the memory device from at least one other computer located remote from said memory device;
an input device for obtaining at least some of the input data in the memory device;
means for controlling the computer-to-computer communication device and the input device in obtaining and in processing the input data into output data corresponding to characteristics for the replacement of the benefit plan; and
a printing device for generating an illustration of the replacement in response to respective control of the processor.

142. The machine of claim 141, further including: means of computer-assisted administering of the replacement in accordance with the illustration.

143. The method of claim 142, wherein:

the step of generating is carried out with the replacement being a replacement effective in more than one nation; and further including the step of:

providing an Internet communication accessible to computers of respective participants in the replacement.

144. A machine-implemented method for illustrating a replacement of a benefit plan, the method including the steps of:

entering information defining a benefit plan that is viable at one location but not viable at an employment location, to convert the information into a portion of the input data electrically conveyed to a programmed processor in a digital electrical computer;

processing of the input data into output data corresponding to characteristics for a replacement of the benefit plan, the replacement being viable at the employment location; and generating an illustration of the replacement at the output device.

145. The method of claim 144, wherein the processing is carried out with funding for the replacement plan including life insurance; and further including the steps of:

entering insured-identifying data; and separately entering replacement plan participant-identifying data, wherein the insured-identifying data is not necessarily identical to the participant-identifying data.

146. The method of claim 145, wherein:

the step of generating is carried out with the replacement being a replacement effective in more than one nation; and further including the step of:

providing an Internet communication accessible to computers of respective participants in the replacement.

147. The method of claim 144, further including the step of computer-assisted administering of the replacement in real time.

148. The method of claim 147, further including the step linking the digital computer to another digital electrical computer by a computer-to-computer communications device to implement the replacement by multi-computer cooperative data processing in accordance with the illustration.

149. The method of claim 148, wherein:

the step of generating is carried out with the replacement being a replacement effective in more than one nation; and further including the step of:

providing an Internet communication accessible to computers of respective participants in the replacement.

150. The method of claim 147, wherein:

the step of generating is carried out with the replacement being a replacement effective in more than one nation; and further including the step of:

providing an Internet communication accessible to computers of respective participants in the replacement.

151. The method of claim 144, further including the step linking the digital computer to another digital electrical computer by a computer-to-computer communications device to implement the replacement by multi-computer cooperative data processing in accordance with the illustration.

152. The method of claim 151, wherein:

the step of generating is carried out with the replacement being a replacement effective in more than one nation; and further including the step of:

providing an Internet communication accessible to computers of respective participants in the replacement.

153. The method of claim 144, wherein the processing is carried out with funding for the replacement plan including a life insurance policy optionally compliant with United States regulations.

154. The method of claim 153, wherein:

the step of generating is carried out with the replacement being a replacement effective in more than one nation; and further including the step of:

providing an Internet communication accessible to computers of respective participants in the replacement.

155. The method of claim 144, wherein the processing is carried out with funding for the replacement plan including life insurance with a dial-in death benefit.

156. The method of claim 155, wherein:

the step of generating is carried out with the replacement being a replacement effective in more than one nation; and further including the step of;

providing an Internet communication accessible to computers of respective participants in the replacement.

* * * * *